(12) United States Patent
Basset

(10) Patent No.: US 11,500,203 B2
(45) Date of Patent: Nov. 15, 2022

(54) RESONANT WAVEGUIDE GRATING AND APPLICATIONS THEREOF

(71) Applicant: CSEM Centre Suisse d'Electronique et de Microtechnique SA—Recherche et Developpement, Neuchatel (CH)

(72) Inventor: Guillaume Basset, Huningue (FR)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 301 days.

(21) Appl. No.: 16/652,788

(22) PCT Filed: Oct. 2, 2017

(86) PCT No.: PCT/EP2017/074982
§ 371 (c)(1),
(2) Date: Apr. 1, 2020

(87) PCT Pub. No.: WO2019/068304
PCT Pub. Date: Apr. 11, 2019

(65) Prior Publication Data
US 2020/0241301 A1 Jul. 30, 2020

(51) Int. Cl.
*G02B 27/01* (2006.01)
*G02B 5/18* (2006.01)
*F21V 8/00* (2006.01)

(52) U.S. Cl.
CPC ....... *G02B 27/0172* (2013.01); *G02B 5/1809* (2013.01); *G02B 5/1814* (2013.01);
(Continued)

(58) Field of Classification Search
CPC .......... G02B 27/0172; G02B 5/1809; G02B 5/1814; G02B 5/1861; G02B 6/0035; G02B 2027/0178
(Continued)

(56) References Cited

U.S. PATENT DOCUMENTS 8,765,360 B2 * 7/2014 Wang ................ G02B 5/18
359/569
2004/0218275 A1 * 11/2004 Ketterson .......... H01S 5/06256
359/569
(Continued)

FOREIGN PATENT DOCUMENTS

WO    WO-2015129220 A1 *  9/2015  ............... F21V 9/16
WO    2017137127 A1       8/2017
WO    WO-2017137127 A1 *  8/2017  ........... B42D 25/328

OTHER PUBLICATIONS

International Search Report and Written Opinion for PCT/EP2017/074982 dated Jun. 19, 2018.

*Primary Examiner* — Collin X Beatty
(74) *Attorney, Agent, or Firm* — Pearne & Gordon LLP

(57) ABSTRACT

A resonant waveguide grating includes a waveguiding layer and a plurality of subwavelength structures. The waveguiding layer, being in optical proximity to the plurality of subwavelength structures, is configured to guide at most ten wave-guided light modes. The plurality of subwavelength structures includes at least two adjacent grooves having a subwavelength distance between their groove centers being different than the subwavelength distance between the centers of two adjacent ridges. The plurality of subwavelength structures is configured to couple out of the waveguiding layer resonantly by diffraction, an outcoupled fraction of an incoupled portion of incident light. The outcoupled fraction is a diffracted part of an incident light beam. A diffractive optical combiner and a diffractive optical coupler, both
(Continued)

include the resonant waveguide grating of the invention. A near-eye display apparatus includes at least the resonant waveguide grating of the invention.

22 Claims, 30 Drawing Sheets

(52) U.S. Cl.
CPC ......... *G02B 5/1861* (2013.01); *G02B 6/0035* (2013.01); *G02B 2027/0178* (2013.01)

(58) Field of Classification Search
USPC ........................................................ 359/630
See application file for complete search history.

(56) References Cited

U.S. PATENT DOCUMENTS

| | | | |
|---|---|---|---|
| 2009/0116790 A1* | 5/2009 | Mossberg ............ | G02B 5/1809 385/37 |
| 2015/0219842 A1* | 8/2015 | Sqalli ............... | B29D 11/00692 264/1.24 |

* cited by examiner

RESONANT WAVEGUIDE GRATING AND APPLICATIONS THEREOF

FIELD OF THE INVENTION

The invention relates to the field of optics, more particularly the invention relates to optical systems that are based on guided mode resonance. In particular, but not exclusively, to resonating waveguide grating elements and to near-to-eye optical systems and virtual image display apparatus that are suitable for head-mounted head-up displays mounted on the head of an observer.

BACKGROUND OF THE INVENTION

Resonant waveguide gratings (defined as RWG hereafter, also called resonating waveguide gratings), also called leaky-mode waveguide, low-modes waveguide gratings, subwavelength waveguide gratings, zero-order devices and guided-mode resonance filters or devices, and comprising monomode waveguide gratings, have been developed since more than 30 years.

Gratings have also been used widely as devices to disperse and filter optical beams. The combination of gratings and waveguides has been proposed to make optical structures and devices with unique properties such as filters having very narrow bandwidths. More particularly a considerable amount of development work has been made in the field of resonating waveguide gratings as they allow producing particularly interesting optical effects that cannot be realized with classical optical components.

A resonant waveguide grating, also called guided-mode resonance filter, consists of a combination of a subwavelength grating and a thin waveguide. Such structures have a multilayer configuration and a basic arrangement comprises a substrate, a thin dielectric or semiconductor or metallic waveguiding layer and possibly an additional layer in which a grating is formed. A so called resonance occurs when the incident light is diffracted by the grating and matches a mode of the waveguide. As most of the spectrum does not couple into the waveguide, strong spectral changes are observed in reflection and transmission. Because the waveguide is intrinsically corrugated being a waveguide-grating, the guided modes are necessarily leaky, a fraction of the guided light is outcoupled travelling through each grating period while another portion is incoupled under suitable impending light. As an example, such leaky mode can be exponentially decreasing along the number of grating grooves and ridges it is propagating along.

RWG are generally designed to have spatial periodicity shorter than the wavelength they operate with as measured in vacuum and are therefore called "subwavelength" structures or subwavelength devices. Eventually they have periodicities closed to the wavelength they are operating with and just above it. Quite often, the periods are significantly smaller than the free-space wavelength they are working with, for example a third of it. Because of their small periodicity, they do not allow many diffractive orders, which distinguishes them from diffractive optical elements (DOE) such as surface relief grating (SAG), Holographic Optical elements (HOE) such as volume holograms and Switchable Bragg Grating (SAG). Most of the time, they are designed to operate only in zero-diffractive order, which allows light filtering and redirection only between the zero-order transmission and reflection, this last one is also called specular reflection, and with a leaky-guided mode incoupled and outcoupled continuously, eventually with non-guided plus or minus first diffraction order, possibly in reflection and transmission, exceptionally with non-guided plus or minus second diffraction order, possibly in reflection and in transmission.

The existence of such resonances have been discovered in the earlier stages of grating developments (R. W. Wood, Phil. Mag. vol 4, pp. 396-402, 1902). These resonances belong to one type of the anomalous diffraction phenomena in grating structures and imply a rapid variation in the external observable diffracted orders with respect to physical parameters such as the angle and/or the wavelength of the incident wave. In the early stages of grating manufacturing the abrupt change of reflection could not be explained. Hessel and Oliner (Appl. Optics, vol. 4, pp. 1275-1297, 1965) pointed out that there are basically two types of grating anomalies. One is called the Rayleigh type, which is the classical Wood's anomaly, and another is called the resonance type. The Rayleigh-type anomaly is owing to the energy of higher diffracted order transferred to lower-orders through evanescent waves.

The resonance anomaly in diffraction gratings, being of particular interest in the context of the current patent application, is due to the coupling process of an externally incident optical wave to a surface guided wave which is supported by the structure of the resonant waveguide grating. Such grating anomalies can be divided into two types in function of the type of the structure and accurate results can be obtained by using the Fourier-Rayleigh approximation. This method cannot be applied in the case of deep grating grooves. Several authors investigated the reflection from weakly corrugated waveguides. The convergence problems of deep grating grooves could be relaxed by using the modal simulation methods such as the Fourier-Modal-Method (FMM) or the Rigorous Coupled-Wave Analysis (RCWA). With these new mathematical tools, many devices have been proposed and developed in the last decades.

Such resonant waveguide gratings based on dielectric and semiconductor waveguides and/or metallic waveguides have been developed for a variety of applications, such as described in U.S. Pat. No. 4,426,130 and many other patent from Karl Knop. The first industrial implementations were made under the brand DID™ as optical authentication devices, so-called optical variable devices (OVDs).

One of the main applications of guided mode resonance structures has been the design of filters with very narrow spectral linewidths in reflection and transmission. The bandwidth can de designed to be extremely narrow and of the order of 0.1 nm and may be tuned by parameters such as the grating depth, the duty cycle, the thickness and composition of the waveguide layer. Magnusson proposed wavelength selective reflection filters and investigated their line shapes (R. Magnusson and S. S. Wang: "New principle for optical filters", Appl. Phys. Lett., vol 61, pp. 1022-1024, 1992). Also, a systematic analysis of resonant grating waveguide structures has been published by Rosenblatt and Sharon:

D. Rosenblatt et al., "Resonating grating waveguide structures", IEEE J. Quantum Electron., vol. 33, nr. 11. pp. 2038-2059, 1997

A. Sharon et al.: "Resonating grating-waveguide structures for visible and near-infrared radiation:", J. Opt. Soc. Am., vol. 14, nr. 11, pp. 2985-2993, 1997

Rosenblatt and Sharon explained in these papers that the efficient transfer of wave energy between forward and backward propagations at resonance is due to the relative phase-shift between the incident and the diffracted waves, resulting in destructive and constructive interference of forward and backward propagating waves.

Guided mode resonance devices may also be used as components in sensors. By applying a substance such as a gas or a bio-chemical layer in contact with the resonating waveguide, these substances may be detected. A limitation of guided mode resonance devices in sensors is that the interaction length of the waves interacting with said substances is limited due to the leaky-mode propagations.

Other developments using RWG as color filters for vision sensors are described in for example in EP1739751. However, the leaky-mode and light waveguiding properties of RWG were specifically used until recently only in optical sensing platforms, as described in U.S. Pat. No. 5738825 or EP0455067.

An example of the use of a resonating waveguide-grating as a sensor to detect the presence of a gas is described in the article of L. Davoine et al.: "Resonant absorption of a chemically sensitive layer based on waveguide gratings", Applied Optics, pp. 340-349, vol. 52, nr. 3, 2013.

In this device the major drawback is the inherent leakage of light along the waveguide, therefore the resonant light cannot be absorbed completely by the medium in contact with the waveguide. In addition a delicate trade-off has to be chosen between a possible absorption enhancement and the resonance bandwidth of the resonating waveguide-structure.

Because of many reasons, including limitations in technological fabrication, complex arrays of RWG using different incoupling and outcoupling RWGs connected by a common very thin waveguide were developed only recently as sensing platform as described in WO9219976 and EP1031828. This approached was described as well more recently in EP2618130 or in EP2757374 using coherent beam illumination and detection.

WO2015096859, describes a guided mode resonance device that allows to perform a light beam redirection. This is achieved by using light incoupling in a "RWG incoupler" having a first spectral distribution, the incoupled light is then transmitted to and decoupled by a neighbor "RWG outcoupler" at a non-specular or non-zero-order transmitted angle, simultaneously with the guidance in the opposite direction in the same waveguide of another spectral distribution, the "RWG incoupler" and "RWG outcoupler" being for this second spectral distribution respectively the "outcoupler" and "incoupler".

In parallel to these developments, triggered by mainly the disclosure of U.S. Pat. No. 3,059,519, many development have aimed at creating compact, light-weight and high quality near-eye head-mounted displays. These devices are especially semi-transparent displays, allowing to superpose visual information from a visible scene to an observer and by images provided by a computing platform. Such devices have been investigated intensively and are generally called augmented reality devices, smart-glasses and more recently mixed-reality devices or head-up head-mounted displays.

Many different optical systems have been proposed to redirect the light created by a micro-display or micro-projector towards the eye pupil of the optical projection system, while allowing the user to view the outside world. Merging high resolution color images, typically made by RGB components, without disturbing the natural field of view has been proven challenging. The optical device that can merge synthetic dynamic 2D or sometimes 3D images, defined as light-field dynamic images, with the external world light is named as a near-eye display "screen" or also an "optical combiner".

Many approaches have been proposed, based on freeform optics elements and/or highly multimode lightguides typically trapping light between two reflecting interfaces on which light rays are bouncing, following the disclosure of EP0535402 and U.S. Pat. No. 6580529. In some technologies proposed, this function is made by complex semi-transparent micro-displays. To couple in and out of multi-mode lightguides light rays, diffractive optical elements, generically named Diffractive Optical Elements (DOE) have been often developed and proposed such as SRG as well as SBG.

However, these diffractive elements are highly dispersive and are relatively broadband, creating so-called "rainbow-effect", possibly for both the external world light and computed images. This limits the application of diffractive optical elements as optical combiner mostly to outcouple light rays from lightguides, so that most of the diffracted light from the external world is diffracted and the lightguide, limiting the visual aberations. Various approaches have been proposed to reduce such effects, such as using volume holograms (HOE) as disclosed in US2015362734.

Recent development are targeting to provide wide Field Of View (FOV) screens or combiners having a high lateral (XY) image resolution with a large RGB (red, green, blue) gamut color, large exit pupil also called eyebox allowing users with various Inter-Pupillary Distance (IPD) to use the near-eye display and eye-ball movement without losing the image information, in compact, thin and lightweight form factors. Current limitations are, depending of the approaches used: chromatic dispersions, diffraction of light coming from the outside world, limited transparency, limited shape to planar waveguides used for Exit Pupil Expansion (EPE), limited FOV, inhomogeneity of the light intensity over the eye box due to interferences and difficult manufacturing fabrication/replications processes and fabrication tolerances.

A great number of patents have been filed in the field. Some patents are cited here: Sony (US2016334629), Microsoft (US2012075168), Seiko (EP2631695), Google (U.S. Pat. No. 8,472,119), Magic Leap (US2015016777, US2016327789). Many other approaches have been proposed to reach the above listed targets and can for example be found in the CPC class G02B2027/0123.

SUMMARY OF THE INVENTION

The object of this invention is to disclose a new resonant waveguide grating. This new resonant waveguide grating is suitable to be used in near-eye display apparatus, near-eye light-field display apparatus, augmented reality systems or mixed reality systems for at least one eye display. The invention relates also to a an optical combiner and a near-to-the eye display apparatus that comprises the resonant waveguide grating of the invention.

More precisely the invention relates to a resonant waveguide grating, defining a first side and a second side opposite to said first side, comprising:
  a substrate layer defining a first substrate surface and a second substrate surface facing said first substrate surface;
  a waveguiding layer, having a first waveguiding surface and a second waveguiding surface, arranged on said substrate layer, and having a predetermined permittivity function defined in the direction perpendicular to said first waveguiding surface;
  a plurality of subwavelength structures,
wherein:
  said waveguiding layer is configured to guide at most ten wave-guided light modes in a predetermined wavelength range, said plurality of subwavelength structures comprises at least two adjacent grooves defining each a groove center and comprise at least two adjacent ridges defining each a ridge center said two adjacent grooves having a subwavelength distance d1 between their centers being different than the subwavelength distance d2 between the centers of said two adjacent ridges, said plurality of subwavelength structures are arranged to be in optical communication through said waveguiding layer which permittivity function and the dimension and orientation of said plurality of subwavelength structures are chosen so that the plurality of subwavelength structures couples resonantly, by diffraction, into said waveguiding layer at least an incoupled portion of an incident light beam, provided by a light emitter into at least one of said at most ten wave-guided modes of the waveguiding layer, said plurality of subwavelength structures are configured to couple out of said waveguiding layer resonantly by diffraction, an outcoupled fraction of said at least an incoupled portion;

said outcoupled fraction of said at least incoupled portion has a predetermined central wavelength $\lambda_0$ in said predetermined wavelength range and has a predetermined spectral width $\Delta\lambda$, said outcoupled fraction being a diffracted part of the incident light beam.

In an embodiment one of said adjacent grooves is situated between said adjacent ridges.

In an embodiment the outcoupled fraction is directed away from the partially transmitted light beam of said incident light beam by the waveguiding layer and from the partially reflected light beam of said incident light beam by the waveguiding layer.

In an embodiment at least two grooves and/or at least two ridges have different shapes and/or dimensions.

In an embodiment the waveguiding layer has a mean refractive index higher than the refractive index of said substrate layer in at least a portion of the spectrum of said incident light beam.

In an embodiment the waveguiding layer is made of a material comprising at least a dielectric or a semiconductor material.

In an embodiment the waveguiding layer comprises nanoparticles made of a dielectric material or a semiconductor.

In an embodiment the dielectric material or semiconductor has an optical index higher than the refractive index of said substrate layer in at least a portion of the spectrum of said incident light beam, preferably higher by at least 0.1.

In an embodiment the waveguiding layer comprises to at least one of the sides of the waveguiding layer at least two layers made of different materials.

In an embodiment the waveguiding layer comprises to at least one of the sides of the waveguiding layer a layer made of an alloy of varying composition across the direction perpendicular to said first waveguiding surface.

In an embodiment the waveguiding layer comprises at least two materials made of identical materials having different doping concentrations.

In an embodiment the waveguiding layer has a doping concentration profile across the direction perpendicular to said waveguiding layer.

In an embodiment the resonant waveguide grating comprises a plurality of subwavelength structures in which the at least two grooves and the at least two ridges have a binary shape, or a sinusoidal shape, or a triangular shape or a slanted shape.

In an embodiment said waveguiding layer comprises a flat portion defined in the plane of said waveguiding layer.

In an embodiment said waveguiding layer is substantially conformal to the shape of the plurality of the subwavelength structures.

In an embodiment said waveguiding layer comprises at least one set of a plurality of subwavelength structures having a spatial Fourier transform containing at least two distinct effective spatial frequency components.

In an embodiment said at least two distinct effective spatial frequency components are larger than one tenth of the spatial frequency $1/\lambda_0$ of said predetermined wavelength $\lambda_0$.

In an embodiment said effective spatial frequency components is larger than the spatial frequency $1/\lambda_0$ of said predetermined wavelength $\lambda_0$, more preferably the two at least distinct effective spatial frequency components being larger than the spatial frequency $1/\lambda_0$ of said predetermined wavelength $\lambda_0$.

In an embodiment a portion of the resonant waveguide grating comprises a set of a plurality of adjacent subwavelength structures having a local spatial periodicity (P), this local periodicity (P) being defined in that the lateral and vertical dimensions of said one set of a plurality of subwavelength structures does not vary by more than 10% in said portion.

In an embodiment said local spatial periodicity (P) is the least common multiple of the at least two distinct effective spatial period components of said portion.

In an embodiment said spatial period (P) is smaller than ten times said predetermined wavelength $\lambda_0$.

In an embodiment said outcoupled fraction is an outcoupled diffracted portion of the incident light beam by said resonant waveguide grating, according to a diffraction order N being at least one or below minus one of said spatial period P, the outcoupled fraction being directed away from the specular reflection direction of the incident light and away from said incident light beam.

In an embodiment the plurality of subwavelength structures couples resonantly into said waveguiding layer the said incoupled portion of an incident light beam by diffraction, according to a diffraction order N being at least two or below minus two of the said spatial period P.

In an embodiment said portion comprises a set of a plurality of subwavelength structures having no local spatial periodicity (P).

In an embodiment said portion comprises a set of a plurality of subwavelength structures having no local spatial periodicity (P) that comprises at least 8 ridges and 8 grooves, preferably more than 20 ridges and 20 grooves, more preferably more than 100 ridges and 100 grooves.

In an embodiment said plurality of subwavelength structures are non-homogeneous at a super-wavelength scale.

In an embodiment said plurality of subwavelength structures has a spatial gradient of at least one of their structural parameters.

In an embodiment said plurality of subwavelength structures are pixelated in one or two dimensions across the plane of the waveguiding layer.

The invention is also achieved by a diffractive optical combiner, comprising at least one resonant waveguide grating as described.

In an embodiment said diffractive optical combiner is arranged on a transparent dielectric material.

The invention is further achieved by a diffractive optical coupler, comprising at least one resonating waveguide grating as described In an embodiment said at least one diffractive optical coupler is arranged on a transparent dielectric material.

In an embodiment said transparent dielectric material is a thin foil or slab or curved slab.

The invention is also achieved by a near-eye display apparatus comprising at least one resonating waveguide grating as described.

In an embodiment the near-eye display apparatus comprises at least one diffractive optical combiner as described.

In an embodiment the near-eye display apparatus comprises at least one diffractive optical coupler as described.

FIGURES

The above described objects and advantages of the present invention will become more readily apparent to those ordinarily skilled in the art after reviewing the following detailed descriptions and accompanying drawings, in which.

Figure 9:
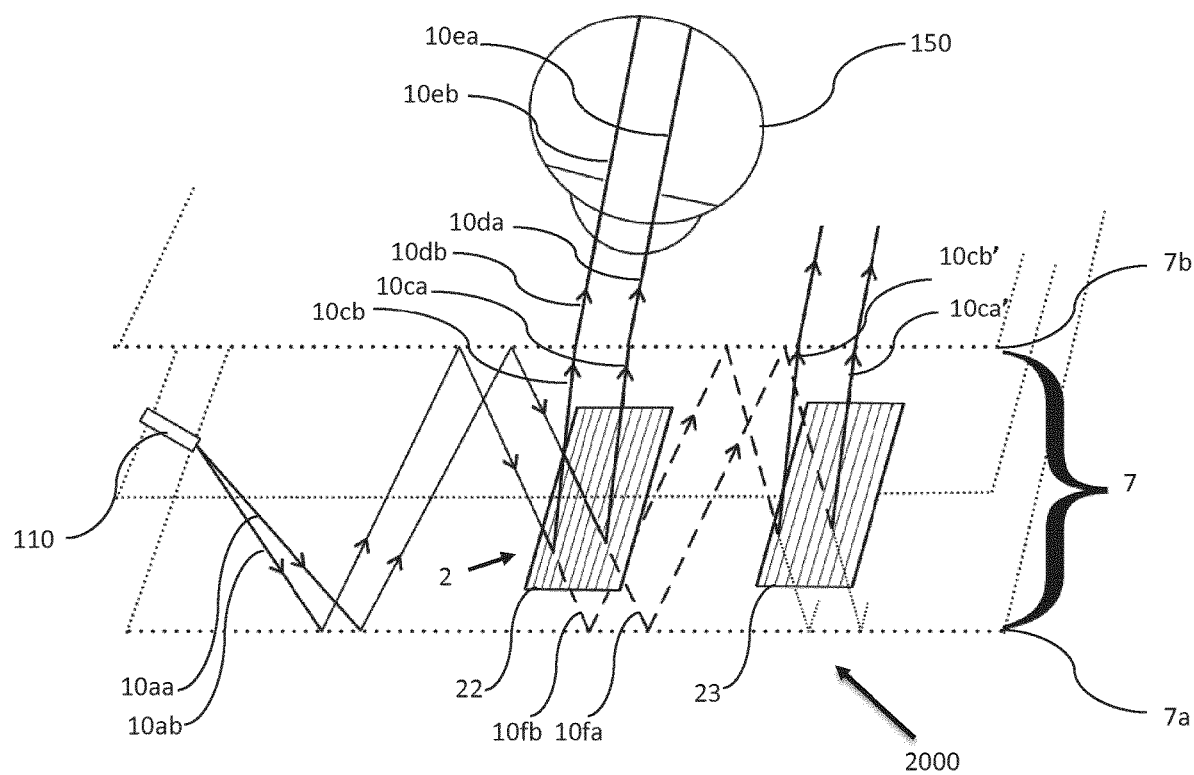
Figure 10:
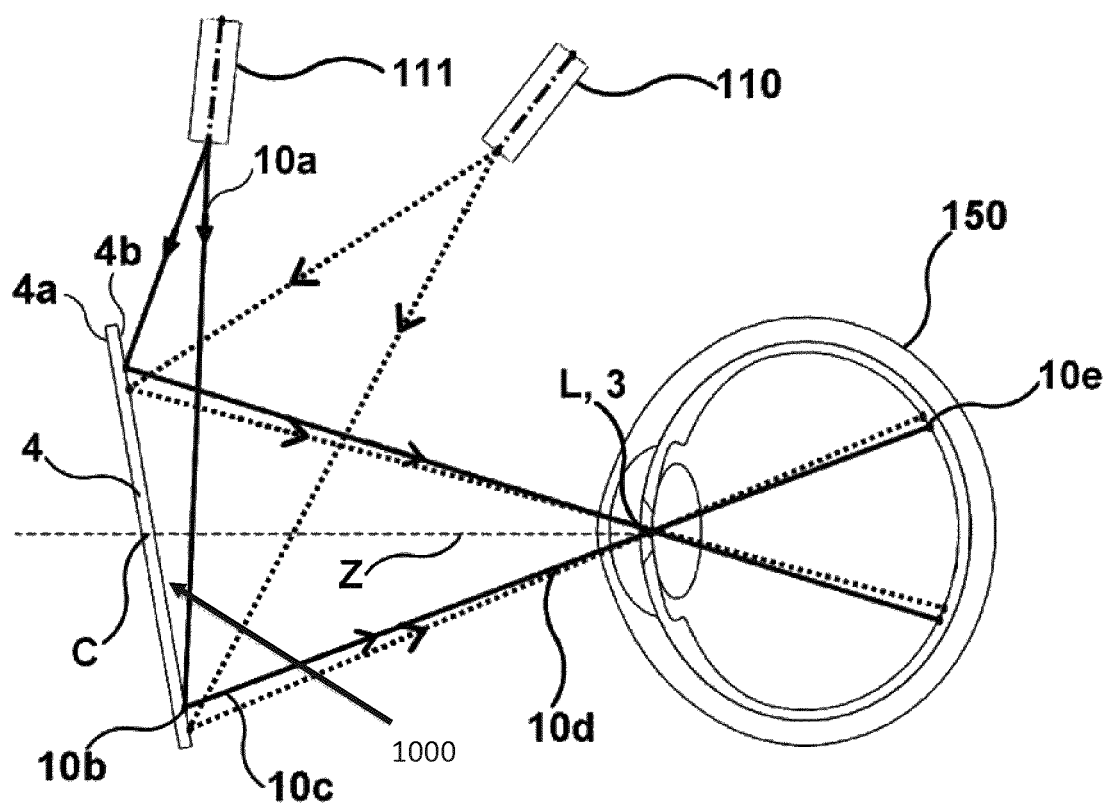
Figure 11:
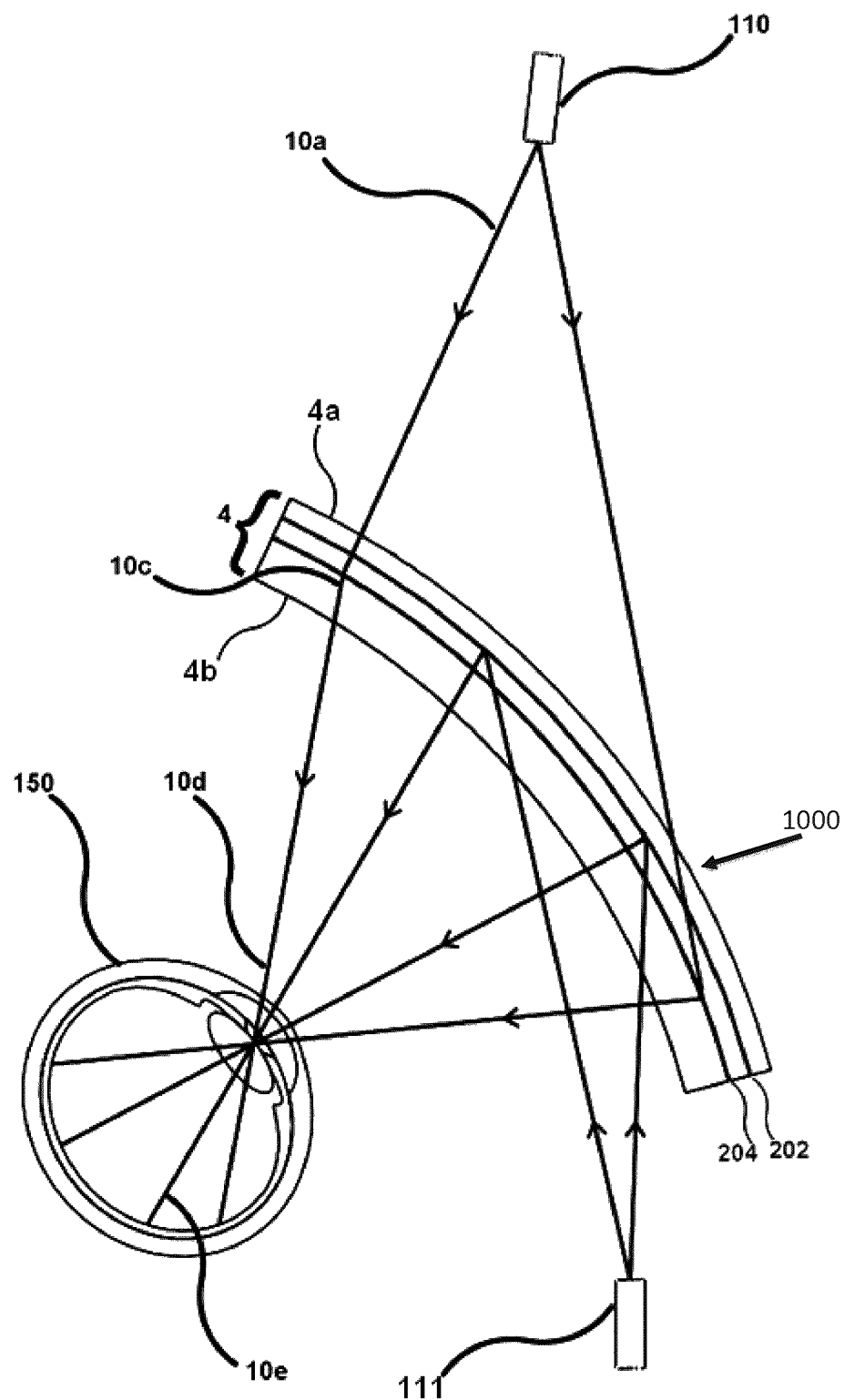
Figure 12:
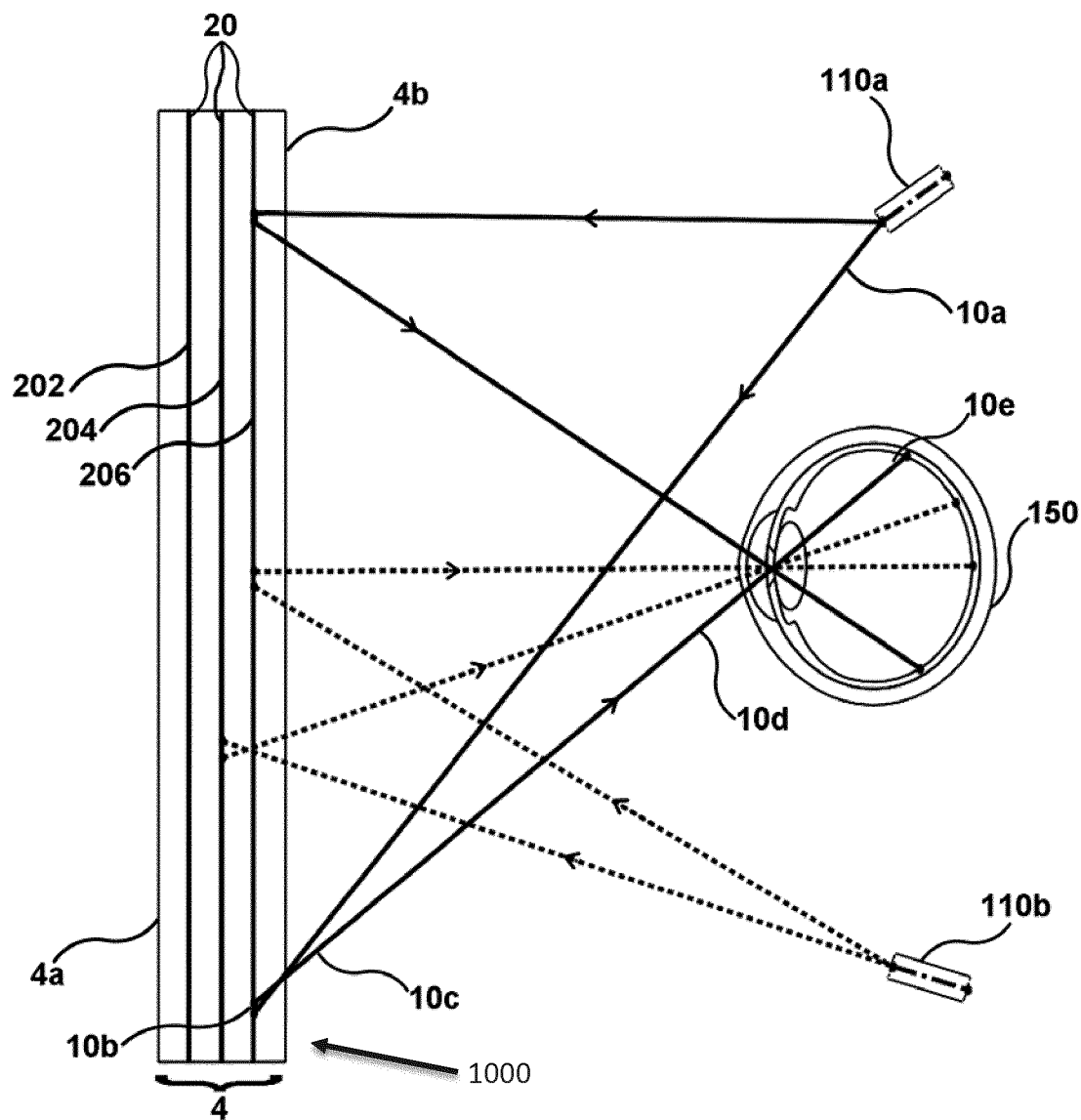
Figure 13A:
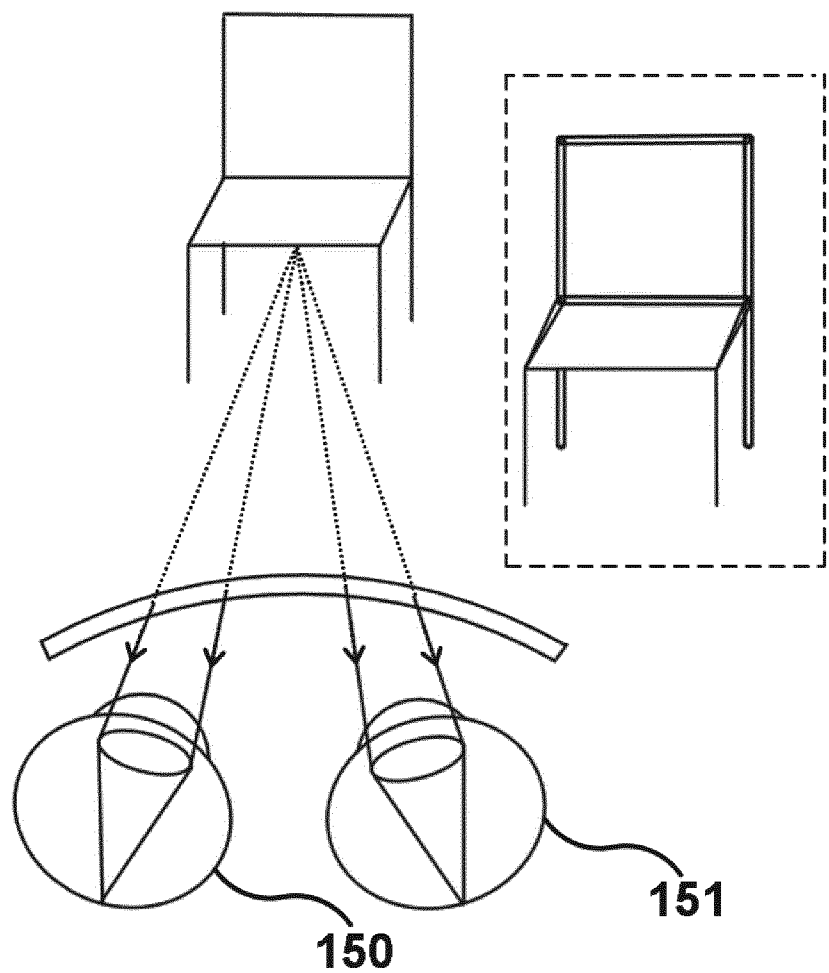
Figure 13B:
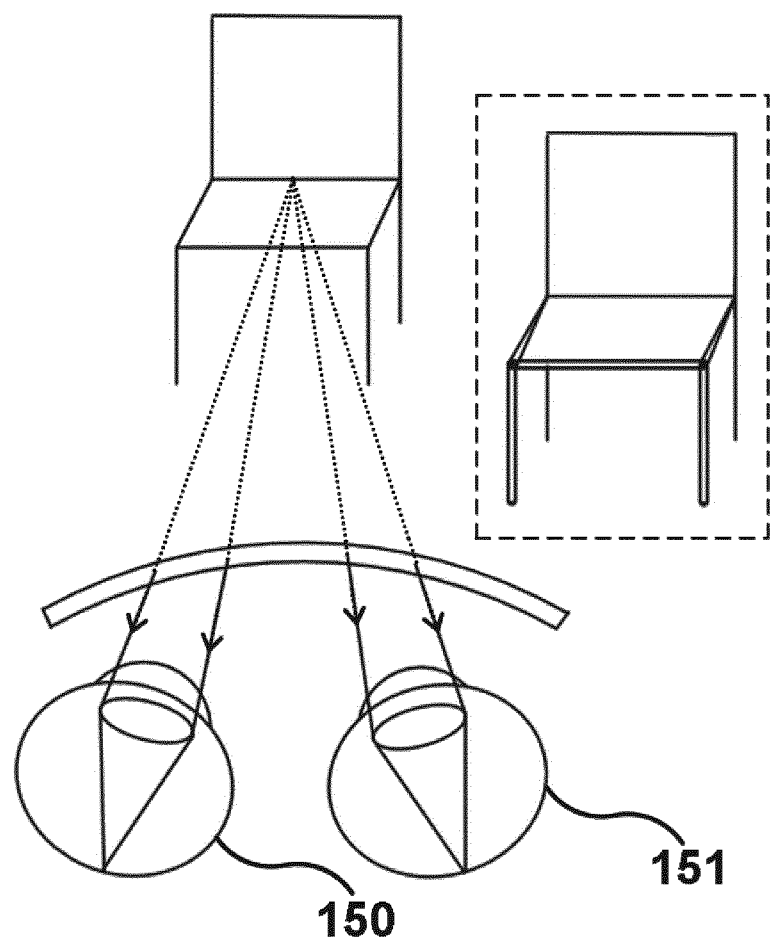
Figure 14A:
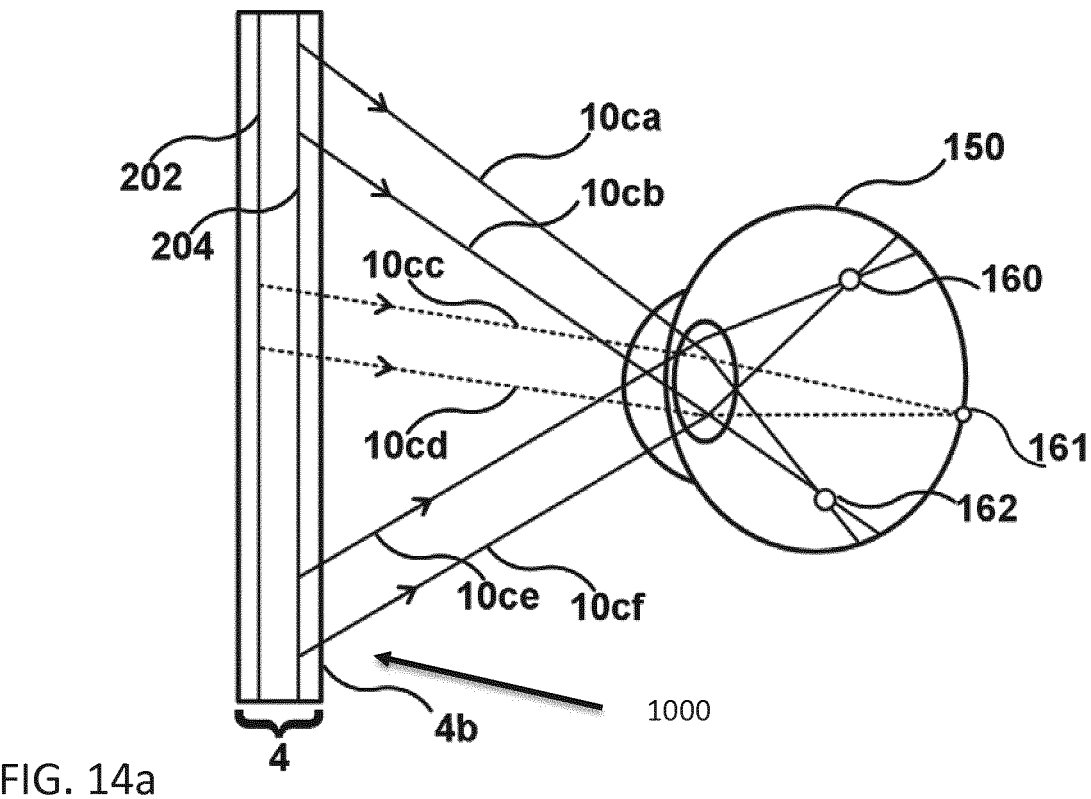
Figure 14B:
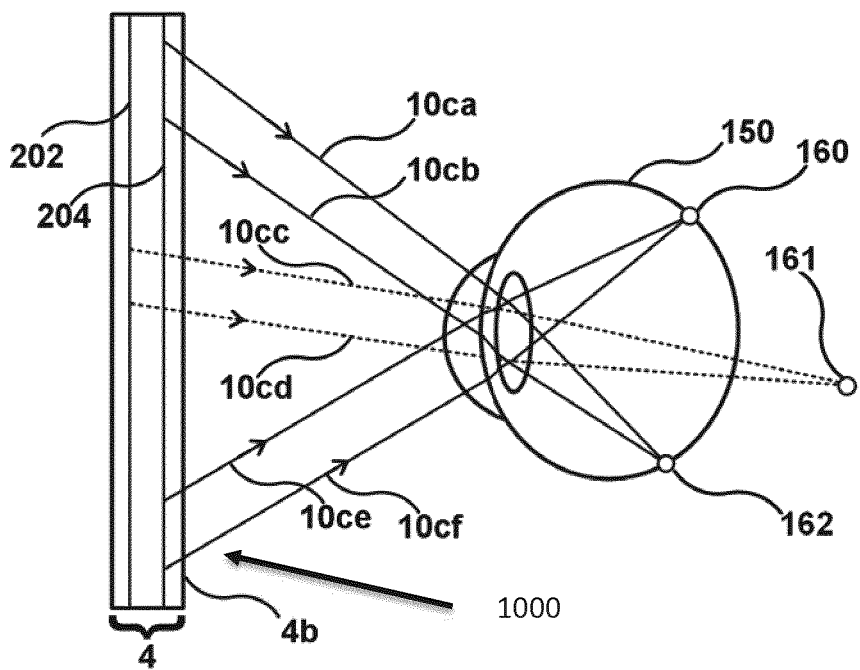
Figure 15A:
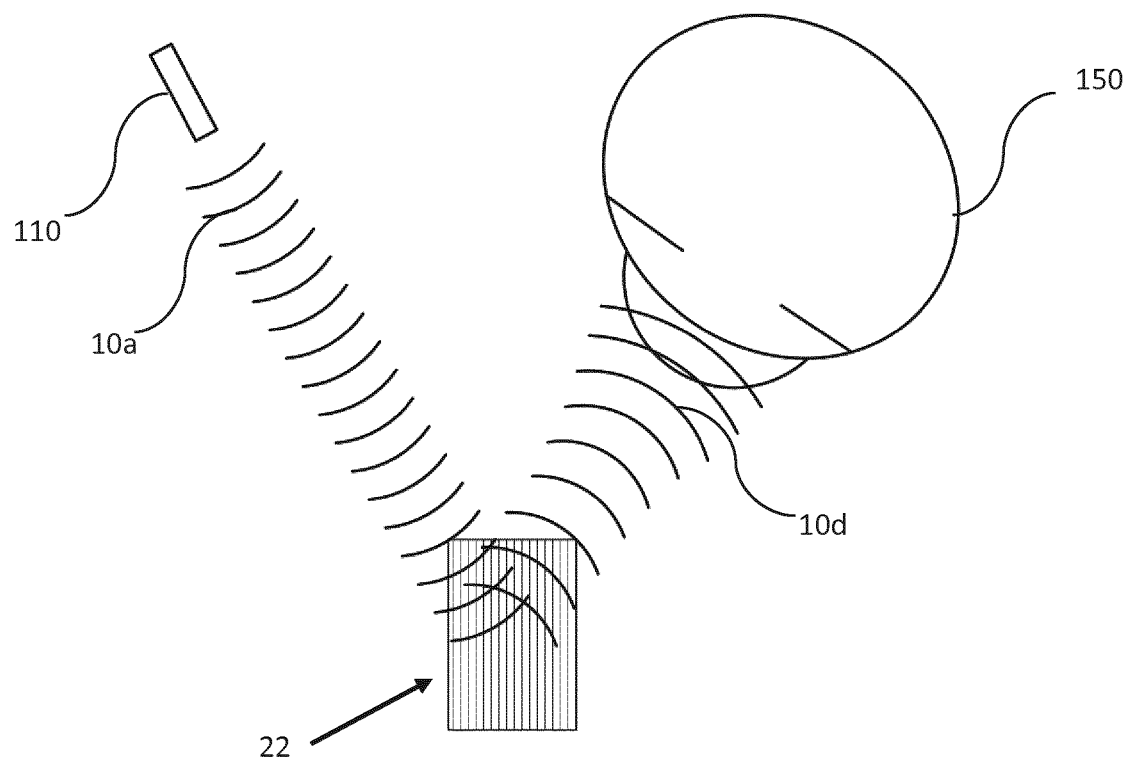
Figure 15B:
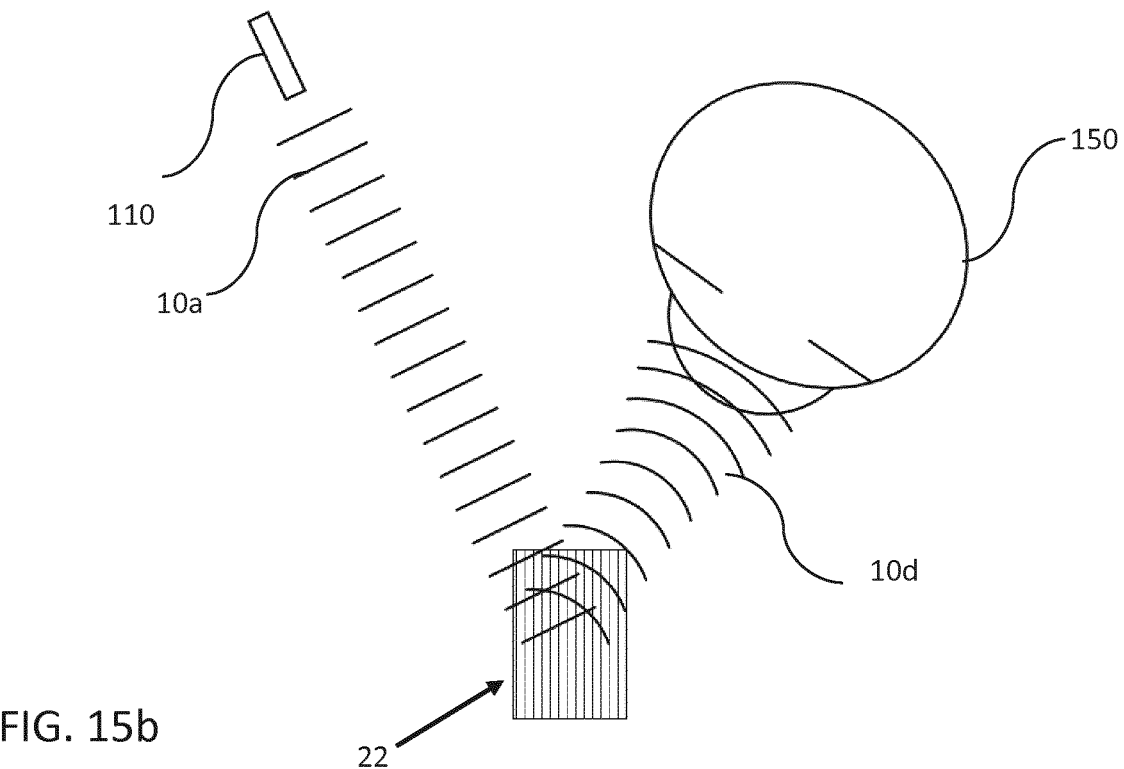
Figure 16A:
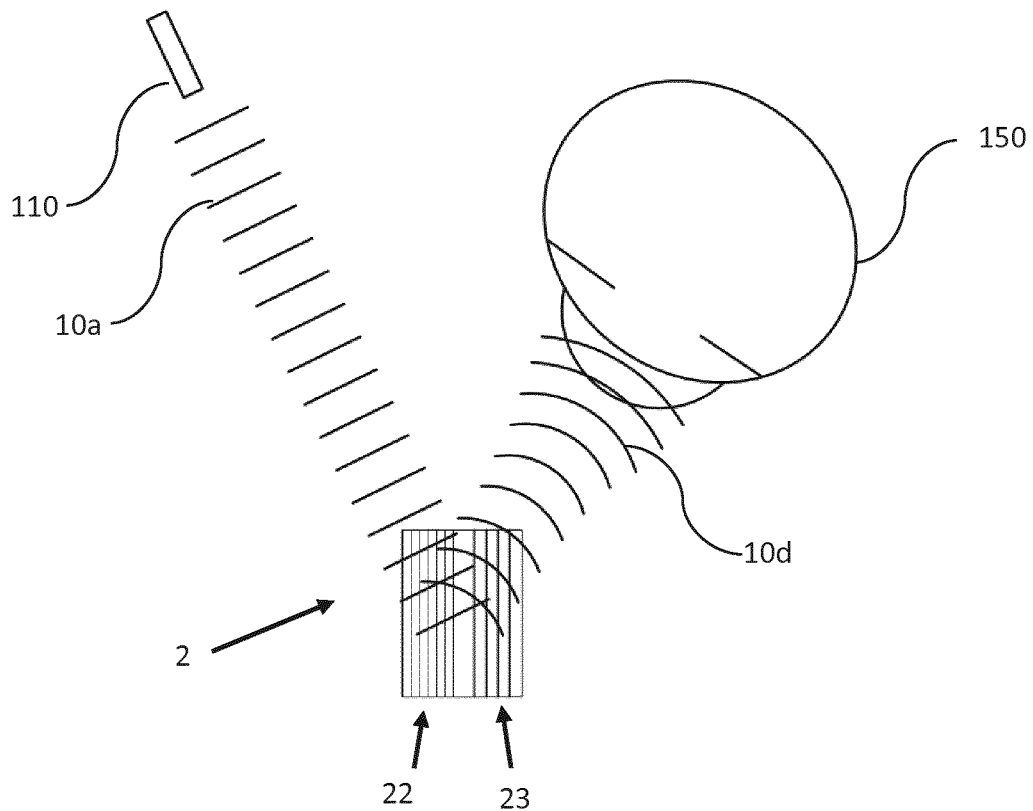
Figure 16B:
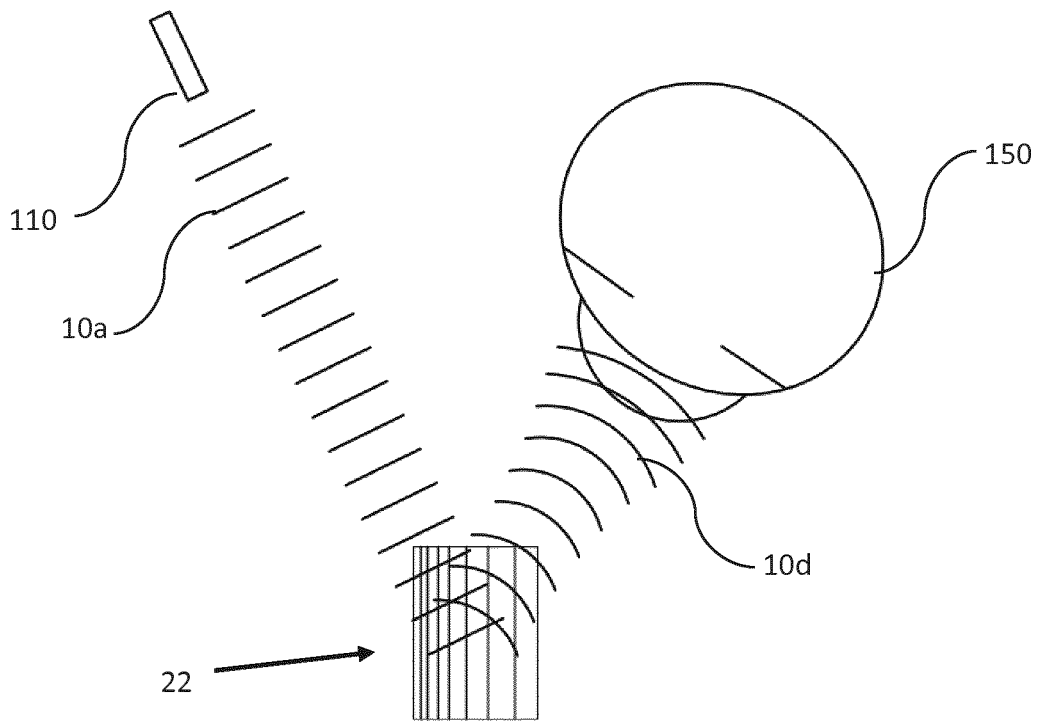
Figure 17:
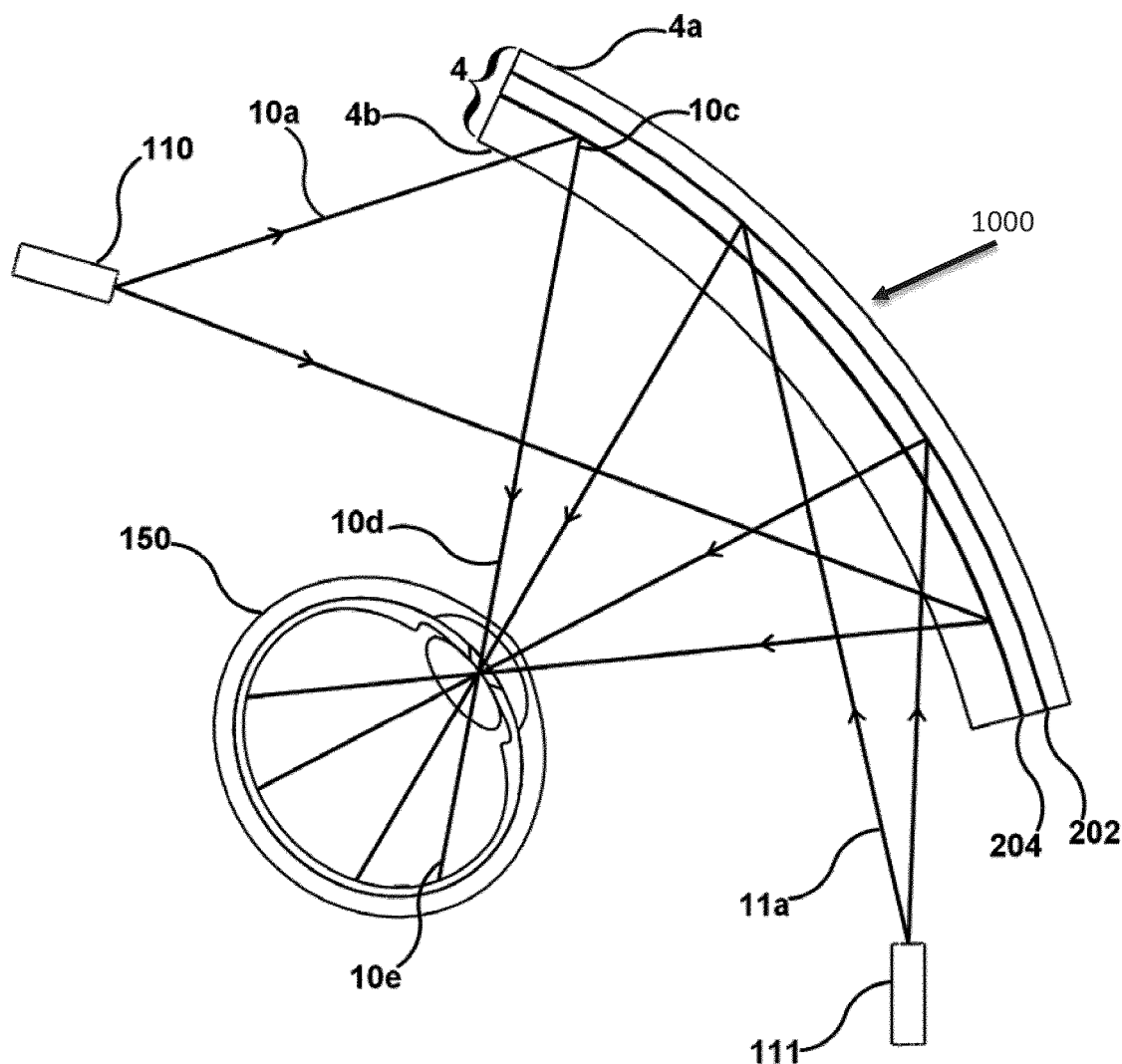
Figure 18:
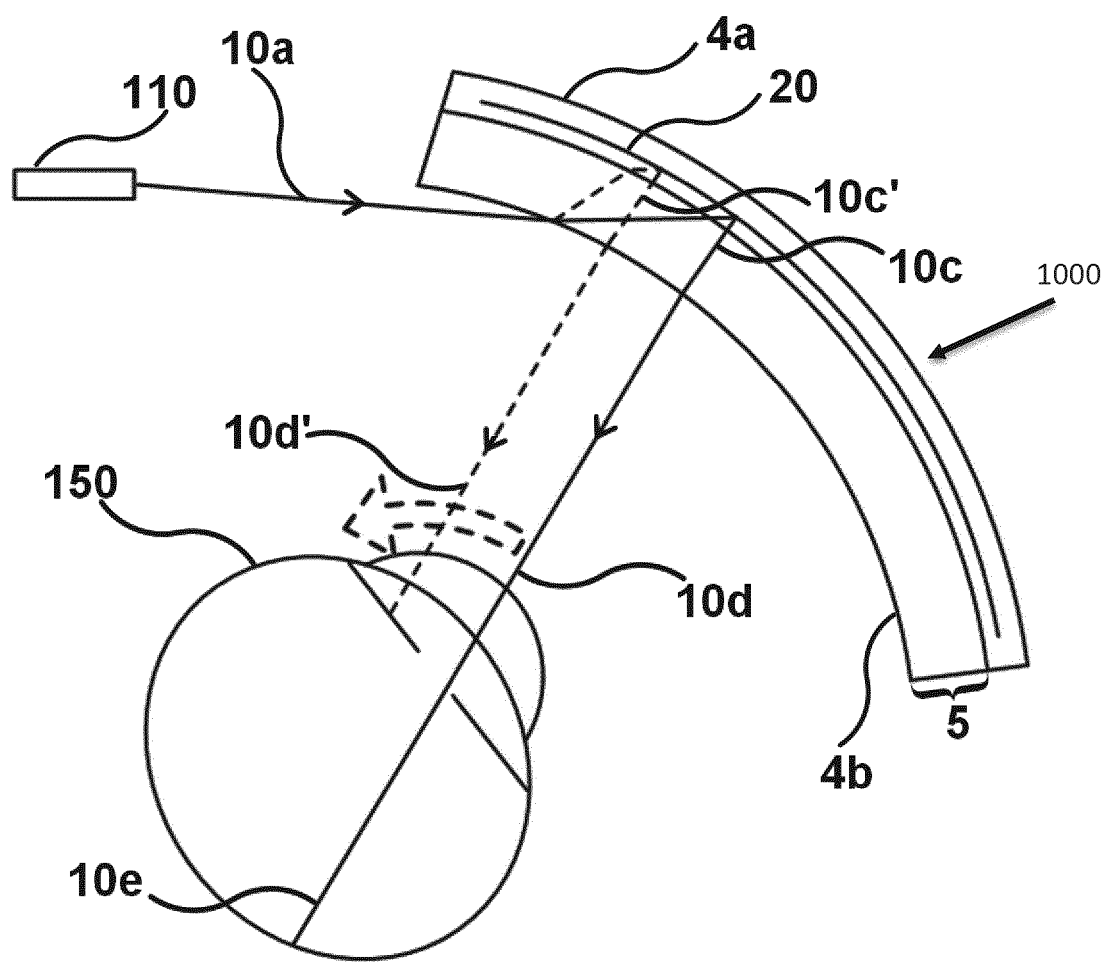
Figure 19A:
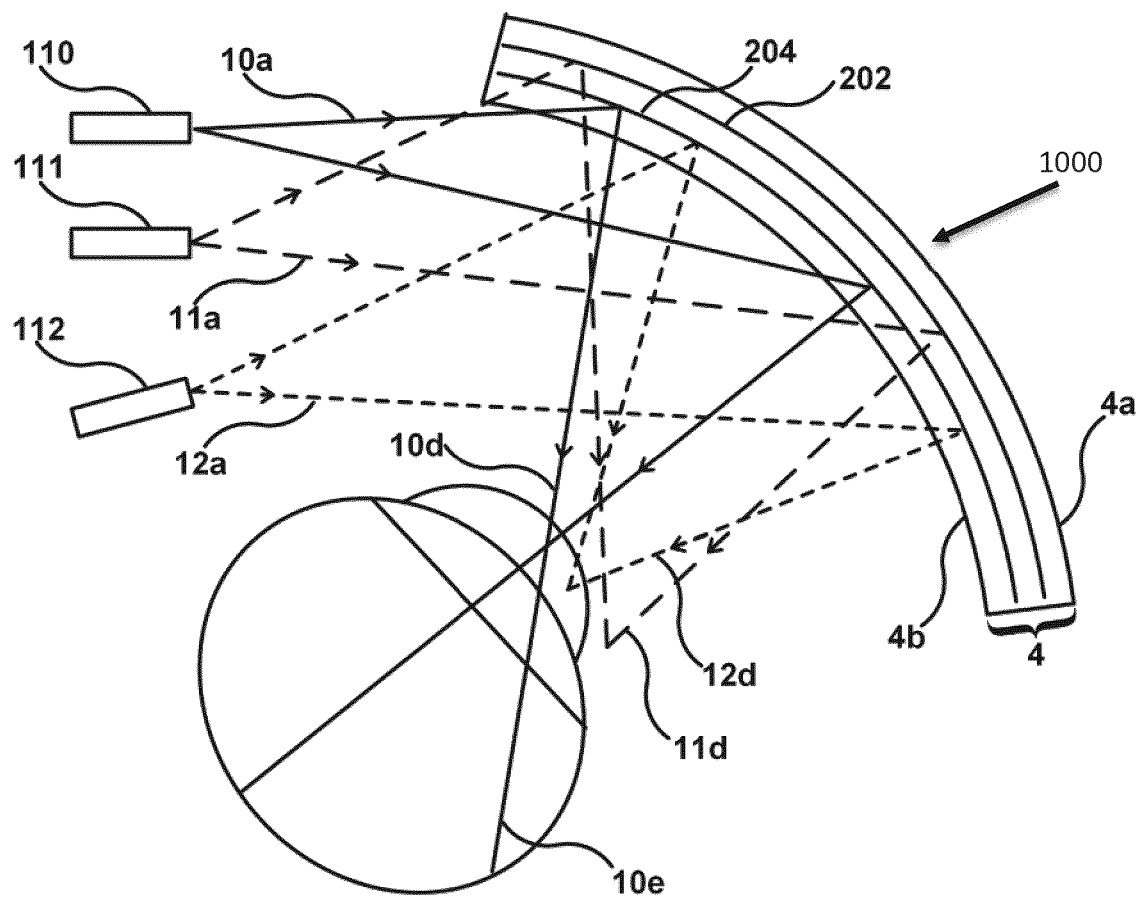
Figure 19B:
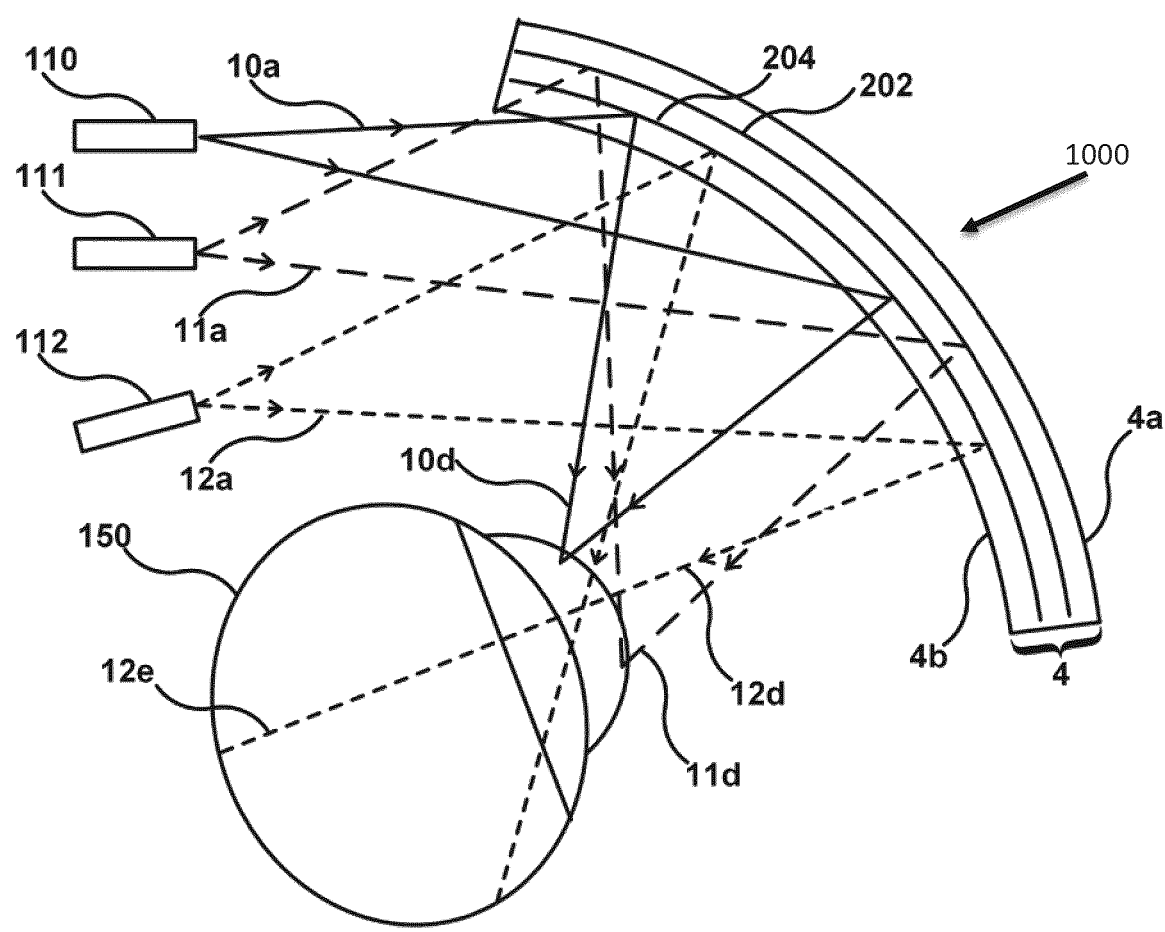
Figure 20:
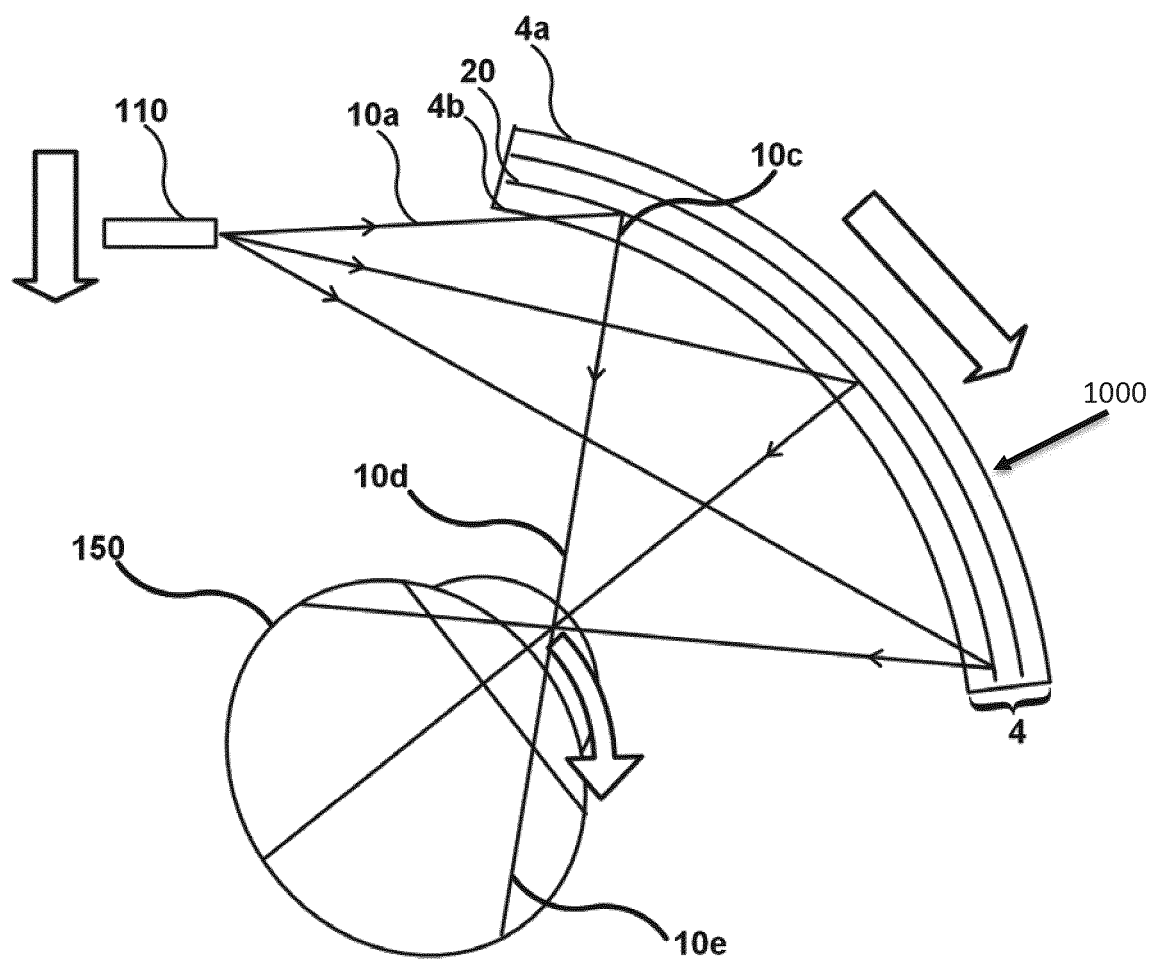
Figure 21:
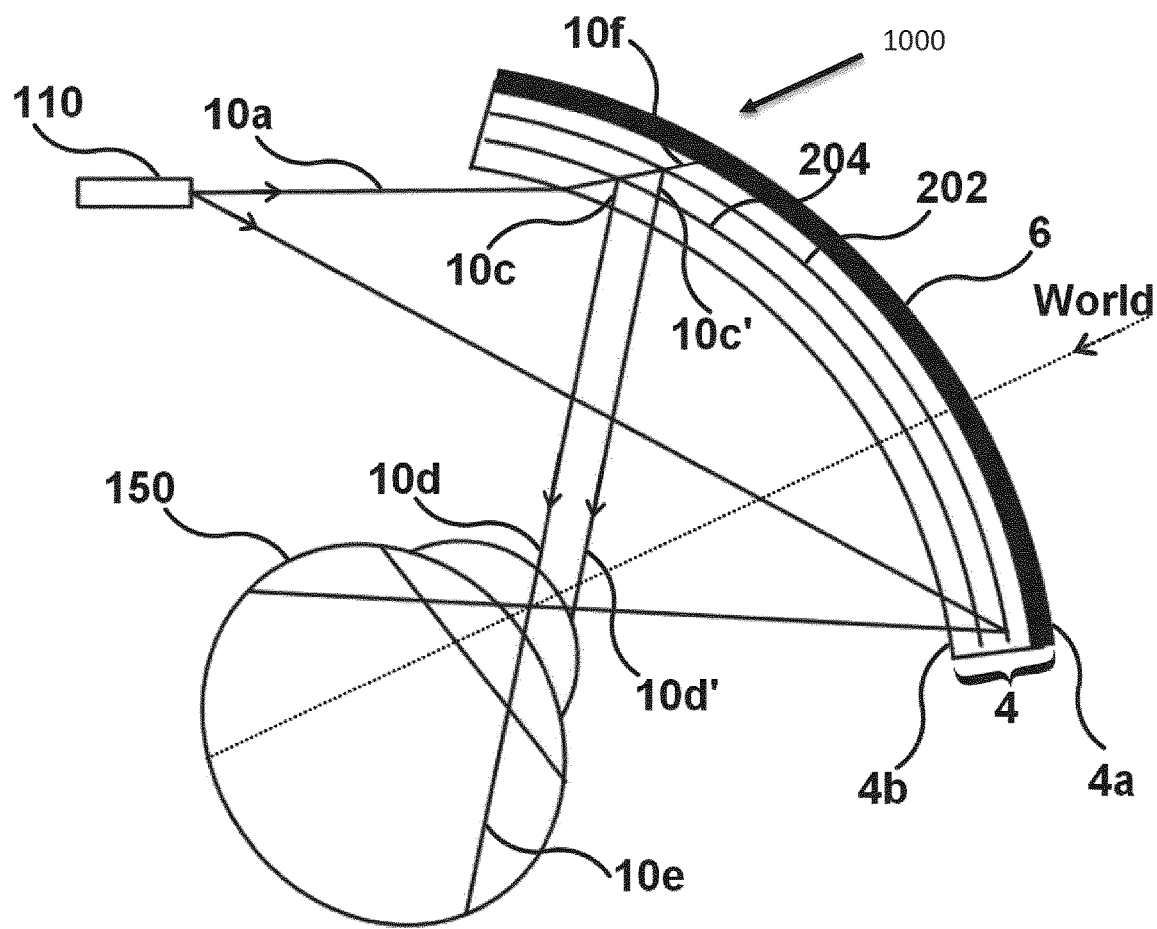
Figure 22:
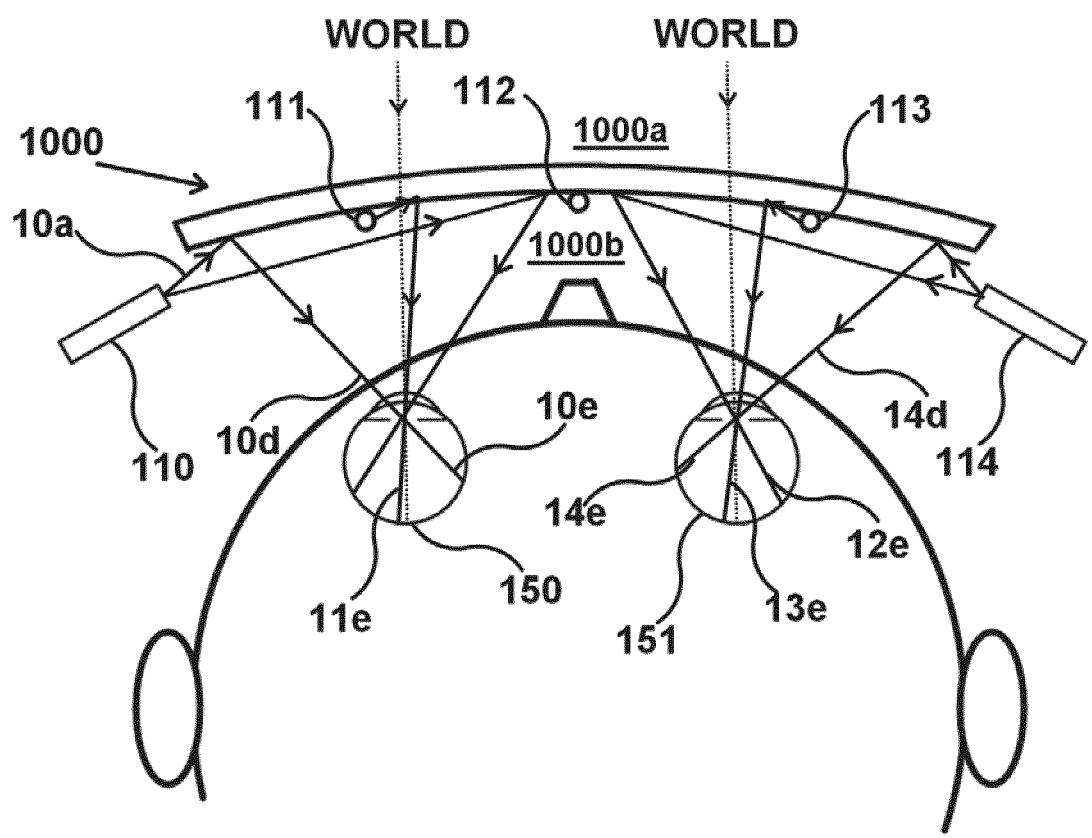
Figure 23:
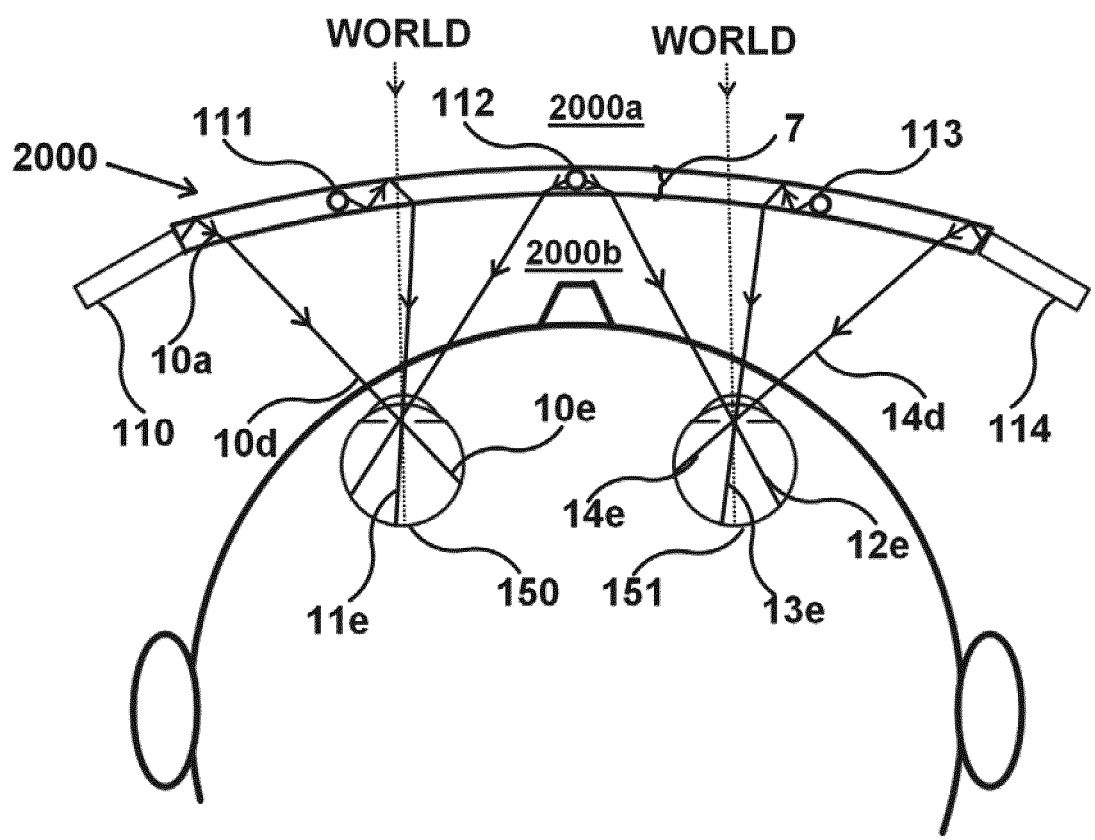
Figure 24:
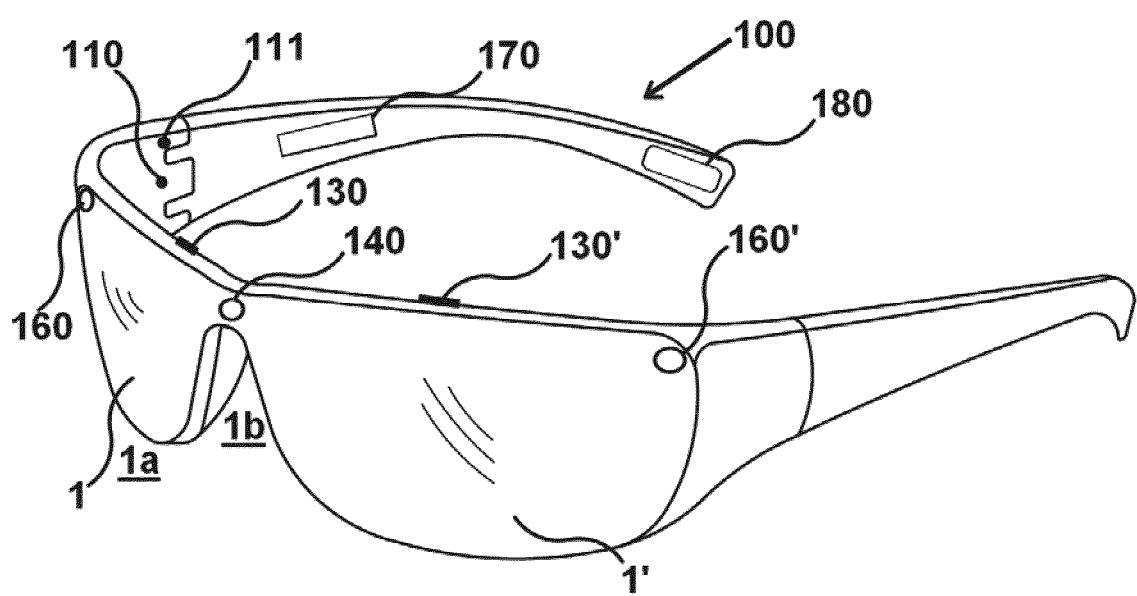
Figure 25:
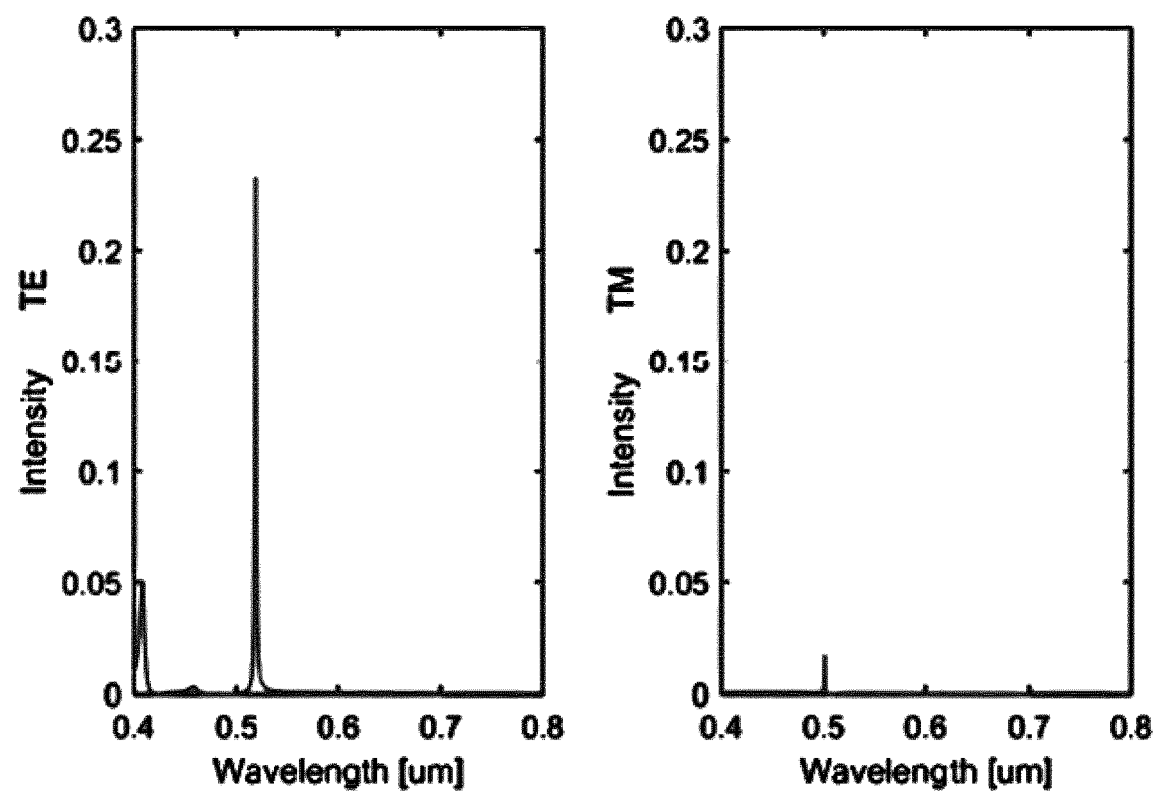
Figure 26:
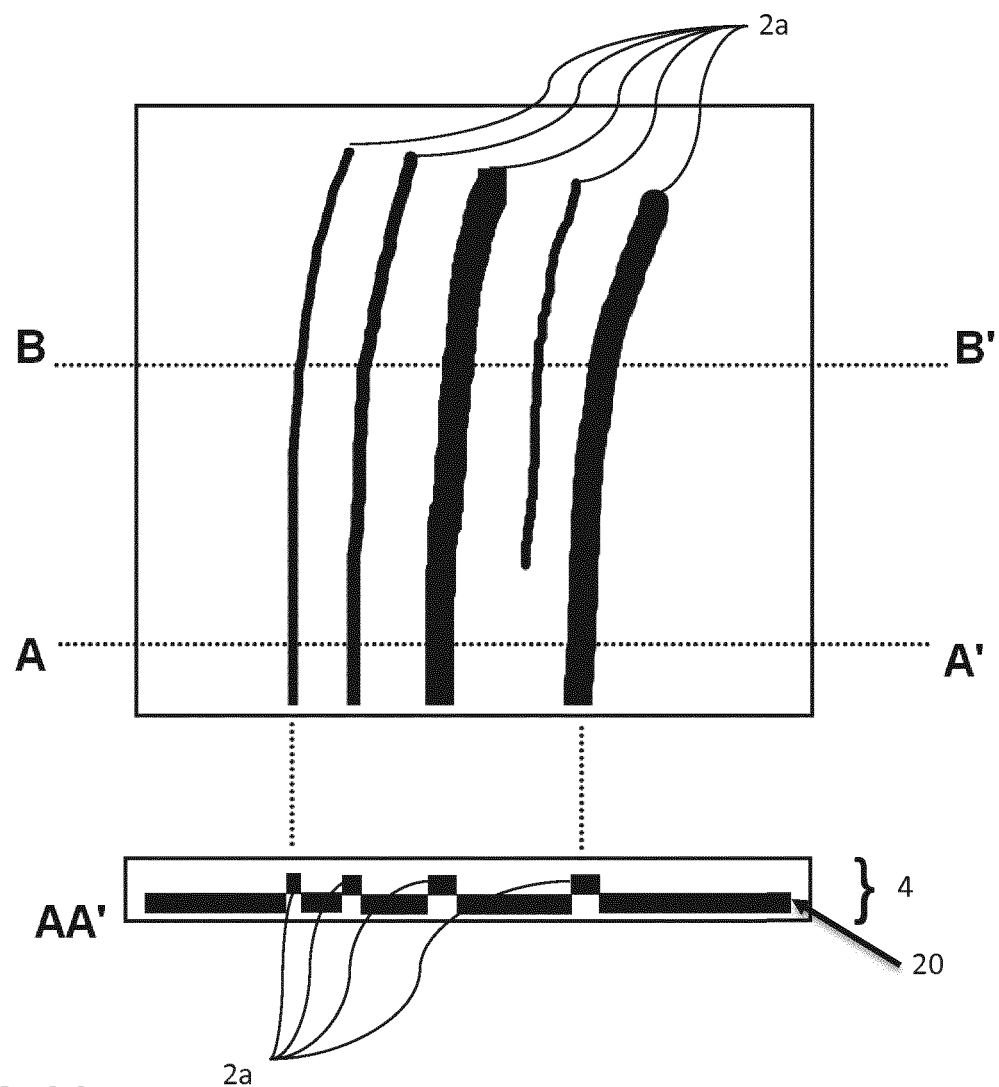

FIG. 9 illustrates the redirection of 4 fractions of two optical beams, provided by a lightguide, by two portions of a resonant waveguide grating, arranged to expand the exit pupil of a light emitter FIG. 10 illustrates the redirection of a fraction of multiple light beams travelling in free-space by an optical combiner comprising a resonant waveguide grating of the invention to the eye of an observer;

FIG. 11 illustrates the redirection of a fraction of multiple light beams travelling in free-space in transmission and reflection configurations by a curved optical combiner comprising two resonant waveguide grating of the invention;

FIG. 12 illustrates the redirection of a fraction of multiple light beams travelling in free-space by an optical combiner comprising three resonant waveguide grating of the invention;

FIGS. 13a and 13b illustrate the projection of virtual images by an optical combiner with different focal lengths;

FIGS. 14a and 14b illustrates the projection of virtual image points located at different focal length relative to an optical combiner with different eye accommodations;

FIG. 15a illustrates the redirection by a resonant waveguide grating of the invention of a fraction of a light beam provided by a light emitter to the eye of an observer having a non-planar wavefront;

FIG. 15b illustrates the redirection by a resonant waveguide grating of the invention of a fraction of a light beam provided by a light emitter to the eye of an observer having a non-planar wavefront;

FIG. 16a illustrates the redirection by two portions of a resonant waveguide grating of the invention of a fraction of a light beam provided by a light emitter to the eye of an observer having a non-planar wavefront;

FIG. 16b illustrates the redirection by a non-homogeneous resonant waveguide grating of the invention of a fraction of a light beam provided by a light emitter to the eye of an observer having a non-planar wavefront;

FIG. 17 illustrates an optical combiner comprising two resonant waveguide grating of the invention having a complex 3D-curved shape;

FIG. 18 illustrates an optical combiner comprising a resonant waveguide grating of the invention and an index layer comprising means to modulate the refractive index of the layer so as to modify the exit pupil of the optical combiner;

FIG. 19a and FIG. 19b illustrate an optical combiner comprising various portions of resonant waveguide grating of the invention located on a single or on multiple waveguiding layers, expanding the exit pupil of the optical combiner;

FIG. 20 illustrates an optical combiner comprising a resonant waveguide grating of the invention configured to be translated or configured to receive light from a light emitter being translated in respect to the optical combiner;

FIG. 21 illustrates an optical combiner comprising a plurality of resonant waveguide grating of the invention operating with light received from a common emitter and illustrates a selective absorption or reflection layer;

FIG. 22 illustrates an optical combiner comprising two different exit pupils in a configuration with light impeding from free-space;

FIG. 23 illustrates an optical combiner comprising two different exit pupils in a configuration with light impeding from a lightguide;

FIG. 24 illustrates a near-to-the-eye display apparatus;

FIG. 25 illustrates a spectrum of redirected light by a resonant waveguide grating of the invention located in the visible spectral range;

FIG. 26 illustrates a portion of a resonant waveguide grating of the invention comprising a set of subwavelength structures comprising five curved ridges.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout.

Previous work aiming at redirecting light-beams away from the specular reflection direction using resonant waveguide-grating have used two or more discrete resonant-waveguide gratings arranged to be in optical communication through a waveguiding layer. The waveguiding layer in such a case is corrugated in different locations by gratings of different periods and/or different orientation, and have at least two gratings of different grating-vectors (k-vector). This is described for example in documents WO 2015096859 and WO 2017137127.

In such a configuration, each of the separate gratings is substantially homogeneous and is operable exclusively for the incoupling or for the outcoupling of each beam respectively from an incident beam into one of the guided mode or from a guided-mode into a emitted beam, using a diffraction event. Said separate gratings are different by having at least different grating vectors and cannot incouple and outcouple the same portion of an incident light beam into an identical mode of said waveguiding layer. Different guided modes can possibly be incoupled by the same grating, used as an incoupler, while another mode may be outcoupled by that same grating as an outcoupler but the same portion of an incident light beam will not be incoupled by different gratings into the same guided mode over the same guided direction. Such a configuration fundamentally relies on discrete incoupling and outcoupling areas, spatially discretized by each grating defining each a resonant waveguide-grating. It is possible to arrange a plurality of pairs of such resonant-waveguide gratings so that they cooperate optically by making sure that their redirected beams are in phase to interfere constructively.

It is of interest to achieve spatially continuous beam redirection in order to improve for example, but not limited to, optical efficiency, optical homogeneity, color selectivity, angular selectivity or wavefront continuity of redirecty light. Experimental work has been performed to try to minimize the surface of each grating of a pair of resonant-waveguide gratings to provide some of this improvements. However, reducing the size of the separate incoupling or outcoupling gratings, possibly down to only a few grating periods—for example 10, 5 or 3 pairs of grooves and ridges—leads to severe drawbacks. The spectral and/or angular selectivity of the light incoupling and redirection decreases dramatically and many artifacts occur.

Resonant-waveguide gratings operate selectively due to resonances between the leaky incoupled modes and the incident light. Reducing the size of a resonant-waveguide grating reduces dramatically the filtering and selectivity properties of such a resonant waveguide-grating. Additionally, the resonances and interferences occurring between adjacent resonant waveguide gratings are increasingly important over the resonances and interferences inside a resonant waveguide-grating with the decreasing size of adjacent resonant waveguide gratings.

To the opposite of such configurations, it is an object of the invention to propose a new type of resonant-waveguide grating relying on a plurality of subwavelength structures having a specific arrangement of at least two adjacent grooves and two adjacent ridges as further explained. The plurality of subwavelength structures of the invention does not rely only on a regular arrangement of grooves and ridges as in an homogeneous grating. Prior art arrangements are limited to zero-order diffraction events, and possibly direct first or minus-first order diffraction effects, so they do not allow light redirection at any specified angle with a specified color or angular selectivity.

On the opposite, the specific configuration of the plurality of subwavelength structures object of the invention enable, when combined with a waveguiding layer, to perform both the incoupling in a single guided-mode, and the outcoupling from this guided-mode, of a fraction of an incident light-beam to an arbitrary chosen redirection angle. Indeed the incoupling, leaky-mode guiding and outcoupling is performed by the same plurality of subwavelength structures in the same portion of the waveguiding layer. This new type of resonant guided-mode device 1 of the invention enables a continuous light beam redirection, not relying on discrete separated resonant-waveguide gratings.

The plurality 2 of subwavelength structures 2a of the invention comprises at least two different types of grooves or ridges or has a non regular spacing between the grooves and ridges, i.e. having a non periodic spacing of similar or identical grooves or ridges. The different types of grooves or ridges of the plurality 2 of subwavelength structures 2a have different profiles and/or depths and/or sizes and/or spacings. The spatial Fourier transform of such plurality 2 of subwavelength structures 2a contains always more than a single spatial frequency component, to the opposite of a regular and homogeneous grating, for example a grating having a sinusoidal profile.

The guided mode resonant device obtained by the combination of said plurality 2 of subwavelength structures 2a, at least a waveguiding-layer, and the medium surrounding the waveguiding layer (called generically the substrate of the guided mode device, having possibly a cladding function in respect to the waveguiding layer) is not a regular resonant-waveguide grating. By anology to so-called optical meta-surfaces or meta-lenses, as published in the scientific literature based on local resonators, some of them using vertical guided-mode resonances, the resonant-waveguide grating 1 of the invention can be called a meta resonant waveguide-grating or a meta-surface relying on horizontal guided-mode resonances. However, for simplicity, the wording used in the present application for the grating 1 of the invention is a resonant waveguide-grating 1, being understood that the resonant waveguide-grating 1 of the present invention does not rely on a regular periodic arrangement of a single groove and ridge as is the case of the resonant waveguide-gratings of prior-art.

Because of the non regularity of the plurality 2 of subwavelength structures 2a supporting the resonant-waveguide-grating 1 of the invention, the distance between at least two adjacent ridges and two adjacent grooves part of these subwavelength structures is different. Given the many different possible shapes of subwavelength structures, this distance is defined as the distance between the center of the at least two adjacent ridges, respectively two adjacent grooves. As an example, the center of the ridges and grooves can be defined as the lowest part, respectively higher part of the grooves, respectively the ridges. Ridges of sinusoidal or pseudo-sinusoidal profiles are illustrated in the schematic cross-section view of FIG. 2. For a resonant-waveguide-grating 1 based on binary shape subwavelength structures, quasi binary structures, multi-level structures or other structures profile with flat top and/or flat bottom, the center of the ridges, respectively grooves are defined as the center of the flat portion having the higher, respectively lower, elevations.

In a preferred embodiment the two adjacent grooves and ridges, whose centers are not separated by the same distances, are themselves adjacent to each other, or interlaced, so that one of these two adjacent grooves is located between the two adjacent ridges. Grooves and ridges may have different elevations relative to the plane of the waveguiding layer 20. Alternatively, this configuration is equivalent to the configuration of two adjacent ridges being located between two adjacent grooves.

In an embodiment, the plurality of subwavelength structures are designed to collectively incouple and outcoupled light from an incident light beam away from its specular reflection and direct transmission. In a variant light may be redirected along the specular reflection of the waveguiding layer or along the direction of the direct transmission of the incident light beam. However the redirection of a light beam with the resonant waveguide-grating object of the invention can be achieved at many different angles and even usually at any arbitrary angle.

In an embodiment a resonant-waveguide grating comprises a plurality of subwavelength structures comprising grooves and ridges having at least two different sizes and/or shapes of adjacent ridges and/or two different sizes and/or shapes of adjacent grooves. The various ridges and grooves define a plurality 2 of subwavelength structures 2a which are not homogeneous and having at least two different grooves adjacent and different to each other or two different ridges adjacent and different to each others. The local optical resonances of these different subwavelength structures have different spectral and/or angular dependencies due to their different geometries and different distribution in space of the waveguiding layer material. The modification of these local optical resonances impact the incoupling and outcoupling in and out of the resonant waveguide-grating 1.

Additionally, the spacing between various adjacent grooves and ridges may vary due to the different ridges and grooves, creating various local periodicities as well as the effective index of the waveguide modes that may change due to various ridge or groove profiles. Local changes of both the effective spatial periodicity and waveguide mode effective index allow to influence the leaky-mode propagation and therefore the optical interferences between the leaky guided-mode and the incident light beam, in turn impacting the incoupling and outcoupling of light by the resonant waveguide-grating of the invention. Local changes of both the effective spatial periodicity and waveguide mode effective index allow to influence as well the re-emitted electromagnetic wave by modifying the interferences in the near-field as well as in the far-field, as an example shaping the wavefront or the spectral distribution of a redirected electromagnetic-wave (light-beam).

A set comprising a plurality 2 of subwavelength structures 2a of the resonant waveguide-grating 1 having at least two different size and/or shape of adjacent ridges and/or two different size and/or shape of adjacent grooves, with respect to prior-art resonant waveguide-gratings, may create different local resonances and/or different leaky guided-mode propagation, and/or modification of the near-field interferences or far-field wavefront propagation. The optical effects provided by local variations of the physical and geometrical parameters of the plurality 2 of subwavelength structures 2a allow to provide means to optically tune the redirected light-beam such as the tuning of efficiency, spatial distribution, angle of propagation or wavefront shaping As example, various resonant waveguide-gratings 1 of the invention containing different sets of pluralities 2 of subwavelength structures 2a comprising various different ridges and/or grooves may be implemented to redirect identically a spectral portion of a light beam towards the same direction, but behave differently in another spectral portion, and/or under another incidence angle of light, and/or the use of another light polarization.

Figure 1:
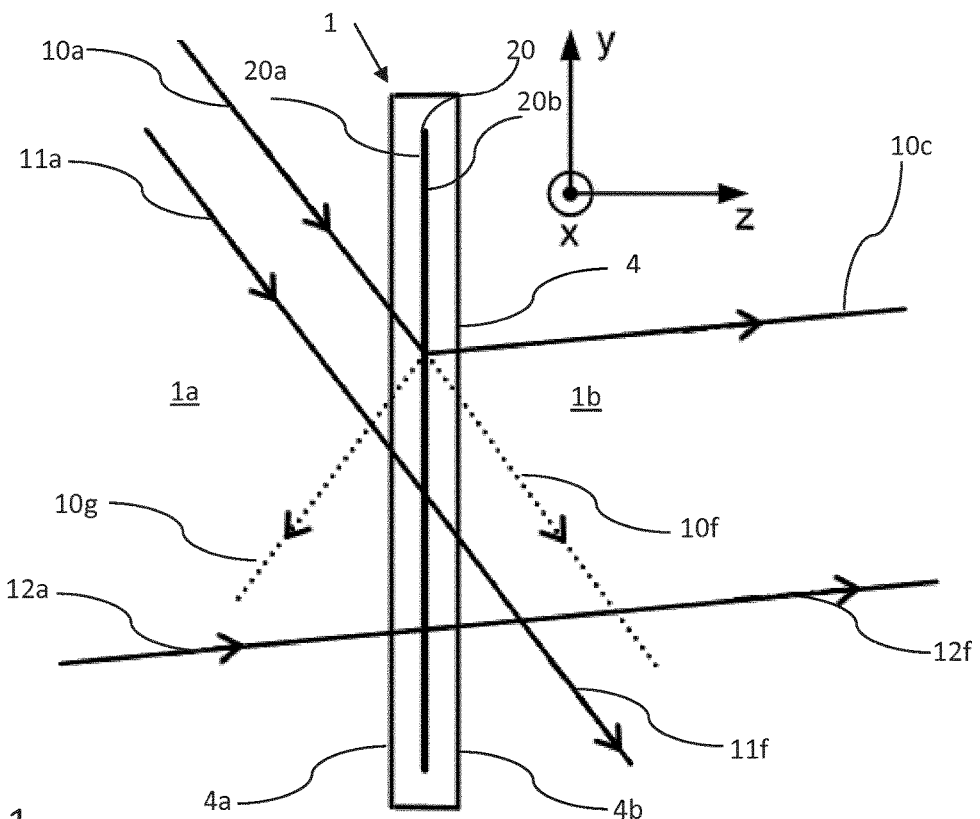
FIG. 1 illustrates a cross-section view of a resonant waveguide grating of the invention redirecting a part of an incident light beam.
Figure 2:
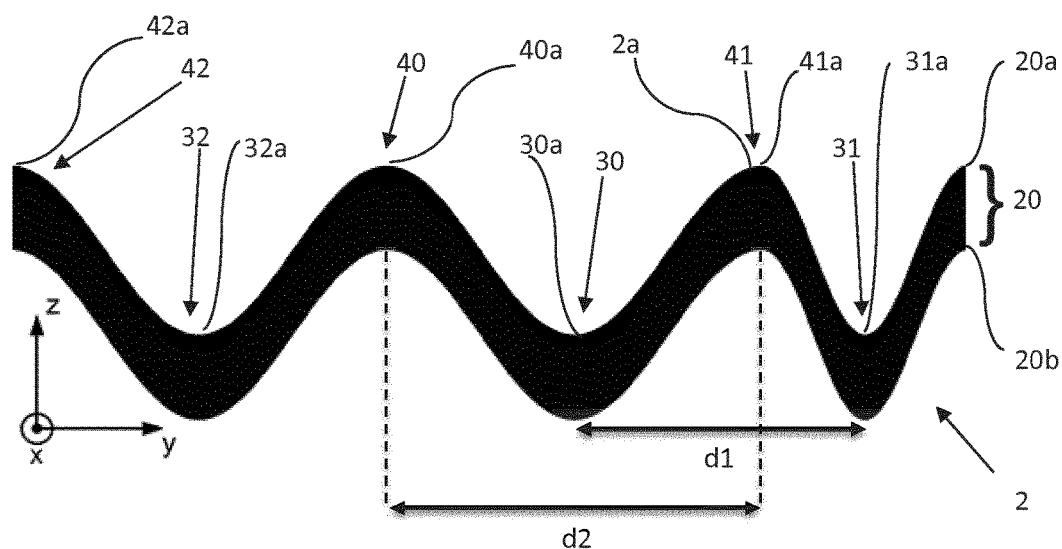
FIG. 2 illustrates a cross-section view of a plurality of subwavelength structures of a resonant waveguide grating of the invention.
Figure 3A:
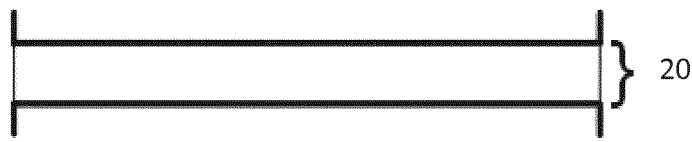
FIG. 3a-3h illustrates a cross-section view of different waveguiding layer configurations.
Figure 3B:
Figure 3C:
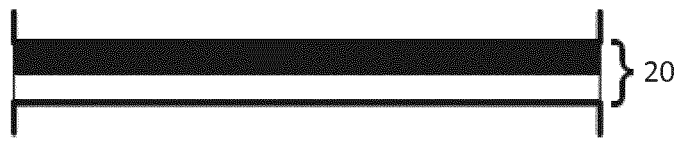
Figure 3D:
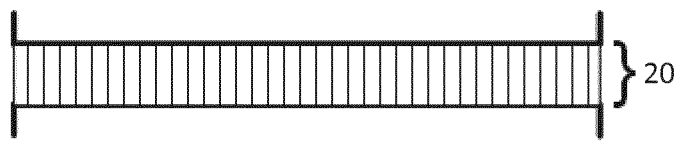
Figure 3E:
Figure 3F:
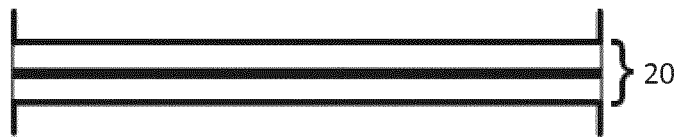
Figure 3G:
Figure 3H:

FIG. 1 and FIG. 2 illustrate a preferred embodiment of a resonant waveguide grating 1 of the invention.

The resonant waveguide grating 1 defines a first side 1a and a second side 1b opposite to said first side 1a and comprises:
  a substrate layer 4 defining a first substrate surface 4a and a second substrate surface 4b facing said first substrate surface 1a;
  a waveguiding layer 20, having a first waveguiding surface 20a and a second waveguiding surface 20b, arranged on said substrate layer 4, and having a predetermined permittivity function defined in the direction perpendicular to said first waveguiding surface 20a;
  a plurality 2 of subwavelength structures 2a defining an X-Y plane, illustrated in FIG. 1. A vertical axis Z is defined perpendicular to the X-Y.

The substrate is usually a highly transparent material in the wavelength range of interest and has low haze. As described further it can comprise multiple layers having different optical functions.

A plurality 2 of subwavelength structures 2a may be arranged in different ways.

A portion 22 of the waveguiding layer 20 is defined as a predefined area of the resonating waveguide grating 1 comprising at least one set of a plurality 2 of subwavelength structures 2a, said set being arranged to perform at least a predetermined optical function. A portion 22 of the waveguiding layer 20 may comprise a wide variety and a great number of such sets as illustrated in for example FIGS. 4a-6b. FIG. 4c illustrates a single set of a plurality 2 of subwavelength structures 2a. FIG. 6a illustrates a periodic set of a plurality 2 of subwavelength structures 2a. A portion 22 of the waveguiding layer 20 may comprise a wide variety and a great number of such sets as illustrated in for example FIGS. 4a-6b. An example of said predetermined optical function performed by a portion 22 is to direct at least an outcoupled fraction of an incoupled portion of an incident light beam by said portion 22 into a specific direction and for a predetermined wavelength. More complex optical functions such as redirecting an image beam of multiple beams of different colors/wavelength may be performed by more than one of said portion 22. FIG. 26 illustrates an exemplary arrangement of a set of a plurality 2 of subwavelength structures 2a.

The waveguiding layer 20 is configured to guide at most ten wave-guided light modes in the predetermined wavelength range. Preferably said predetermined wavelength range is located in the UV, visible or infrared ranges, said visible wavelength range being defined as light having a wavelength between 370 nm and 800 nm. The waveguiding layer has therefore a very-thin dimension in the direction normal to the layer. For example, it may be thinner than 3 micron, preferably thinner than 1 micron and more preferably thinner than 200 nm. For optical applications outside the visible range such as in the UV or infrared (IR) ranges, materials suited for the waveguiding-layer in such optical ranges may not allow the wave-guiding of light in the visible range, as for example silicon.

In a variant, said predetermined wavelength λ is comprised between 380 nm and 1200 nm and in that said predetermined spectral width Δλ, defined as being the full width half maximum of the optical spectrum of said outcoupled fraction 10c, is less than 100 nm, preferably less than 80 nm, more preferably 50 nm. Because of angular and spectral tolerances of arrangement with light emitters, said predetermined spectral width Δλ is preferably larger than 0.1 nm, more preferably larger than 0.5 nm and can be larger than 1 nm or larger than 3 nm using a spectrally broad-enough light source in said light-emitter 110. Additionally, the spectral width Δλ of the incoupled mode 10b can be engineered by modifying the leakiness of said resonant waveguide-grating 1.

In a variant, at least one of said incoupled portions 10b propagates in said waveguiding layer 20 in the fundamental mode of the waveguiding layer 20, this mode being either the fundamental, also defined as zero, transverse electric mode (TE0) or the fundamental transverse magnetic mode (TM0). This configuration may allow to engineer a waveguiding layer 20 supporting only a single guided mode, the fundamental guided mode of said waveguiding layer 20 and being extremely thin. This is for example realized by using a very thin waveguiding layer 20, for example thinner than 200 nm or even preferably thinner than 100 nm for light in the visible wavelength range. This high selectivity of the light incoupling, and outcoupling, capability of the resonant waveguide-grating 1 may have a high transparency in a broad spectral and angular range and a very high selectivity of the light being possibly redirected. Said a broad spectral range may be for example wavelength between 400 nm to 800 nm. Said angular range may be a 45° angular range from which neglictible incident light would be redirected. Said high selectivity may be for example a spectral bandwidth defined at full width half maximum of less than 20% of the central wavelength redirected, i.e. 100 nm for a central wavelength of 500 nm, preferably less than 10%, more preferably less than 5%, even more preferably less than 3% of the central wavelength redirected. Said high selectivity maybe in an angular range of a full angular range at half maximum light redirection efficiency of less than 20°, preferably less than 10°, more preferably less than 5°.

Said high transparency of the resonant waveguide-grating 1, defined perpendicular to said waveguiding layer 20, may be higher than 50%, preferably higher than 70%, more preferably higher than 80% and even more preferably higher than 90% for light in the wavelength range of interest of the resonant waveguide-grating for light provided by a light source facing said front side 1a. Using very low mode and preferably a monomode waveguiding layer 20 and/or very small subwavelength structures 2a, for example smaller than a quarter of a wavelength, allows to diffract light only into resonant incoupling into said waveguiding layer, as described before, the resonant waveguide grating 1 can be designed to be highly spectrally and angularly selective, allowing very low parasitic diffraction and haze and very high transparency.

The wave-guided layer 20 may be made of different materials located in different layers as defined normal to the waveguiding layer and may contain micro or nano-composite materials. The waveguiding-layer 20 may be defined by its permittivity cross-section on the axis normal to the waveguiding-layer 20 as well as its dispersion, eventual light scattering or light absorption, surface roughness. The waveguiding-layer 20 may not be perfectly homogeneous over the plurality of the subwavelength structures 2 because of, for example, different local slopes of the subwavelength structures 2, possibly creating local wetting variations or different material projection for wet or vacuum deposition technique, or due to material deformation in the case of manufacturing with embossing structuration technique.

The plurality 2 of subwavelength structures 2a comprises at least two adjacent grooves 30, 31 defining each a groove center 30a, 31a and comprise at least two adjacent ridges 40, 41 defining each a ridge center 40a, 41a, said two adjacent grooves 30, 31 having a subwavelength distance d1 between their centers 30a, 31a being different than the subwavelength distance d2 between the centers of said two adjacent ridges 40, 41.

Said plurality 2 of subwavelength structures 2a are arranged to be in optical communication through said waveguiding layer 20 which permittivity function and the dimension and orientation of said plurality 2 of subwavelength structures 2a are chosen so that the plurality 2 of subwavelength structures 2a couples resonantly, by diffraction, into said waveguiding layer 20 at least an incoupled portion 10b of an incident light beam 10a, provided by a light emitter 11 into at least one of said at most ten wave-guided modes of the waveguiding layer 20. As described further, FIGS. 15a, 15b, 16b for example illustrate a resonant outcoupling by a portion 22 of a resonant waveguide grating 1 of the invention.

It is understood that the substrate layer 4 may be flat or curved and that said plane is defined at least locally, locally meaning that it comprises at most ten subwavelength structures in one dimension. It is understood that in practice a realized resonant waveguide grating 1 may have a dimension of more than 10×10 mm and may comprise more than $10^5$ subwavelength structures in one dimension, for example the x or the y directions.

In an example suited for visible light applications d1 is between 50 nm and 800 nm and d2 is between 30 nm and 600 nm.

Typical ranges of d1 and d2 are between 80 nm and 500 nm for the visible range, preferably between 100 nm and 400 nm.

Said plurality 2 of subwavelength structures 2a are configured to couple out of said waveguiding layer 20 resonantly by diffraction, an outcoupled fraction 10c of said at least an incoupled portion 10b;

Said outcoupled fraction 10c of said at least incoupled portion 10b has a predetermined central wavelength $\lambda_0$ in said ultraviolet or visible or infrared wavelength range and has a predetermined spectral width Δλ, said outcoupled fraction 10c being a diffracted part of the incident light beam 10a. In some configuration, the outcoupled fraction 10c has a spectral distribution comprising various spectral peak efficiencies in the predetermined spectral width Δλ as detailed further in the experimental results. Different spectral components of the outcoupled fraction 10c of a polychromatic incident light beam 10a may be redirecting to different angle because of the spectral angular dispersion due to the diffraction events and eventually due to the refractive index dispersion of the resonant waveguide grating 1 materials.

FIG. 1 illustrates the wavelength and/or angular and/or polarization selectivity of the resonant waveguide grating 1. A waveguiding layer 20 is embedded in a substrate layer 4 between its first substrate surface 4a and its second substrate surface 4b facing said first surface 4a. The waveguiding layer 20 having a first waveguiding surface 20a facing said first substrate surface 4a and a second waveguiding surface 20b facing the second substrate surface 4b. The plurality 2 of subwavelength structures 2a in optical proximity to the waveguiding layer are not represented in this cross-section schematic because of their dimensions, which are usually much smaller than for example the substrate layer 4 dimensions. The corrugation and the structuration of the waveguiding layer linked to the plurality 2 of subwavelength structures 2a is as well not represented at this scale for the same schematic.

In an example, illustrated in FIG. 1, various incident light beams 10a, 11a, 12a are impeding on the resonant waveguide grating 1 from the first substrate surface 4a and are incident on the waveguiding layer 2 on said first waveguiding surface 20a. The light beam 10a is partially diffracted by the resonant waveguide grating 1 into the outcoupled light beam fraction 10c, exiting the substrate at the second substrate surface 4b. This beam is matching a resonance condition of the resonant waveguide-grating 1 and for this reason it is at least partially redirected. The outcoupled light beam fraction 10c may be redirected towards the first substrate surface 4a. For such an incident light beam 10a and an outcoupled light beam fraction 10c outcoupled from the waveguiding layer on the side of the first waveguiding surface 20a and towards the first substrate surface, the configuration is called a reflective light beam redirection. On the opposite a configuration in which such an incident light beam 10a impeding on the first waveguiding surface 20a is at least partially incoupled, so that the outcoupled light beam fraction 10c outcoupled from the waveguiding layer from the second waveguiding surface 20b is called a transmissive redirection.

Multiple redirected light beams 10c, being fractions of outcoupled leaky guided mode in the waveguided layer 20 may be generated from a single incident light beam 10a impeding from the first substrate surface 4a side, in both transmissive and reflective configurations. The waveguiding layer 20 may also partially reflect and partially transmit the incident light beam 10a in respectively the light beam 10g and 10f as already known with resonant waveguide gratings of the prior-art. As known by the man skilled in the art, the other optical interfaces such as the first and second substrate layer 4a and 4b may as well partially reflect, transmit or totally reflect light beams, which is not illustrated in FIG. 1.

Other incident light beams such as the beam 11a in FIG. 1 may be incident from the same angle on an identical portion of the waveguiding layer 20 but may not be redirected or may be redirected with a very low efficiency due to a different wavelength and/or polarization. An example of such wavelength and polarization selectivity is given in the experimental results and in FIG. 25.

Other light beams with possibly the same wavelength and polarization as the incident light beam 10a but impending at a different angle than light beam 10a such as the incident beam 12a may as well not be redirected or may be redirected with a very low efficiency because of the angular selectivity of the resonant waveguide grating 1 of the invention.

In an embodiment, it is a purpose of the resonant waveguide-grating 1 of the invention to allow wavelength and/or polarization and/or angular selective light beam redirection.

The resonant waveguide-grating 1 of the invention is further illustrated with FIG. 2 representing a schematic cross-section view of an example of waveguiding layer 20 and plurality 2 of subwavelength structures 2a of the invention. The cross-section-view of FIG. 2 represents the waveguiding layer 20 in a normal plane y-z to the waveguiding layer 20. The cross-section view of FIG. 2 represents a cross-section view in a vertical plane y-z and shows details of a part of individual subwavelength structures of a plurality 2 of subwavelength structures 2a.

The plurality 2 of subwavelength structures 2a corrugate the waveguiding layer 20, as these two elements 2, 20 are in contact, the waveguiding layer 20 being therefore non-planar at a subwavelength scale. Due to varying heights of the subwavelength structure in the direction normal to the waveguiding layer 20, the waveguiding layer 20 can be locally non-continuous in a subwavelength dimension. Various arrangements of the waveguiding layer 20 along a plurality of subwavelength structures with subwavelength continuity of discontinuity of the waveguiding layer 20 are illustrated for example in the FIG. 5c to FIG. 5e in a schematic cross-section view. Subwavelength discontinuity of the waveguiding layer 20 may not impede light propagation and guiding over the waveguiding layer 20 because of the subwavelength vertical and horizontal dimensions of the discontinuity.

A resonant waveguide grating 1 of the invention may be manufactured using a surface structuring process such as a nano-imprinting lithography (NIL) technique in order to create or replicate the plurality 2 of subwavelength structures 2a. Such surface structuring process may be executed on a glass substrate, a polymer substrate or other synthetic or ceramic substrates. The plurality 2 of subwavelength structures 2a may be created into the surface of said substrate in processes such as hot-embossing of ultraviolet (UV) embossing. Said plurality 2 may as well be created using an additive process, for example with an additional processing layer or material such as thermoplastic polymer or thermoplastic lacquer or UV lacquer or resin. Alternatively, the subwavelength structures may be realized by an ablation process such as a chemical or plasma etching of a substrate material. The waveguiding layer 20 may be deposited or coated on the plurality 2 of subwavelength structures 2a in order to follow its topography and subwavelength relief. Alternatively, a waveguiding layer 20 may be deposited on a planar surface being afterwards corrugated by an embossing process using a tool structured with the plurality 2 of subwavelength structures 2a.

In a variant, said waveguiding layer 20 is homogenous over a set of a plurality 2 of subwavelength structures 2a comprising a large number of grooves and ridges, having substantially the same thickness and material composition. A common waveguiding layer material can be deposited, coated or diffused on a large plurality 2 of subwavelength structures 2a without patterning it or modifying its composition and permittivity cross-section. As example, adjacent pluralities 2 of subwavelength structures 2a can be engineered to operate in different spectral band, such as Red, Green and Blue (RGB) in the visible range, using a common waveguiding layer 20 by modifying only the grooves 30, 31 and the ridges 40, 41 to be adapted to various wavelength. Especially, their orientation, spatial periodicity, depth and profile can be engineered and structured on a substrate and coated afterwards with a common waveguiding layer 20, such as by using vacuum or atmospheric deposition techniques. Examples of such techniques are Physical Vapor Deposition (PVD), sputtering, Chemical Vapor Deposition (CVD) in vacuum, wet coating, galvanic coating and diffusion doping at atmospheric pressure. Using a common waveguiding layer for a large plurality 2 of subwavelength structures 2a allows manufacturing with cost-effective and high throughput fabrication methods.

The light propagating in the waveguiding layer 20 is influenced by the media in optical proximity to the waveguiding layer 20. The material immediately below and above the waveguiding layer 20 executes a cladding function for the leaky wave-guided modes propagating in the waveguiding-layer. In order to control and adjust the permittivity of these media, it may be preferable to cover the waveguiding layer 20 with a cover material, preferably in a conformal coating. In such configurations, the plurality 2 of subwavelength structures 2a and the waveguiding layer 20 may be embedded in such media, processing layer or coating material. The plurality 2 of subwavelength structures 2a and the waveguiding layer 20 can therefore be located at any of the first substrate surface 4a and the second substrate surface 4b or in the substrate layer 4. The plurality 2 of subwavelength structures 2a and the waveguiding layer 20 may be partially covered and therefore be partially embedded in the substrate layer 4 and partially on any of the first and second substrate surface 4a and 4b. A composite substrate may be fabricated comprising more than one plurality 2 of subwavelength structures 2a, waveguiding layer 20 and substrate layer 4. As detailed further, the resonant waveguide grating 1 of the invention may be realized on different parts of a substrate, possibly covering various surface of the substrate or being embedded in different layers of a composite substrate.

As illustrated in FIG. 2, the various subwavelength structures of the plurality 2 may comprise ridges and grooves having various shapes, and/or different vertical and/or horizontal dimensions. It may comprise two identical grooves such as the illustrated grooves 30, 32 as well as different grooves such as the grooves 30 and 31. It may comprise as well identical ridges, and different ridges such as the illustrated ridges 40 and 41.

However the resonant waveguide-grating 1 of the invention cannot comprise only identical grooves and identical ridges all regularly spaced relative to each other. Resonant waveguide-gratings of the prior-art made of regular arrangements of identical grooves and identical ridges do not meet the condition of having different subwavelength distances between the centers of two adjacent grooves and between two adjacent ridges. Resonant waveguide-gratings of the prior-art made of regular arrangements of identical grooves and identical ridges do not allow to provide the optical effects that can be achieved by the resonant waveguide-grating 1 of the invention. On the opposite, a resonant waveguide grating 1 of the invention may be realized with identical grooves and at least two different ridges, or with identical ridges and at least two different grooves or with ridges and grooves matching the condition of having different spacing between them. These conditions impose that the distance d2 between the centers 40a, 41a of at least two adjacent ridges 40, 41 and the distance d1 between the centers 30a, 31a of at least two adjacent grooves 30, 31 to be different, as illustrated in for example FIG. 2.

On the opposite to prior-art relying on various distinct resonant waveguide gratings for light redirection such as in the document WO 2017137127, the plurality 2 of subwavelength structures 2a of the invention having different spacing between at least two adjacent grooves' centers and at least two adjacent ridges' centers allows to collectively incouple a portion 10b of incident light into at least one mode of the waveguiding layer 2 and may collectively outcouple a fraction 10c of an incoupled portion 10b. This incouple portion 10b is guided in a leaky waveguided-mode condition and can be called a leaky guided-mode.

The incoupling and outcoupling of a light portion 10b or a light fraction 10c of a light beam in and out of the waveguiding layer 20 are achieved by diffraction events, the wavefront of an incident light beam being diffracted by such diffraction events.

In a preferred embodiment, illustrated in FIG. 2, one of said adjacent grooves 30, 31 is situated between said adjacent ridges 40, 41. Otherwise said, one of said adjacent ridges 30, 31 is situated between said adjacent grooves 40, 41

The schematic cross-section view of the plurality 2 of subwavelength structures 2a and waveguiding layer 20 or the resonant waveguide-grating 1 of the invention of FIG. 2 and of similar cross-section views illustrate a local cross-section normal to the local plane of the waveguiding layer 20. In the direction normal to the cross-section plane, the subwavelength structures may be homogeneous and invariant. The subwavelength structures may be arranged, in the plane of the waveguide 20, along curves such as ellipses. In some areas of the resonating waveguide grating 1, individual grooves or ridges may disappear of appear in the plurality 2 of subwavelength structures 2a as illustrated in a portion 22 in FIG. 26. Pixelated designs of resonant waveguide grating 1 may be realized to perform specific optical function as disclosed for SRG and SBG, such pixelisation is described in for example the document US 2014104665. The subwavelength structures may as well be modulated along the x-direction or the y-direction. For example the height of the plurality 2 of subwavelength structures 2a may be modulated or the number of ridges or grooves may vary as illustrated in FIG. 26.

In an embodiment illustrated in FIG. 1 the outcoupled fraction 10c is directed away from the partially transmitted light beam 10f of said incident light beam 10a by the waveguiding layer 20 and away from the partially reflected light beam 10g of said incident light beam 10a by the waveguiding layer 20. It should be noted that the direction of the partially reflected light beam 10g and partially transmitted light beam 10f may change in different media due to refraction, as can be computed by the Snell-Descartes law. The direction away from the partially transmitted light beam 10f of said incident light beam 10a by the waveguiding layer 20 and away from the partially reflected light beam 10g of said incident light beam 10a by the waveguiding layer 20 should be considered in the same media, in the same material layer.

In an embodiment illustrated in FIG. 2 at least two adjacent grooves 30, 31 and/or at least two adjacent ridges 40, 41 have different shapes and/or dimensions.

The waveguiding layer 20 may be composed on a single material layer, of multiple layer of materials, of composite of nano-composite materials as well as of alloys or materials with dopant atoms or other additives. Whether the waveguiding layer is made of a single material such as a high refractive index dielectric or metal or made with a complex stack of layer on more complex composite material, it is called waveguiding layer for simplicity and for its functionality in a given spectral range.

Examples of possible waveguiding layer 20 compositions are illustrated in FIGS. 3a to 3h with respectively, a single high refractive index (HRI) material (3a), two HRI material layers separated by a low or medium refractive index material (3b), a metal layer combined with a HRI material (3c), a gradient refractive index (GRIN) waveguiding layer (3d), the gradient being located along the axis normal the plane of the waveguiding layer 20, a thin metallic waveguiding layer, also called plasmonic waveguide (3e), two HRI materials separated by a thin metallic layer (3f), two thin metallic layer separated by a HRI material (3g), two low refractive index material separated by a high refractive index material (3h). High refractive index material may be made with dielectric as well as materials called semiconductors possibly exhibiting an electron energy level bandgap, the material being absorbing and non-absorbing in various wavelength ranges. High refractive index material may be chosen from the materials TiO2, ZnS, Si, Ta2O5, HfO2, ZrO2, AlN and Al2O3. High refractive index material may be made with nano-composite materials. As an example, in order to manufacture a plurality 2 of subwavelength structures 2a for a visible wavelength range application, a solgel containing Titania ($TiO_2$) nanoparticles may be used in a UV nanoimprint process and further processed to increase the refractive index material of the nano-composite.

The permittivity function of the compositions of waveguiding layer 20 is defined as the function whose value is the local material permittivity as a function of the position on the axis perpendicular to said waveguiding layer 20. Examples of permittivity functions for high refractive index based RWG are for examples presented in the document EP 2447744, especially in FIG. 2 to FIG. 7. The permittivity function of the waveguiding layer 20 alone is defined on a non-corrugated area, away from a grating structure.

The examples of FIGS. 3a-3h illustrate various possible materials to realize thin optical waveguiding layer 20. These various waveguiding materials create different permittivity cross-sections function for the waveguiding layer. As the electromagnetic field distribution of guided light modes varies with the wavelength of the guided light, different wavelengths experience different effective mode refractive indices when guided by these different waveguiding layers, additionally to the spectral dispersion of each material. The so-called mode dispersion can therefore be selected by choosing the permittivity cross-section function and therefore the waveguiding layer materials as best suited to obtain a desired modal spectral dispersion.

The thickness, defined normal to the local plane of said waveguiding layer 20 is defined only by the guiding portion or core of said waveguiding layer 20 and not by the cladding or substrate surrounding said waveguiding layer 20.

The waveguiding layer 20 may comprise a gradient index (GRIN) material such as a glass materials in which a dopant material is diffused. The waveguiding layer materials can comprise low and high refractive index materials, metals, metal oxide as well as materials with tunable optical permittivity such as liquid crystal and Kerr effect materials as well as composite of these materials. Tunable optical material may allow to tune the light redirecting capability of a resonant waveguide-grating whose waveguiding layer's properties can be modified.

In an embodiment the waveguiding layer 20 has a mean refractive index higher than the refractive index of said substrate layer in at least a portion of the spectrum of said incident light beam 10a. Such a higher mean refractive index allows light-guiding on at least such portion of the spectrum. It should be noted however that a waveguiding layer 20 having a higher mean refractive index than the substrate layer 4 is not a requirement to allow light-guiding. As example, metallic waveguides can guide light using plasmonic local and/or propagating resonances. Alternatively, a waveguiding layer may be made with a three layer stack made with three dielectric material, the central material having for example the same refractive index than the substrate layer while the two outer materials having lower refractive index than the substrate layer 4 and being use as optical cladding. Many other configurations enable light-guiding as reported in the scientific literature.

It should be noted that some waveguiding layer 20 configuration may be able to guide only one light polarization or may be able to guide the two light polarizations, the optical guided modes having the two different polarization experiencing possibly different waveguiding layer refractive index/permittivity. As an example, shallow resonant waveguide grating using a HRI material may incouple and outcoupled better light impeding with a transverse-electric (TE) polarization, the electric field of the incident light being parallel to the grooves and ridges axis. On the opposite, resonant waveguide grating 1 relying on a thin metallic waveguide, often called plasmonic waveguide, will possibly better resonate and therefore incouple and outcoupled light portion 10b and fraction 10c from light impeding with a transverse magnetic (TM) polarization, the electric field of the incident light being comprised in the incidence plane, the plane normal to the waveguiding layer and comprising the direction of the incident light beam. Many prior-art documents report and explicit the modal effective index of various thin waveguides configurations.

In the embodiment in which the waveguiding layer 20 has a mean refractive index higher than the refractive index of said substrate layer, the resonant-waveguide grating 1 may be arranged to redirect a light-beam due to the possible incoupling of a portion 10b of an incident light beam 10a and its outcoupling in a predetermined direction in an outcoupled fraction 10c without exhibiting direct diffraction not relying on one of the guided-mode of the waveguiding layer 20. Such exclusive diffraction possibilities, in a given spectral range and possibly angular range, are made possible by the higher mean refractive index of the waveguiding layer to the media surrounding the corrugated waveguiding layer and due to the subwavelength dimensions of the plurality 2 of subwavelength structures 2a. For example, diffraction order above the zero order diffraction may not be possible in the refractive index of the substrate layer 4 or in air while being possible into and out of the waveguiding layer 20 with a certain plurality 2 of subwavelength structures 2a. Given the finite number of possible guided-mode of the waveguiding layer 20, a finite number of diffracted peaks may be achieved in and out the waveguiding layer for a given polychromatic incident light beam. A single diffraction peak may be achieved providing a very narrow spectral light redirection of a multichromatic light beam or a very high angular selectivity of light redirection of a non-collimated monochromatic light beam. Such a behavior may be called a discretization of a light diffraction by finite guided modal capabilities. Similar selectivity can be achieved with other waveguiding layer material not relying on a higher mean refractive index, if they are able to guide light and exhibit a finite number of guided-mode.

In an embodiment the waveguiding layer 20 is made of a material comprising at least a dielectric or a semiconductor material.

In an embodiment the waveguiding layer 20 comprises nanoparticles made of a dielectric material or a semiconductor.

In an embodiment the dielectric material or semiconductor has an optical index higher than the refractive index of said substrate layer in at least a portion of the spectrum of said incident light beam 10a, preferably higher by at least 0.1.

In an embodiment the waveguiding layer 20 comprises to at least one of the sides of the waveguiding layer 20 at least two layers made of different materials In an embodiment the waveguiding layer 20 comprises to at least one of the sides of the waveguiding layer 20 a layer made of an alloy of varying composition across the direction perpendicular to said first waveguiding surface 20a.

In an embodiment the waveguiding layer 20 comprises at least two materials made of identical materials having different doping concentrations.

In an embodiment the waveguiding layer 20 has a doping concentration profile across the direction perpendicular to said waveguiding layer 20 enabling a gradient index over that direction.

Various examples of pluralities 2 of subwavelength structures 2a and related corrugated waveguiding layer 20 of the resonant waveguide grating 1 of the invention are disclosed herein.

Figure 5A:
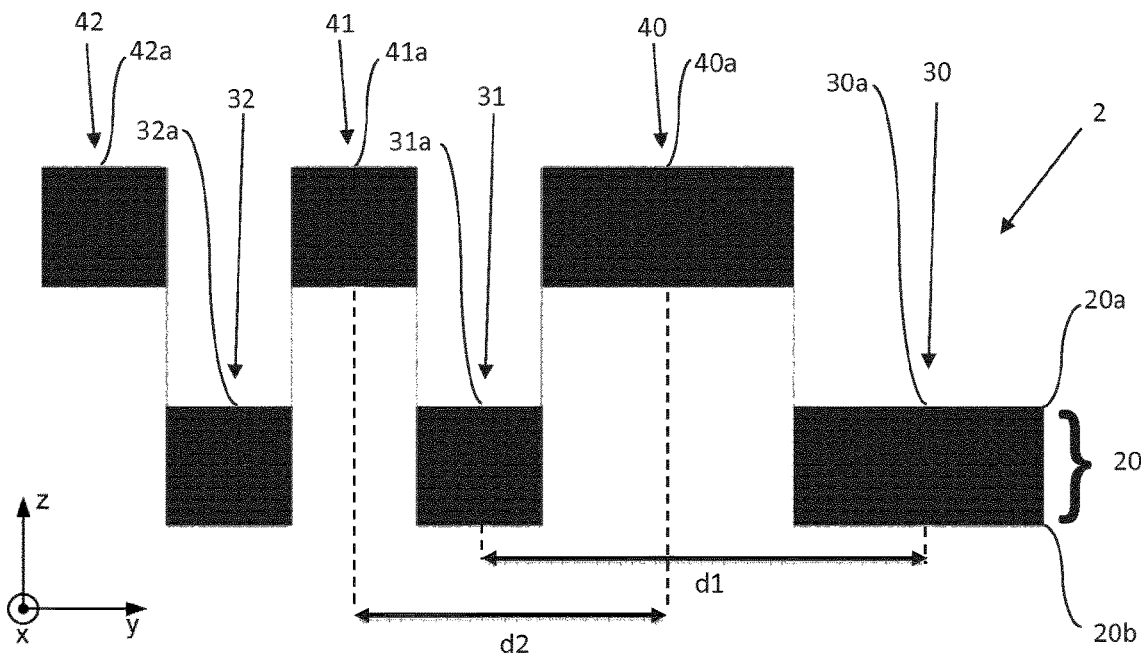
FIG. 5a illustrates a cross-section view of subwavelength structures of a resonant waveguide grating of the invention comprising three binary ridges and grooves.
Figure 6A:
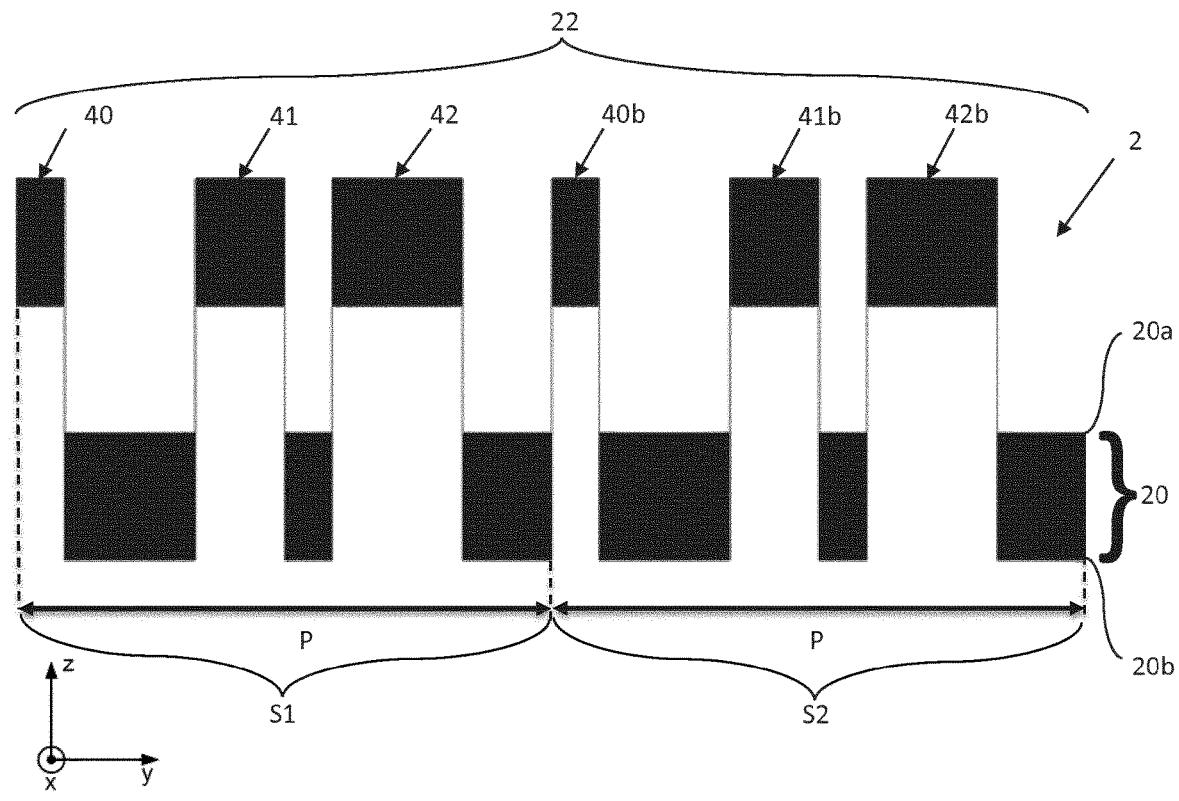
FIG. 6a illustrates a cross-section view of a portion of a resonant waveguide grating comprising a spatially periodic set of a plurality of subwavelength structures of a resonant waveguide grating.

In an embodiment illustrated in FIG. 5a the resonant waveguide grating 1 comprises a plurality 2 of subwavelength structures 2a in which said at least two grooves 30, 31 and said at least two ridges 40, 41 have a binary shape. A binary shape is defined as a multi-level structure having 2 levels separated by substantially vertical sections, sections substantially normal to the plane of the waveguiding layer 20. In a variant, other multi-level shape comprising more than 2 levels may be used to design a part of the whole of the plurality 2 of subwavelength structures 2a.

Figure 4A:
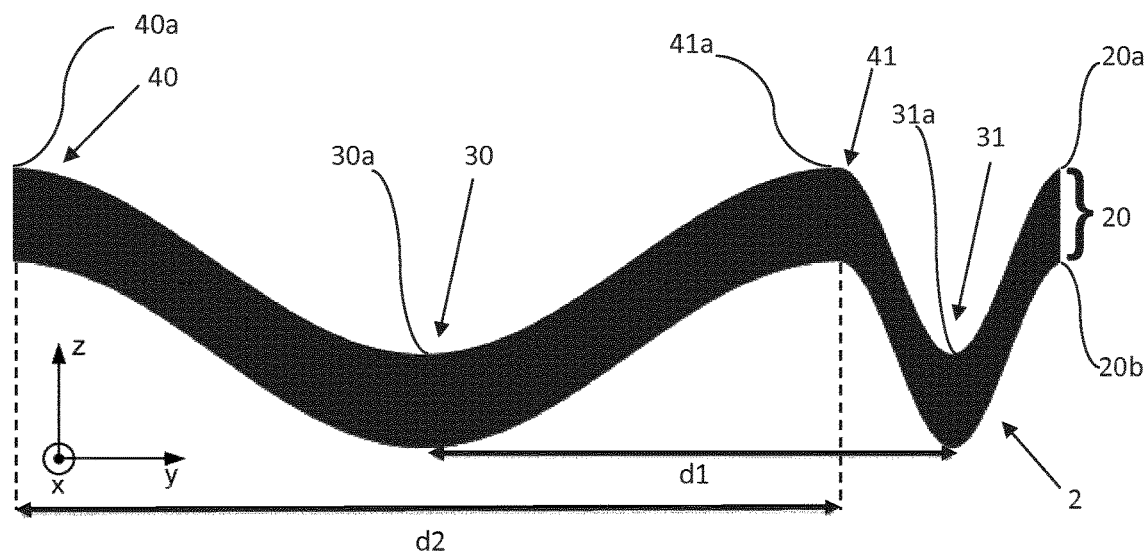
FIG. 4a illustrates a cross-section view of subwavelength structures of a resonant waveguide grating of the invention comprising two ridges and two grooves of very different dimensions and having pseudo-sinusoidal profile.

In another embodiment illustrated in FIG. 4a, the resonant waveguide grating 1 comprises a plurality of subwavelength structures in which said at least two grooves 30, 31 and said at least two ridges 40, 41 have sinusoidal shapes or pseudo-sinusoidal shapes. In an embodiment the resonant waveguide grating 1 comprises a plurality of subwavelength structures in which said at least two grooves 30, 31 and said at least two ridges 40, 41 have a triangular shape. A triangular grating shape may for example be a blaze grating shape which is defined in cross-section by two sections, one being substantially vertical with the second one being oblique. In a variant, a triangular grating shape may as well be a symmetric or asymmetric triangular shape having two oblique sections as viewed in cross-section. In a variant, the said at least two grooves 30,31 and said at least two ridges 40,41 have a slanted shape, having a cross-section defined by two oblique sections and two sections substantially parallel to the waveguiding layer 2 plane, one of the oblique section having a negative angle, otherwise said defining an overhanging shape.

Figure 4B:
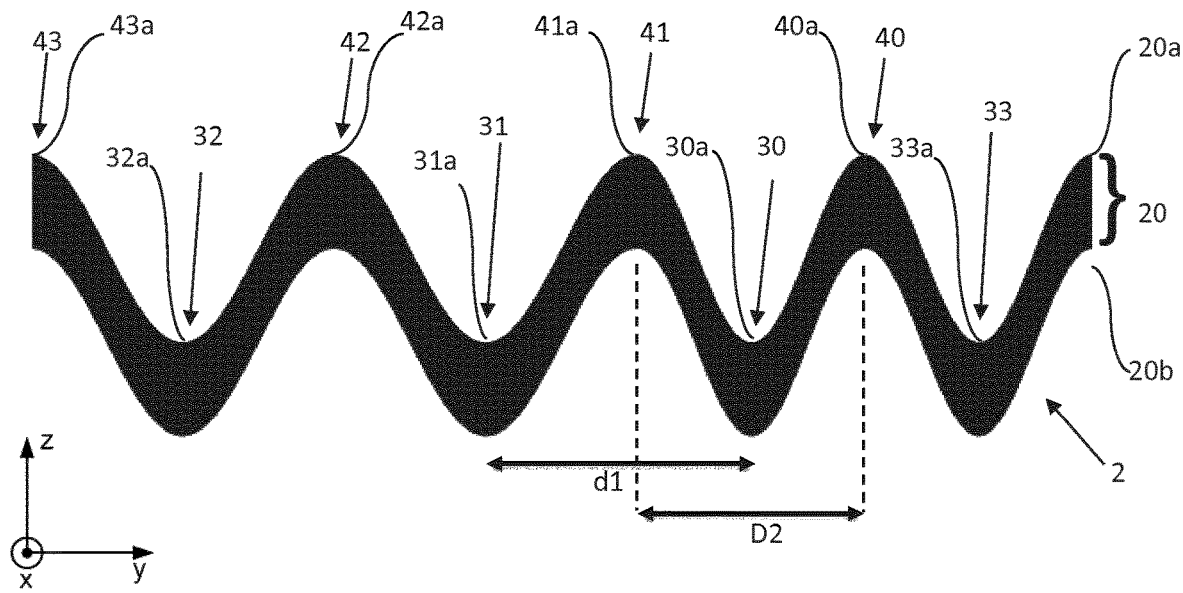
FIG. 4b illustrates a cross-section view of subwavelength structures of a resonant waveguide grating comprising four ridges and four grooves, two pairs of identical grooves being different.
Figure 4C:
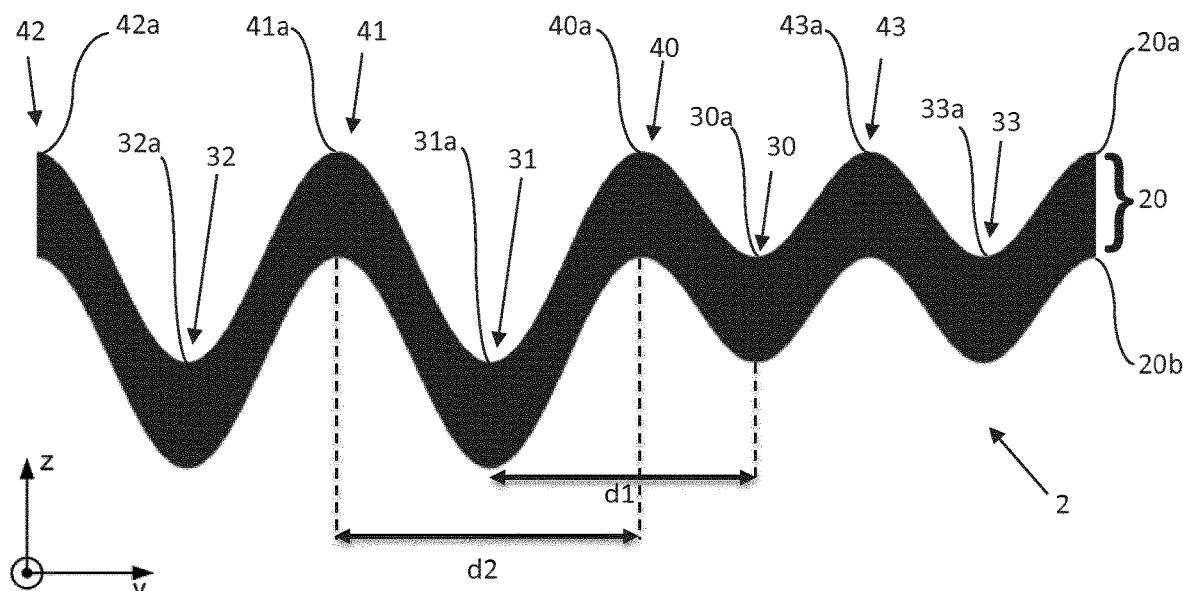
FIG. 4c illustrates a cross-section view of subwavelength structures of a resonant waveguide grating comprising ridges and grooves of varying depth.

As examples of resonant waveguide grating 1, various possible pluralities 2 of subwavelength structures 2a are shown in FIGS. 4a to 4c with respectively 2, 4 and 4 grooves. As illustrated in FIG. 4a, two adjacent grooves, can have significantly different lateral sizes.

As illustrated in FIG. 4b, two adjacent grooves 30, 31, can have different lateral dimensions and therefore different shapes but with relatively comparable dimensions, for example varying by less than 30%. The same is valid for the ridges 41 and 42.

In an embodiment illustrated in FIGS. 4b and 4c, the plurality 2 of subwavelength structures 2a can as well comprise two identical and adjacent grooves as for example the grooves 31 and 32 or the grooves 30 and 33. However and as explained before, a resonating waveguide grating comprising only a large number of identical adjacent grooves and ridges regularly spaced is not an object of the invention. This does not prevent designing periodic sets each comprising a plurality 2 of subwavelength structures 2a. However, in the case of a periodic arrangement of said sets, each period comprises at least one of said pair of adjacent grooves and of said pair of adjacent ridges as described before. As illustrated in FIG. 4b and FIG. 4c, at least two grooves 30, 31 and two ridges 40, 41 have different distances d1, d2 between their centers.

In an embodiment illustrated in FIG. 4c, the plurality 2 of subwavelength structures 2a adjacent grooves 31, 30 may have different heights or, as defined with respect to the top of the ridges, different groove depths.

In an embodiment, said waveguiding layer 2 comprises a flat portion 50 defined in the plane of said waveguiding layer 20 and located between two different ridges, two different grooves or between a ridge and a groove.

Because of the subwavelength lateral and vertical dimensions of the plurality 2 of subwavelength structures 2a, structure shape and profile may be challenging to realize according to exact design. Manufactured pluralities 2 of subwavelength structures 2a, for example replicated after many tooling steps, may be designed to have either binary or sinusoidal or triangular shape and be approximation of such shapes due to various deformations and loss of fidelity of replication. Additionally material roughness and local defects may modify the exact shape of such subwavelength structures. As another example, constraints due to a coating process used for the manufacturing of the waveguiding layer 20 or part of the waveguiding layer 20 may lead to a partial thermal reflow of the plurality 2 of subwavelengths structures 2a or a partial implantation of a waveguiding layer 20 material into said plurality 2 of subwavelength structures 2a. The waveguiding layer 20 may be a conformal coating or a directional coating or partially conformal and directional with respect to the topography of the plurality of the subwavelength structures 2. As a result, the corrugation of the first waveguiding surface 20a and the second waveguiding surface 20b can be close to identical as well as significantly different.

In an embodiment, illustrated in FIGS. 4a to 4c said waveguiding layer 20 is substantially conformal to the shape of the plurality 2 of the subwavelength structures.

FIGS. 5a to 5e illustrate pluralities 2 of subwavelength structures 2a based on binary profile, represented with ideal rectangular geometries.

In the example illustrated in FIG. 5a, the plurality 2 of subwavelength structures 2a comprises two adjacent pairs of ridges 41, 42 and grooves 31, 32 with identical lateral dimensions, making a local balanced duty-cycle between grooves and ridges width, and one larger ridge 40 and a larger groove 30. In the schematic cross-section view of FIG. 5a, the depth of the binary subwavelengths structures is larger than the thickness of the waveguiding layer 20, creating subwavelength discontinuities in the waveguiding layer 20. However such subwavelength spatial separation does not prevent the propagation of a guided light mode as the electromagnetic-field distribution associated with the light wave is larger than such gap. The waveguiding layer 20 and the first and second waveguiding layer surfaces 20a, 20b are defined, in the example illustrated in FIG. 5a as being discontinuous layers, respectively discontinuous surfaces, at a subwavelength scale.

Figure 5B:
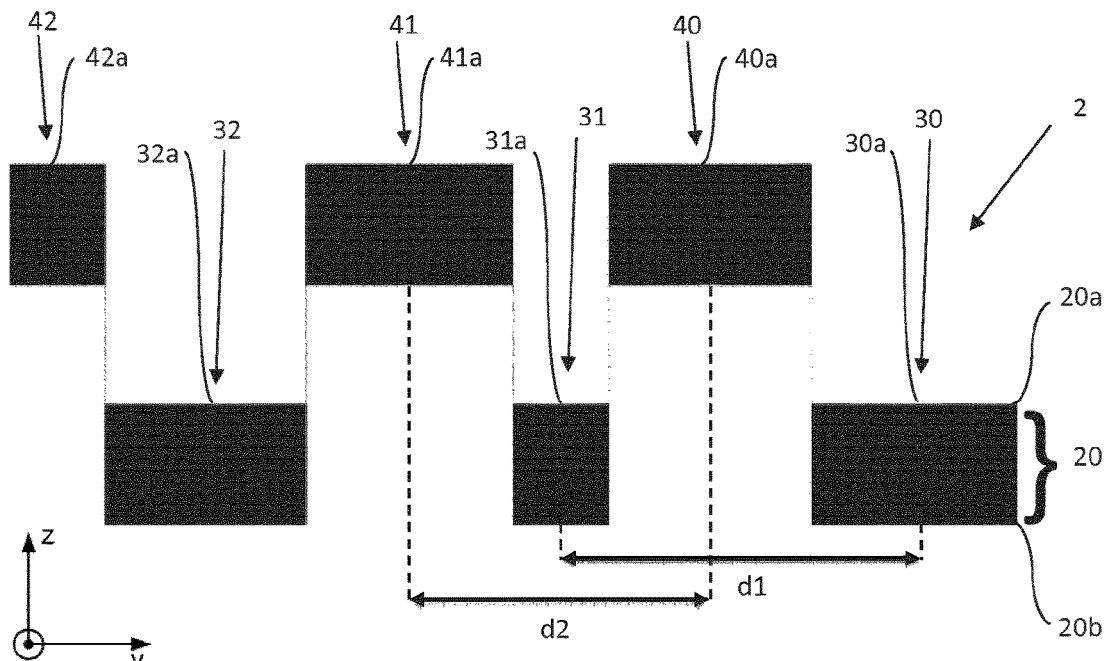
FIG. 5b illustrates a cross-section view of subwavelength structures of a resonant waveguide grating of the invention comprising three binary ridges and grooves.

FIG. 5b illustrates a schematic cross-section view of a plurality 2 of subwavelength structures 2a having two identical adjacent ridges 40, 41 but no identical adjacent grooves 30, 31, 32. As illustrated in FIG. 5b, a plurality 2 of subwavelength structures 2a having mirrored grooves and ridge dimensions can lead to specific optical effects, such as in an example favoring an outcoupling diffraction order compared to another order. This cannot be achieved at all by prior art grating structures. For example, the positive second or minus second diffraction order can be favored compared to the first of minus first diffraction order for said partially outcoupled fraction 10c with respect to said an incident light beam 10a and through said incoupled portions 10b, for a periodic arrangement of the pluralities 2 of subwavelength structures 2a of FIG. 5b, the different diffraction orders being defined with respect to such a periodicity. In FIG. 5b, the lateral dimensions of respectively the ridge 42, the groove 32 and the ridge 41 have identical lateral dimensions to respectively the groove 31, the ridge 40 and the groove 30.

Figure 5C:
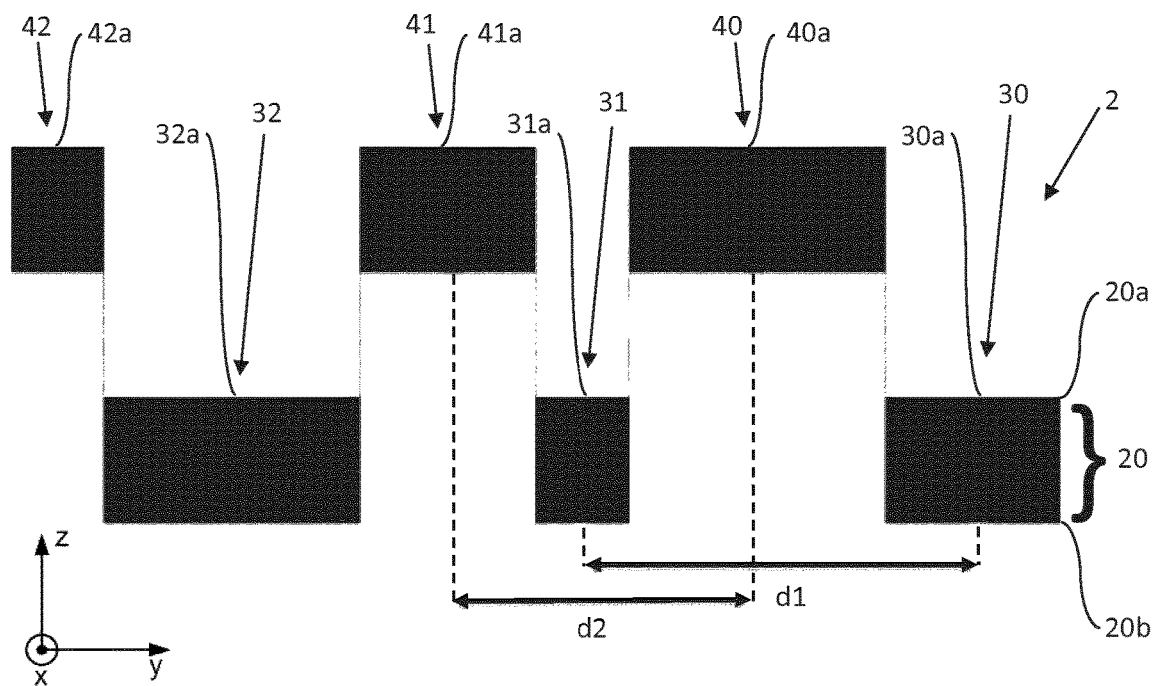
FIG. 5c illustrates another cross-section view of subwavelength structures of a resonant waveguide grating comprising three binary ridges and grooves.

FIG. 5c illustrates a schematic cross-section-view of a plurality 2 of subwavelength structures 2a similar to the one illustrated in FIG. 5b with different lateral size distribution between the groove 32 and the ridge 41 and between the groove 30 and the ridge 40. Such structure variation allow fine tuning of the optical properties of the resonant waveguide grating 1 made with this plurality 2 of subwavelength structures 2a. Such a fine tuning may be relevant for example when having optical specifications over a broad wavelength range or various set of incidence angles and the like.

Figure 5D:
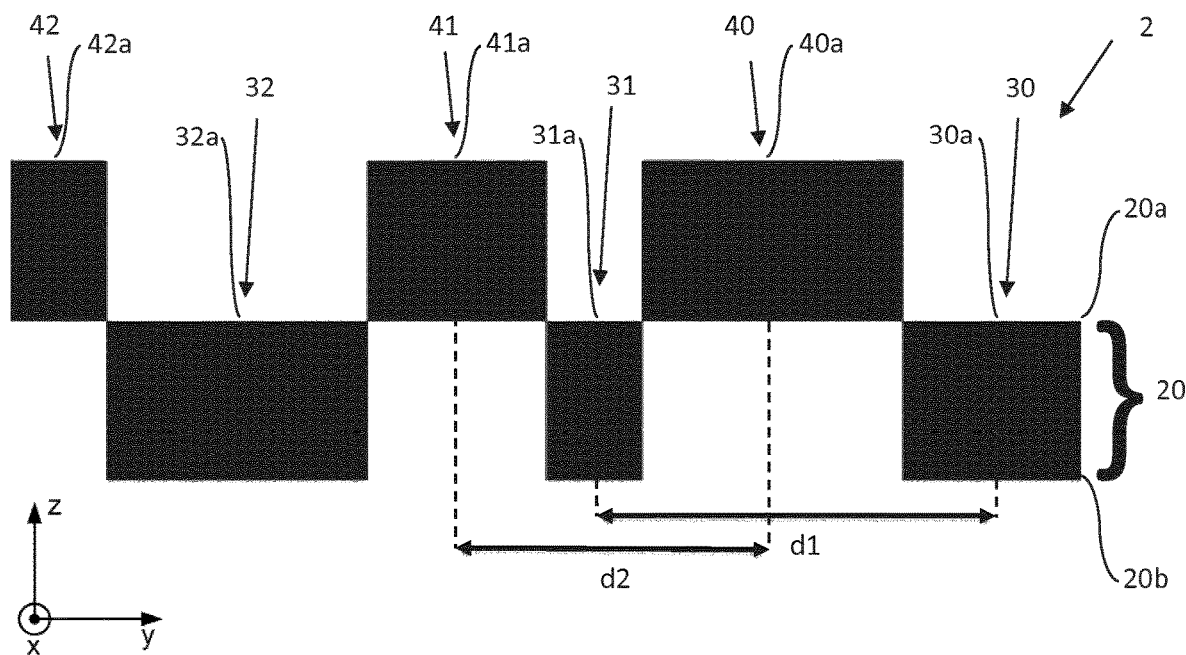
FIG. 5d illustrates a cross-section view of subwavelength structures of a resonant waveguide grating comprising three binary ridges and grooves that are shallower than those illustrated in FIG. 5c.

FIG. 5d illustrates a schematic cross-section-view of a plurality 2 of subwavelength structures 2a similar to the one illustrated in FIG. 5c but with binary subwavelength structures having lower height, that is to say grooves having lower depths compared to the ridges. With such a lower height and as illustrated, the waveguiding layer 20 is almost continuous. The only discontinuity is due to the fact that the material of the waveguiding layer is narrowly, i.e. at a nanoscale, connected between the top of the ridges and the top of the grooves.

Figure 5E:
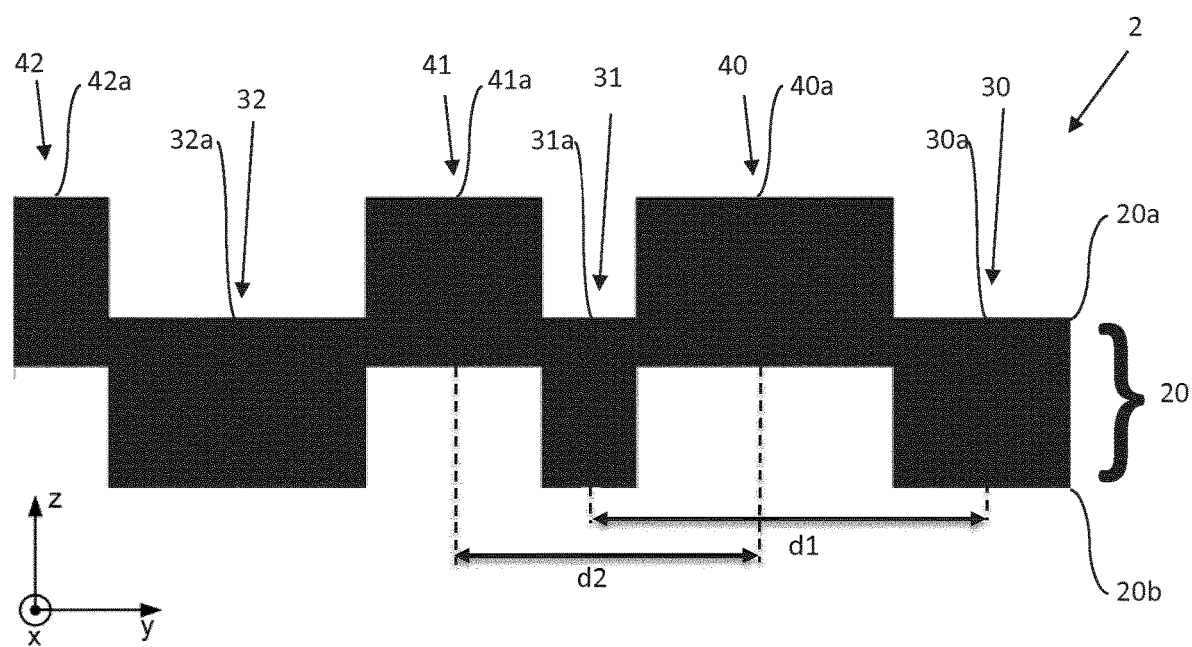
FIG. 5e illustrates a cross-section view of subwavelength structures of a resonant waveguide grating of the invention comprising three binary ridges and grooves shallower than those illustrated in in FIG. 5d.

FIG. 5e illustrates a schematic cross-section-view of a plurality 2 of subwavelength structures 2a similar to the one illustrated in FIG. 5d but with binary subwavelength structures having lower height, that is to say grooves having lower depths compared to the ridges. With such a lower height and as illustrated, the waveguiding layer 20 is fully continuous. Such height modulation of the subwavelength structure may be used to tune the efficiency and the selectivity of the redirection of an outcoupled fraction 10c of an incoupled portion 10b of an incident light beam 10a, similarly to previous work reported for regular resonant waveguide-grating. The selectivity may be tuned in the spectral domain and/or the angular domain and/or for polarization selectivity.

As discussed earlier, resonant-waveguide gratings having a small lateral dimension, having a low number of groove and ridges may exhibit different optical behavior than very large resonant waveguide gratings, this difference being significant when the size of the resonant waveguide-gratings become very small, for resonant waveguide grating having a very low number of ridges and grooves. Such effects depend on the resonant waveguide grating design. Resonating waveguides may comprise portions having small dimensions such as smaller than 20 μm×10 μm.

As an example, weakly corrugated resonant waveguide grating using a high refractive index waveguiding layer made with a low-absorbing and low-scattering dielectric material, such as tantalum pentoxide ($Ta_2O_5$) or titania ($TiO_2$) for application in the visible wavelength range, may have very large average guided mode propagation distances, the leaky mode may be very weakly leaky. Leaky-mode propagation distances extending over tens, several tens, hundreds or possibly thousands of grooves/ridges are possible. On the opposite, deeply corrugated waveguide-grating generally have lower average guided-mode distances. In a variant, a resonant-waveguide-grating having an absorbing material, such as a metal, or a partially scattering material, such as a composite containing various nanoparticles, may have as well a lower average guided-mode distance, that is to say more leaky mode. It should be noted that resonant waveguide-grating having various leaky guided modes usually have different average guided mode distances for various modes.

Many different factors—to which can be added the subwavelength structure shape, possibly the substrate layer optical properties and so on—influence the optical effect due to the finite dimension of a resonant waveguide-grating on its optical properties with respect to a very large resonant waveguide grating.

In practice the resonant waveguide grating 1 comprises at least one set of a plurality of subwavelength structure comprising a very large number, for example more than one thousand, grooves and ridges. The structures shown in FIGS. 4a to 5e can be considered as examples of small sets comprising a small number of subwavelength structures 2a. In a practical device a huge number, for example more than 1 thousand, possibly more than 10 thousands of such said small sets may be present.

In practical realizations, the resonant waveguide grating may comprise at least one portion 22 comprising more than one plurality 2 of subwavelength structures.

Such portion 22 may comprise an array of sets comprising identical pluralities 2 of subwavelength structures 2a and be periodic arrangement of these sets. This is illustrated in FIG. 6a: a first set S1 comprising the ridges 40, 41, 42 is replicated as a second set S2, identical to said first set S1, and comprises the ridges 40b, 41b, 42b. The array of sets S1, S2 constitutes a periodic arrangement of sets. In a variant a periodic arrangement may comprise more than a thousand of identical sets S1, S2, . . . Sn. Not illustrated in FIG. 6a, such spatial periodicity may extend over tens, thousands or more of local spatial period P. In a variant, a portion 22 may contain several sets of nearly identical pluralities 2 of subwavelength structures 2a and therefore be a quasi-periodic arrangement of these sets. For example, a variant of a portion 22 may comprise a first set of a plurality 2 of subwavelength structures 2a having lateral and vertical dimensions of the subwavelength structures that differ by less than 10% compared to a second set of a plurality 2 of subwavelength structures 2a in that portion 22.

As an example, two adjacent sets of pluralities 2 of subwavelength structures 2a may be similar but present a gradient variation of their shape in the Y-axis direction. Because of design or fabrication constraints, quasi-periodic arrangements may have identical sets of adjacent pluralities 2 of subwavelength structures 2a, for example three identical set of pluralities 2, may be arranged laterally and differ by less than 10% to the next three adjacent identical sets of pluralities and so on.

In periodic or quasi-periodic sets of pluralities 2 of subwavelength structures 2a, the period P or quasi-period may be called a meta-period as it comprises a plurality 2 of subwavelength structures such as ridges and grooves. However and for simplicity, we call the spatial periodicities the local spatial period P of the resonant waveguide grating 1, this spatial period may be varying over the resonant waveguide grating 1.

FIG. 6a illustrates a schematic cross-section view of a periodic arrangement of two sets of a plurality 2 of subwavelength structures 2a identical to the one illustrated in FIG. 5c, but schematized without maintaining identical the scale of the subwavelength structures 2. The ridges 40, 41 and 42 are identical respectively to the ridges 40b, 41b and 42b and are separated in this binary shape example by identical grooves. Each period of such an arrangement of sets of a plurality 2 of subwavelength structures contains three ridges and three grooves. In a variant, each period main contain many more ridges and grooves, for example more than 10 ridges and 10 grooves.

Figure 6B:
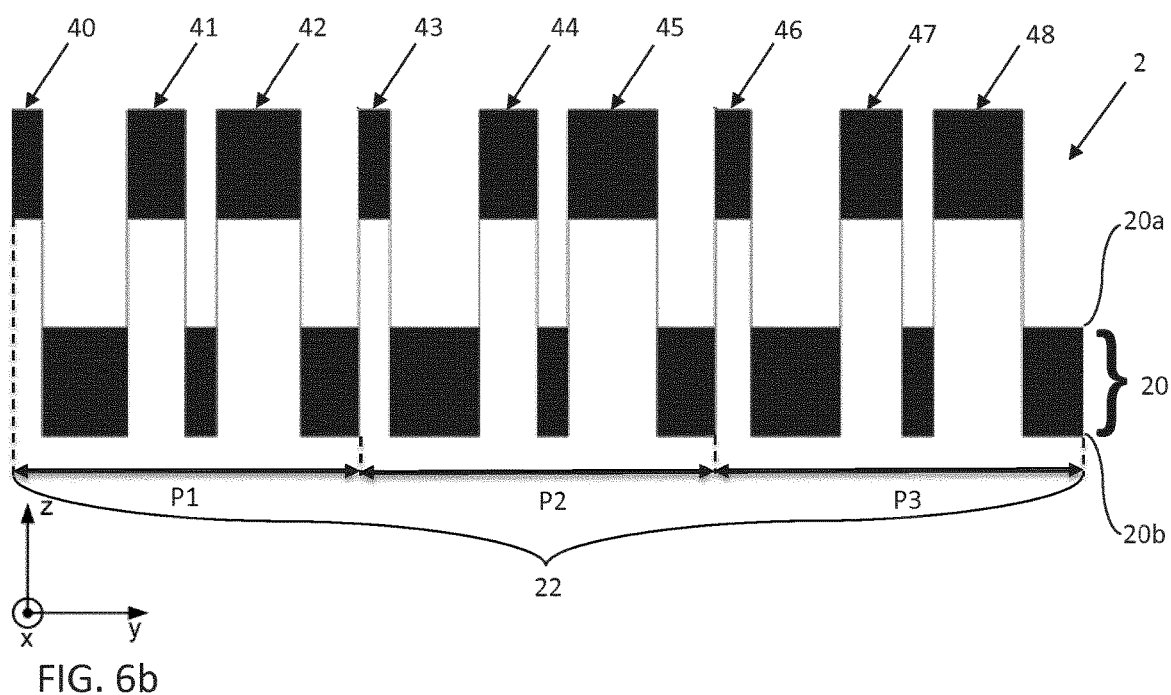
FIG. 6b illustrates a cross-section view of a portion of a resonant waveguide grating comprising a spatially quasi-periodic set of a plurality of subwavelength structures.
Figure 7:
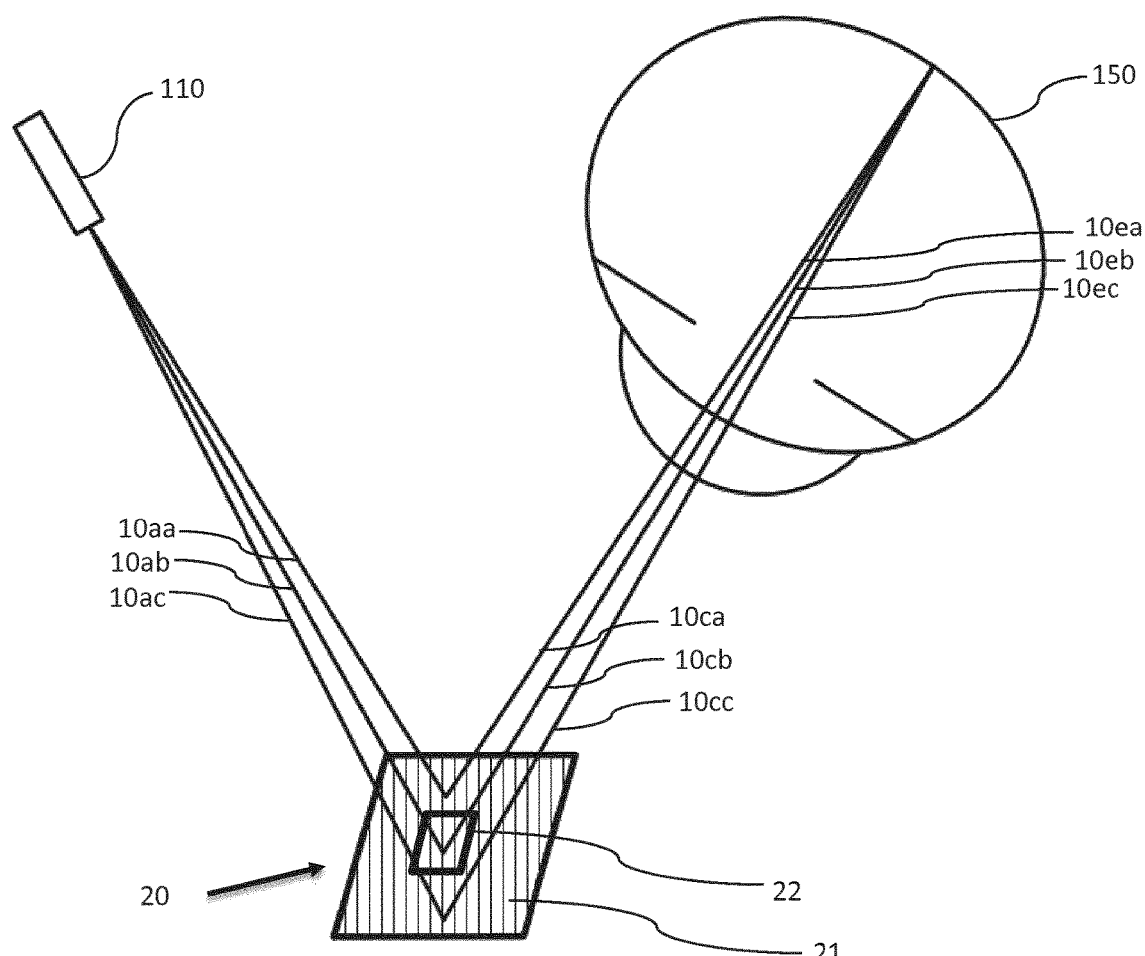
FIG. 7 illustrates a 3D view of a portion of a resonant waveguide grating of the invention directing a fraction of a light beam provided by a light emitter to the eye of an observer.

FIG. 6b illustrates a schematic cross-section view of quasi-periodic arrangement of three sets of pluralities 2 of subwavelength structures 2a. The ridges 40, 41 and 42 are reproduced with a slight increase of their width and spacing towards the right in the ridges 43, 44 and 45. The ridges 43, 44 and 45 may be 3% larger than respectively the ridges 40, 41 and 42. The grooves separating the ridges 43, 44, 45 and 46 are in this example 3% larger than the separation between the ridges 40, 41, 42 and 43. For example the distance P2 is 103% of the distance P1. This is reproduced identically toward the right with the ridges 46, 47 and 48 being 3% larger than the ridge 43, 44 and 45, as well as for their respective grooves, leading to a distance P3 equal to 103% of the distance P1. In this example, the height of the subwavelength structures is constant but may vary, in a variant, as well by small fractions, for example 2% to 20% of said height. An arrangement of the portion 22 of three sets of pluralities 2 of subwavelength structures 2a, as illustrated in FIG. 6b, is defined as quasi-periodic. In this example (FIG. 6b) the sets of pluralities 2 of binary shaped subwavelength structures are arranged according to a lateral gradient along the y-axis direction An exemplary portion 22 containing a set of a plurality 2 of subwavelength structures 2a is illustrated in a 3D schematic view in FIG. 7. The exemplary portion 22 illustrated in FIG. 7 is arranged to redirect a part of an incident light beam 10ab emitted by a light emitter 110 in an outcoupled fraction 10cb propagating towards the eyeball 150 of an observer. At least a part 10eb of said outcoupled fraction 10cb entering the cornea and the eye pupil and is incident on the retina of the eye 150 of an observer. Note that FIG. 7 is making abstraction of the substrate layer and the possible refraction events created by such a layer. Other incident light beams 10aa, 10ac are illustrated and redirected by the resonant waveguide grating 1 into outcoupled beam fractions 10ca, 10cc by another part 21 of the waveguiding layer 20 located outside said portion 22. Multiple light beam redirection may as well be achieved by a single said portion 22.

In an embodiment and to the opposite of periodic or quasi-periodic arrangements, aperiodic, also called non-periodic, arrangements of various subwavelength structures 2a are of interest. For example, in the case of an optical design requiring a laterally varying—as defined in the X-Y plane—optical behavior of the resonant waveguide-grating 1, aperiodic arrangements of a set of a plurality 2 of subwavelength structures 2a 2 may be necessary.

In an example, a resonant waveguide-grating 1 exhibiting an optical behavior similar in optical function to a portion of an ellipsoidal mirror may require an aperiodic arrangement of a plurality 2 of subwavelength structures 2a. A resonant waveguide-grating 1 similar to an ellipsoidal mirror could be curved or planar, but not necessarily located on the ellipsoidal shape of such an ellipsoidal mirror. An ellipsoidal mirror is designed for example to redirect all the light beams emitted by one of its focal point to its second focal point. To have a similar optical behavior as an ellipsoidal mirror the resonant waveguide-grating design is arranged to redirect incident light impeding at a continuously varying angle towards continuously varying directions in this case towards a single point in space. These two continuously varying incidence and redirection angle may require an aperiodic arrangement of the plurality 2 of subwavelength structures 2a.

In another example, a parabolic mirror function designed to focus a parallel incident beam (infinite focus) towards a point in space may be realized by arranging a resonant waveguide-grating 1 having an aperiodic arrangement of a set of said plurality 2 of subwavelength structures 2a so as to redirect outcoupled light beams 10c at continuously varying angles.

In a further example, a parallel light beam may be partially redirected in a parallel direction using an aperiodic arrangement of a set of a plurality 2 of subwavelength structures 2a, for example to redirect different spectral component of the light beam in different locations of the resonant waveguide-grating 1.

It should be noted in these above mentioned three examples that the resonant waveguide grating 1 of the invention usually do not target broadband light redirection, to the opposite of mirrors, but selective light redirection.

In an embodiment a portion 22 containing at least a set of a plurality 2 of subwavelength structures 2a comprises adjacent subwavelength structures which have a spatial Fourier transform in the local waveguiding layer plane containing at least two distinct effective spatial frequency components. Such distinct effective spatial frequency components may be used for:

- the incoupling of said incoupled portion 10b of said incident light beam 10a into the waveguiding layer 20 and for the outcoupling of the fraction of outcoupled light beam 10c of said incoupled portion 10b.
- the incoupling of various spectral portions 10b of an incident light beam 10a into the waveguiding layer 20 or the incoupling of various portions 10b of different incident light beam 10 into the waveguiding layer 20
- the outcoupling of various outcoupled fractions 10c of one incoupled portions 10b towards different directions or the outcoupling of various outcoupled fractions 10c of different incoupled portions 10b towards the same or different directions
- the incoupling or outcoupling of respectively an incoupled portion 10b or an outcoupled fraction 10c in or out the waveguiding layer 20 and the rejection of the incoupling or outcoupling of another portion or fraction, for example to increase the spectral or angular selectivity
- the incoupling or outcoupling of respectively an incoupled portion 10b or an outcoupled fraction 10c in or out the waveguiding layer 20 and the tuning of the reflectivity of the zero-order transmission or zero-order reflection of the resonant waveguide grating, in the same or a different spectral width than the incoupled portion 10b or outcoupled fraction 10c.

Various distinct effective spatial frequency components may be used for any combination of the optical function listed above.

Described in the reciprocal space, the distinct effective spatial frequency components can be described using the local grating vectors. Grating vectors or k-vectors are defined as the vector in the grating plane being normal to the grating groove direction and whose norm is equal to K=2×

π/p, p being a grating spatial periodicity. The orientation of the k-vector is defined by convention in one or another direction along the normal to the grating. In said plurality 2 of subwavelength structures 2a the local k-vector varies with the local groove and ridge lateral dimensions and the distance between two adjacent grooves or ridges. The effective spatial frequency components of a portion 22 of adjacent subwavelength structures are partially related to the various k-vectors it contains. Other spatial frequency components being provided by non-directly adjacent grooves and ridges.

In a variant said at least two distinct effective spatial frequency components of spatial Fourier transform in the local waveguiding layer plane of said portion 22 of adjacent subwavelength structures are larger than one tenth (1/10) of the spatial frequency $1/\lambda_0$ of said predetermined wavelength $\lambda_0$. This is to say that the spatial periods equivalent to the effective spatial frequency components are ten times smaller than said predetermined wavelength $\lambda_0$.

In an embodiment one of said effective spatial frequency components of spatial Fourier transform in the local waveguiding layer plane of said portion 22 of adjacent subwavelength structures is larger than the spatial frequency $1/\lambda_0$ of said predetermined wavelength $\lambda_0$, more preferably the two at least distinct effective spatial frequency components of spatial Fourier transform in the local waveguiding layer plane of said portion 22 of adjacent subwavelength structures being larger than the spatial frequency $1/\lambda_0$ of said predetermined wavelength $\lambda_0$.

In an embodiment the local spatial periodicity (P) is the least common multiple of at least two distinct effective spatial period components of said portion 22. The least common multiple of the effective spatial period components 137 nm and 491 nm is for example 67267 nm or 67.267 microns. The least common multiple of the effective spatial period components 400 nm and 600 nm is for example 1200 nm or 1.2 micron.

In a variant said spatial period (P) is smaller than ten times said predetermined wavelength $\lambda_0$.

In an embodiment said outcoupled fraction 10c is an outcoupled diffracted portion of the incident light beam 10a by said resonant waveguide grating 1, according to a diffraction order N being at least one or below minus one of said spatial period P, the outcoupled fraction 10c being directed away from the specular reflection direction of the incident light and away from said incident light beam 10a.

In an embodiment the plurality 2 of subwavelength structures 2a couple resonantly into said waveguiding layer 2 said incoupled portion 10b of an incident light beam 10a by diffraction, according to a diffraction order N being at least two or below minus two of the said spatial period P.

In an embodiment said portion 22 comprises a plurality 2 of subwavelength structures 2a having no local spatial periodicity (P). In an embodiment said plurality 2 of subwavelength structures 2a are non-homogeneous at a super-wavelength scale. A super-wavelength scale is defined as a dimension at least larger than five said predetermined wavelength $\lambda_0$.

In an embodiment said plurality 2 of subwavelength structures 2a has a spatial gradient of at least one of their structural parameters.

In an embodiment said plurality 2 of subwavelength structures 2a are pixelated in one or two dimensions across the plane of the waveguiding layer 20.

The content of the document WO 2017137127 is incorporated here in its entirety. The resonant waveguide grating 1 of the invention can be used to realize optical combiners, optical couplers and near-eye display apparatus with similar functional advantages as arrangements disclosed in WO 2017137127.

Another aspect of the invention is to provide a new diffractive optical combiner 1000 and a new diffractive optical coupler 2000. Such diffractive optical combiner 1000 and coupler 2000 may have higher wavelength and/or angular and/or polarization selectivity than optical combiners known in the prior-art as well as an easier industrial applicability for volume manufacturing.

An example of an apparatus that may incorporate and benefit from such diffractive optical combiner 1000 or diffractive optical coupler 2000 is a near-eye display apparatus, more specifically a see-through near-eye display apparatus.

In a variant, a near-eye display apparatus using an exit pupil expansion scheme may exhibit a larger field of view using the diffractive optical coupler 2000 of the invention by using the selectivity of said diffractive optical coupler 2000 to perform light multiplexing. For example, multiple color components, such as red, green and blue light may be coupled in a common lightguiding element 7 without diffraction crosstalk events. This may allow using different lightguiding elements for stitching multiple part of a composite field of view and obtain larger field of view. Such an approach is disclosed in the document EP 2225592 using SRG as diffractive optical couplers and using a lightguiding element 7 for each color channel of a RGB display. The selectivity of the diffractive optical coupler 2000 may allow color multiplexing for the RGB channel in a common lightguiding element 7 and/or composite field of view made of more than 2 parts of the field of view expanded in more than 2 lightguiding elements.

In order to locate visually objects, the human vision system is using pictorial cues, motion parallax, dynamic occlusion and binocular retinal disparity as high level information and low-level perception depth cues, also called oculomotor perception, the accommodation of the eyes and the vergence of the two eyes. In order to realize so-called light field displays (LFD's), so that virtual images generated appear at a given virtual distance to an observer, it is of particular interest to use the vergence and accommodation without creating Vergence Accommodation Conflicts (VAC). This can be realized by sending to the eyes two different images of a scene matching the binocular appearance of this scene. To achieve this, the eyes vergence as well as the eye accommodation may be used, by sending optical beams having a collimation matching the light beams incoming from virtual objects at a finite distance, or mimicking this collimation. Such light beams are divergent light-beams and their wavefronts are non-planar but spherical, with the sphere center located at the virtual object location. In order to mimic such divergent light-beams, the light-beams directed to the pupils of the observer should be as closed as possible to such spherical light beams.

An alternative is to provide the observer eye with very thin light beams which appear in focus for various eye accommodations given their small cross-section. Typically, such small light-beams, called as well beamlets, are smaller in cross-section than the pupil of the eye of the observer. Using various non-parallel and divergent in respect to each other beamlets impeding on the eyes of an observer, it is possible to mimic divergent light beams as incoming to the eye from an object at a finite distance. Such set of beamlets can simulate for various eye accommodations the cone of light emitted by an object at a finite distance.

In addition to the previous listed requirements such as large FOV, the high transparency, the low distortion to light from the external world and the ability to prevent VAC or to provide light-field display to each eye, another critical aspect of such combiner is to provide a broad enough exit pupil 3. The exit pupil 3 of an optical combiner is defined as the location in space, or three-dimensional volume, through which the image redirected by the see-through optical combiner 1 can be observed. It should match approximately the location of the pupil of the eye of an observer, or at least a part of the eye pupil should be in the exit pupil. The volume of the exit pupil 3 is often called eye-box volume or eye-box dimension. However, defining this eye-box dimension is complex as an eye whose pupil is located at the edge of the eye-box will usually perceive a part of the scene but not all, so-called vignettage, or a lower brightness of the virtual objects displayed and so-on. Therefor the eye-box cannot be defined as a single physical dimension but can be measured in respect with specific criteria.

It is of interest to provide broad eye-boxes in near-eye display system for several reasons. First, head-sets or eyeware apparatus should not be aligned perfectly to the head and therefore the eye of the user. Additionally, different users or observers will usually have different inter-pupillary distance (IPD). Realizing a binocular near-eye display system therefore requires providing a way to measure the IPD combined with mechanical flexibility to allow to adjust the distance between the two exit pupils of such binocular display, or requires large enough exit pupil so that various user with different IPD can use the near-eye display. As example, the $5^{th}$ and $95^{th}$ percentile of the IPD of adult males in the USA are 55 mm and 70 mm. The average IPD of adult female and childs are lower than those of adult male. Third, when an observer is looking at a scene, if large motions are related to head movement, most movements are rotation of the eye-balls. Such gaze in different directions, both left-right and top-bottom is adding up to the vergence of the two eyes to make the eye-ball rotating. This in turns translate to eye pupil movement relative to a headset or eyeware, both left-right, top-bottom and in depth. Therefore, obtaining a large static exit pupil or a dynamically tuned exit pupil is critical to near-eye displays.

A large effort have been put on providing such large eye-box in the last decades. Many documents in the prior-art are proposing various options for the exit pupil expansion or exit-pupil replication, usually on two axis, corresponding in near-eye display apparatus to the horizontal and vertical axis of the human vision, along which the eye-pupil can move following eyeball rotation. The two most common approaches are reflective and diffractive exit pupil expander (EPE).

Figure 8:
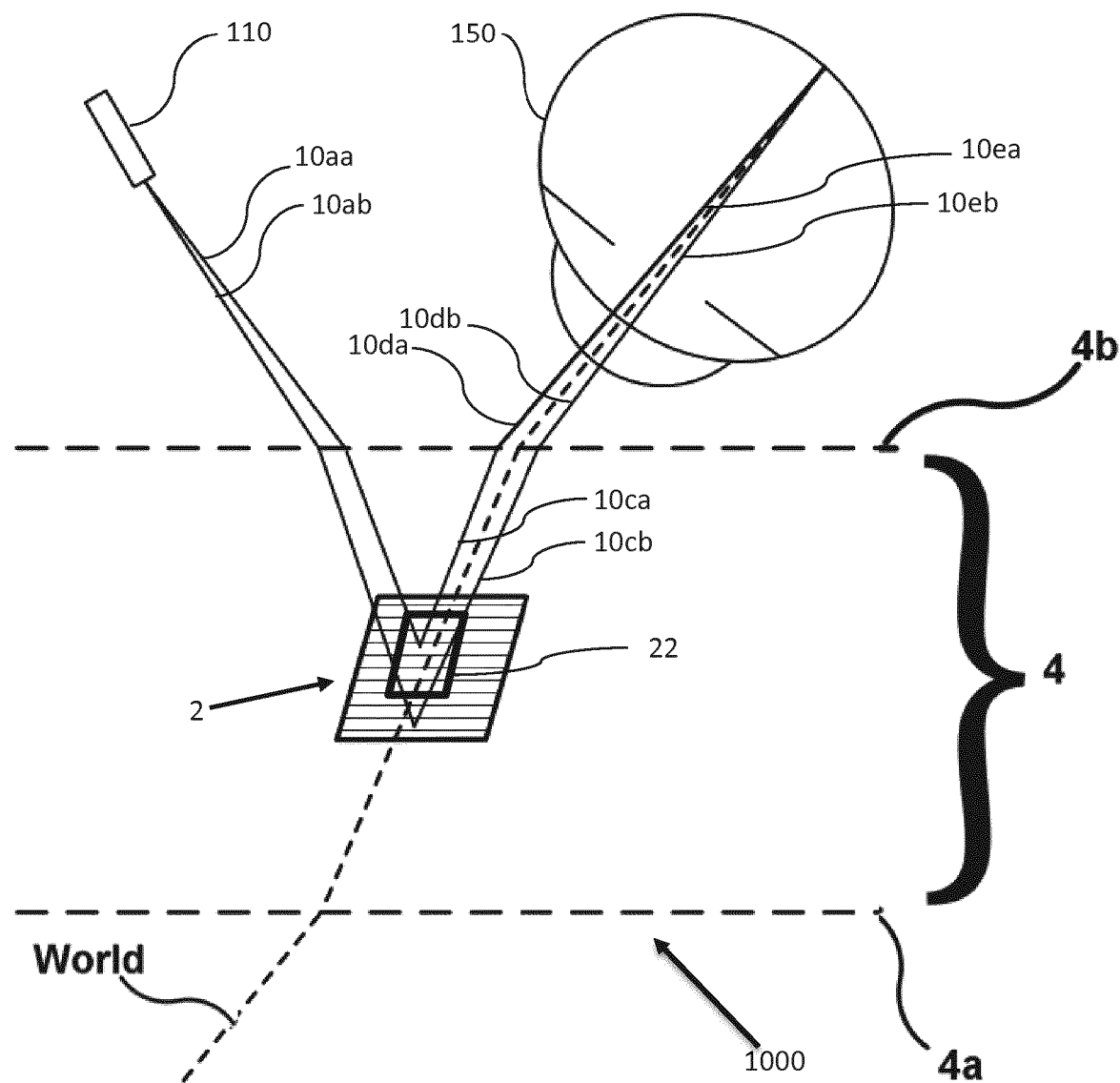
FIG. 8 illustrates a 3D view of a portion of a resonant waveguide grating of the invention directing a fraction of a light beam provided by a light emitter to the eye of an observer.

FIG. 8, illustrates an embodiment of the diffractive optical combiner 1000 of the invention, comprising at least one resonant waveguide grating 1 as described before. FIG. 8 is a 3D schematic view of an optical combiner based on a resonant waveguide-grating 1 of the invention. In the embodiment of FIG. 8 a portion 22 of the resonant waveguide grating 1 is arranged such as to redirect a part of an incident light beam 10aa emitted by a light emitter 110 in an outcoupled fraction 10ca. Both incident light beam 10aa and outcoupled fraction 10ca are entering, respectively exiting the substrate layer 4 through the second substrate surface 4b, respectively from the air and towards the air. The resonant waveguide grating 1 may of course be arranged for other environments than air, such as gases or liquids or vacuum. Both beams undergo a modification of their propagation axis at this substrate interface because of the refraction between air and the substrate media at said second substrate surface 4b. Light beam propagation in air can also be called free-space propagation and such a combiner a free-space combiner. At least a portion of said outcoupled fraction 10ca is propagating towards the eye 150 of an observer and at least a part 10ea of portion 10da of said outcoupled fraction 10ca enters the cornea and the eye pupil and is incident on the retina of the eye 150 of an observer. Light impeding from the outside world can be combined in the same optical propagation direction as the outcoupled fraction 10ca. Other incident light beams 10ab may be redirected as well through a guided mode towards the eye of an observer in a portion 10db of said outcoupled fraction 10cb, of which a part 10eb enter the eye and is incident of the retina of the eye. A set of incident light beams such as the illustrated light beam 10aa and 10ab may consist of an image beam 100. A part of said image beam can be redirected by a resonant waveguide-grating 1 and combined with light impeding from the outside world.

In an embodiment the diffractive optical combiner 1000, comprising a resonant waveguiding grating 1 of the invention, is arranged on a transparent dielectric material. This transparent material can be use to protect the resonant waveguide-grating 1 or to support it mechanically. After a lamination or optically-grade gluing of the substrate 4 of the resonant waveguide-grating with/onto a transparent dielectric material, said substrate and transparent dielectric material may be monolithically arranged. The substrate 4 is defined as the supporting material during manufacturing of the resonant waveguide-grating 1 while the final integration of the resonant waveguide-grating in an optical combiner may differ from this initial support material. In a variant, the resonant waveguide-grating is transferred from the substrate 4 or from part of the substrate 4 onto a transparent dielectric material.

As further explained the optical combiner 1000 may define an exit pupil 3. The collimation of the redirected light beam illuminating an exit pupil 3 of the optical combiner 1000 requires a delicate design in order to for the eye of the observer to perceive a virtual image, using visual accommodation, as originating from a given distance from the observer. The apparent image source location is called the virtual image position, its distance to the observer is called the image-plane distance to the observer.

In an embodiment, illustrated in FIG. 9, the invention is also achieved by a diffractive optical coupler 1000. This diffractive optical coupler 1000 can also be called an optical combiner but it is not used as a free-space optical combiner. The optical couplers are portions 22, 23 comprising pluralities 2 of subwavelength structures 2a which are adapted to receive incident light provided by a light emitter 110, said incident light being guided by a lightguiding optical element 7 arranged in the light path between said light emitter 110 and said portion 22, 23. The said lightguiding optical element 7 being used to increase the size of the exit pupil of an image beam comprising a set of incident light beam 10aa, 10ab, in an EPE configuration. Said lightguiding optical element 7 is guiding light in between its first surface 7a and second surface 7b by Total Internal Reflection (TIR). As illustrated in FIG. 8, the pupil expansion is made on only one dimension. Several documents of the prior art as listed before disclose various options to create a two-dimensional pupil expansion.

The portion 22 is configured to incouple and outcouple fraction 10ca, 10cb of incident light beams 10aa, 10ab and partially transmit transmitted portions 10fa, 10fb impeding after at least one TIR on another portion 23 creating outcoupled fraction 10ca', 10cb' out of the portion 23 of the waveguiding layer 20. The two pairs of outcoupled fraction 10ca, 10ca' and 10cb, 10cb' are preferably outcoupled parallel to each other or close to parallel but are spatially separated which allows achieving an expansion of the exit pupil of an image beam emitted by said light emitter 110.

Said portions 22, 23 can be different portions comprising different sets of pluralities 2 subwavelength structures 2a as illustrated in FIG. 9. In a variant which is not illustrated, beams propagating in said lightguiding element 7 are outcoupled partially multiple times by the same portion of a set of a plurality 2 of subwavelength structure 2.

On the opposite to said waveguiding layer 20, said lightguiding optical element 7 is a highly multimode lightguide, light propagation in it being defined by geometrical optics, said lightguiding optical element 7 being optically thick. Optically thick is defined as having an average thickness of said lightguiding optical element 7 defined perpendicular to the propagation direction of the light-guided light greater than the temporal coherence of light emitted by said light emitter 110. As such, interference phenomena in said lightguiding optical element 7 are excluded. This is opposite to said waveguiding layer 20 which is optically thin, meaning that the temporal coherence domain of light emitted by said light emitter 110 is smaller than said waveguiding layer 20 thickness as defined above. Said lightguiding optical element 7 is operating in the geometrical optics domain while said waveguiding layer 20 is operating in said waveoptics domain, the term lightguide and lightguiding and waveguide and waveguiding being used for each respectively. Said substrate 4 can be laminated onto or embedded into said lightguiding optical element 7. Using a sufficiently thick transparent substrate and propagating incident light into it, said substrate 4 can become the lightguiding optical element 7.

The invention is also achieved by a diffractive optical coupler 2000, comprising at least one resonating waveguide grating 1 as described before.

In an embodiment the diffractive optical coupler 2000 comprises at least one resonating waveguide grating 1 which is arranged on a transparent dielectric material. In a variant said transparent dielectric material is a thin foil or slab or curved slab In a variant illustrated in FIG. 10, the optical combiner 1 defines an exit pupil 3 to the side of said second substrate surface 4b at a predetermined distance from said optical combiner and at a location L. As illustrated in FIG. 10 said optical combiner defines a geometrical center C. Said location L is separated from said center C by a distance d. Said location L and said center C define an optical axis Z of the optical combiner. In such a configuration, the resonant waveguide-grating is adapted so that at least an outcoupled portion 10d of said at least one outcoupled fraction 10c is propagating to and incident at the location of said exit pupil 3. This preferred embodiment is especially useful in applications related to near-eye display apparatus. When used in a near eye display apparatus 100 the eye pupil is located, when looking in the direction of said axis Z, in the exit pupil of said combiner. The eye line of sight can be substantially aligned to said optical axis Z. When the pupil of an eye 150 of an observer is located at said exit pupil 3, at least a part 10e of said outcoupled portion 10d is entering the cornea and the eye pupil and is incident on the retina of the eye 150 of an observer.

In a variant illustrated in FIG. 10, the resonant waveguide grating can be adapted to redirect, towards said exit pupil 3, a portion of a plurality of incident light beams provided by at least two light emitters 110, 111 emitting each a set of light beams constituting an image beam, each light beam of the image beam is impeding on various locations of the resonant waveguide-grating 1. A fraction 10c of these incident lightbeams 10a may be outcoupled after being guided in said waveguiding layer 2. It is understood that said plurality of light beams constituting an image beam may be provided by a single light emitter 110 or by several light emitters 110, 111 etc.

In a variant also illustrated in FIG. 10, the optical combiner 1 is arranged so that at least an outcoupled fraction 10c is propagating away from a specular reflected fraction of said incident light beam 10a on said waveguiding layer 20 and away from the transmitted fraction of said incident light beam 10a that is transmitted through the waveguiding layer 20. This preferred configuration is distinct from reflective and free-form optical combiners used in NED apparatus. As illustrated in FIG. 10, the orientation of the outcoupled light beams 10c can be any orientation relative to said axis Z. This enables providing optical combiners in any shape and orientation in respect to said axis Z. In this example, the combiner has a planar shape and is slightly tilted compared to the eye line of sight Z, the field of view (FOV) being however symmetric relative to the line of sight. FIG. 10 illustrates a cross-section viewed from either the top or from the side of the head of an observer, both configurations to place light emitters 110 being possible.

There are a great number of different variants to realize a near-to eye display apparatus 100 of the invention. In embodiments the light emitter 110, is a light projector emitting a divergent beam 10. Preferably the light emitter 110 projects an image onto the optical combiner 1000. In an embodiment the light source 110 may provide a light beam that is scanned over the surface of said optical combiner 100.

In a variant illustrated in FIG. 11, the optical combiner is arranged so that at least a portion of the emitted light beam 10 is incident on said first substrate surface 4a while another incident light beam is incident in said second substrate surface 4b. The optical arrangement may be designed to be operative in a transmissive redirection configuration, and/or in reflective light redirection configuration. In FIG. 11, two waveguiding layer 202, 204 are operating respectively in reflective and transmissive redirection configurations. However both functions may be achieved by a single waveguiding layer.

As illustrated in FIG. 11, an optical combiner of the invention may comprise various waveguiding layers 202, 204. Preferably various waveguiding layer 202, 204 are not located in optical proximity, this is to said are not located close-by and within a coherent domain of the incident light 10a, not to interfere with each other. This can be achieved by a distance between various waveguiding layers of at least a few microns for visible light.

In a variant illustrated in FIG. 11, the optical combiner of the invention is not planar but is curved. In a variant, the optical combiner of the invention is curved on one axis but is not exhibiting a 2D curvature.

In a variant illustrated in FIG. 12, a diffractive optical combiner 1000 comprises at least three waveguiding layers 202, 204 and 206. Superposing three waveguiding layers allows providing more optical functions to said diffractive optical combiner 1000. As illustrated in FIG. 12, various waveguiding layers 204, 206 may redirect light provided by said light emitter 110b towards an exit pupil 3 where the eye 150 of an observer is represented. A waveguiding layer 206 may redirect light incident two light emitters 110a, 110b. Specific sets of pluralities 2 of subwavelength structures 2a can be used to perform specific optical functions of the combiners and do not need to be located in a single waveguiding layer. As an example, three waveguiding layer 202, 204 and 206 can be superposed in a combiner, each waveguiding layer configured to provide light with different central wavelength, for example Red, Green and Blue central wavelengths in the visible range. Such a configuration may for example provide a higher display resolution while providing a wide color gamut.

In a variant illustrated in FIG. 12, said combiner 1000 comprises at least a first 202, a second 204 and a third 206 waveguiding layer. The first waveguiding layer 202 is configured to provide an outcoupled fraction 10c of red light, the second waveguiding layer 204 is configured to provide an outcoupled fraction 10c of green light and the third waveguiding layer 206 is configured to provide an outcoupled fraction 10c of blue light.

In a variant, different virtual image planes at different virtual distance from the observer can be provided by said diffractive optical combiner 1000 using different waveguiding layer 202, 204, 206.

In a variant illustrated in FIG. 12, various part of the field of view of a display may be redirected by various waveguiding layers 202, 204, 206. In an example the central part of the field of view being redirected by said waveguiding layers 204 and 206 from light emitted by the light emitter 110b while the outer part of the field of view of the display may be redirected by the waveguiding layer 206 from light emitted by the light emitter 110a.

FIG. 13a and FIG. 13b illustrates a near-eye display configured in a light-field display. The two eyes 150, 151 of an observer can observe virtual images located at a certain distance of said observer. In the illustration of FIG. 13a and FIG. 13b, the image of a chair is provided. In a light-field display configuration, the perceived virtual image is not 2 dimensional but is three dimensional. Depending on their vergence, said two eyes 150, 151 will accommodate at different focal distances because of the vergence accommodation reflex and will perceive different images. In this illustration of a light-field near-eye display configuration, parts of objects away from the focus of the eye accommodation and vergence distance are observed as blurred by the observer, as the back of the chair in FIG. 13a and the front of the chair in FIG. 13b. On the opposite, parts of virtual objects located at the eye accommodation and vergence distance are perceives in focus and as sharp, as the front of the chair in FIG. 13a and the back of the chair in FIG. 13b. Such light-field display configurations or multi-focal plane displays configurations can be realized by numerous methods as illustrated in the scientific literature. These display configurations are arranged to provide images simulating the light cones coming from pixels at varying distance from a user.

In a variant illustrated in FIG. 14a and FIG. 14b the optical combiner 1000 is configured to redirect light by said waveguiding layers 202 and 204, configured to couple out of said waveguiding layers 202 and 204 outcoupled beams 10c comprising beamlets 10ca, 10cb, 10ce, 10cf and 10cc, 10cd. The two beamlets of the pairs of said beamlets 10ca and 10cb, beamlets 10cc and 10cd, beamlets 10ce and 10cf are either parallel in respect to each other or non-parallel and emitted as originating from a common points located at finite distance from the observer. Each beamlet is defined as a narrow beam having a cross-section smaller than 0.5 mm, preferably smaller than 0.2 mm, more preferably smaller than 0.1 mm, said cross section being defined at any location of the light beam between said redirecting waveguiding layers 202, 204 and said virtual exit pupil 3. The eye accommodation cannot distinguish accurately the collimation of each beamlet because of their narrow cross-section. Such configuration is usually named retinal projector or virtual retinal display configuration. However the eye of an observer may perceive a sharper image when accommodating on the virtual image plane from which pairs of beamlets are appearing to originate from, as illustrated by the convergence points 40a, 40b and 40c of the three pairs of beamlets for different eye accommodation. FIG. 14a and FIG. 14b illustrates the creation of pixels of images located at two different finite distances from the user using for each pixel two beamlets. The pairs of beamlets can be provided by a set of a plurality 2 of subwavelength structures 2a outcoupling more than a single outcoupled beam 10c or by various sets of pluralities 2 of subwavelength structure 2a. In FIG. 14a and FIG. 14b the light emitter(s) is not shown.

The light emitter may be positioned to either side of the optical combiner 1000. It is understood that in the embodiment of FIGS. 11a and 11b several light emitters may be used to achieve the described effect.

In a similar way, sets of pluralities 2 of subwavelength structure 2a can be configured to provide virtual pixels using more than two beamlets and to provide virtual images from a plurality of image planes located at different distances from said exit pupil 3.

In a preferred variant, illustrated in FIG. 14a and FIG. 14b, the optical combiner 1000 is configured so that said beamlets have each a parallel collimation and a small cross-section so that when an eye of an observer is located at said virtual exit pupil (3), the focal plane of the virtual source of said beamlets cannot be resolved. This can be provided by configuring at least a set of a plurality 2 of subwavelength structures 2a providing outcoupled beams 10c having a parallel or quasi-parallel collimation. Such configuration may prevent vergence-accommodation conflicts and provide support for accommodation to the at least one eye of an observer as images may be sharper at an accommodation matching the distance of the virtual pixels.

In a variant, a set of a plurality 2 of subwavelength structures 2a is configured to redirect in reflective or transmissive configuration outcoupled light beams 10c having non-planar wavefronts and provided by at least one light emitter 110 apparatus. A light emitter can be configured with varifocal or multifocal elements to provide light beam 10a and imaging beam having a curved wavefront simulating line cones emitted at a finite distance. A set of a plurality 2 of subwavelength structures 2a can be configured to redirect such wavefront in outcoupled fraction 10c towards an exit pupil 3 without modifying their curvature as illustrated schematically in FIG. 15a. In FIG. 15a to FIG. 16b the wavefront curvatures are illustrated in cross-section locally and not at scaled with the other elements. Ideally spherical wavefronts have a 2D curvature whose curvature radius increase with the distance from the virtual object and whose curvature is modified when changing media, for example entering or exiting said substrate. FIGS. 15a to 16b are therefore illustrations of a resonant waveguide-grating designed to maintain or modify the wavefront curvature of incident light beams 10a when redirected 10c towards an exit pupil 3 without accurate representations of the physical wavefront propagations.

The plurality 2 of subwavelength structures 2a is guiding incoupled portion 10b of incident light beam 10a in leaky modes. The light propagation speed in the waveguiding layer may be different from the propagation speed in the surrounding substrate layer 4 or lightguiding optical element 7 in order to guide the light. Usually the propagation speed in said waveguiding layer 20 is lower than the propagation speed in its surrounding media.

FIG. 15b illustrates a set of a plurality 2 of subwavelength structures 2a modifying the curvature of the wavefront of said outcoupled light beam 10c in respect to said incident light beam 10a, so that the portion 10d of the outcoupled light beam 10c propagating towards the eye of an observer may be perceived from an observer as originated from a given spatial distance from the observer.

FIG. 16a illustrates using two different portions 22, 23 of a waveguiding layer 20 comprising each a set of a plurality 2 of subwavelength structures 2a to achieve such a modification of the curvature of the wavefront of said outcoupled light beam 10c in respect to said incident light beam 10a.

FIG. 16b illustrates using a non-homogeneous set of a plurality 2 of subwavelength structures 2a to achieve such a modification of the curvature of the wavefront of said outcoupled light beam 10c in respect to said incident light beam 10a.

The curvature radius of the wavefront of said incident light beam 10a may be modified across one dimension or over two dimensions depending on design constraints. In a variant, using a gradient spatial periodicity for at least a spatial frequency component of waveguiding layer 2, the curvature radius of the outcoupled light beam 10c can be modified across the direction of the guided light 10b propagation axis. The change of wavefront curvature on the second dimension of the field of view may be controlled by the orientation of the plurality 2 or subwavelength structures 2a in the X-Y plane.

Combining non-linear groove orientation and gradient spatial periodicity for said set of a plurality 2 of subwavelength structures 2a enable modifying the curvature radius in two dimensions of a redirected light beam 10c so as to mimic accurately to the eye of an observer a light cone emitted by a pixel located at a finite distance from said eye of an observer.

FIG. 17 illustrates an optical combiner 1000 comprising at least two said waveguiding layers 202, 204 comprising at least a set of a plurality 2 of subwavelength structures 2a configured to redirect light from at least two light emitter 110, 111 towards the eye of an observer 150.

The plurality of degrees of freedom when designing a set of a plurality 2 of subwavelength structures 2a and the waveguiding layer permittivity cross-section allow designing said optical combiner 1 having said waveguiding layer (20) in any pre-determined complex 3D curved surface, independently from said light emitter position 110 and said virtual exit pupil 3. As an example, the combiner 1 can follow the curvature of a visual corrective lens surface.

In a variant, a first image beam comprising multiple portion 10d of outcoupled fraction 10c propagating towards the eye of an observer 150 is redirected by said waveguiding layer 204 configured to provide to the exit pupil 3 a high lateral resolution image of which the depth of the focal plane cannot be resolved accurately by human eyes, as explained above, provided by said light emitter 110. A second waveguiding layer 202 is configured, with at least a set of a plurality 2 of subwavelength structures 2a, to redirect at least an incident light beam 10c providing a lower lateral resolution image to the exit pupil 3 but providing a predetermined focal plane depths. This second image allow the eye accommodation reflex to accommodate, at a predetermined focal distance. This predetermined focal distance may be varied by modulating the imaging beam 10 shape, polarization or spectral composition provided by said light emitter 110.

As discussed above, it is of particular interest to provide large exit pupils or eye-box for near-eye-displays. The exit pupil of said combiner can be extended by various means, including static and dynamic EPE based on gaze tracking.

In a variant illustrated in FIG. 18, the optical combiner 1000 comprises an index layer 5 which comprises means to modulate its refractive index, for example a Kerr effect material, so as for example to modify dynamically the position of the virtual exit pupil 3.

In an variant, the diffractive optical combiner 1000 is configured so that image-containing incident light beams provided from various light emitters are at least partially redirected by said diffractive optical combiner 1000 and directed on said exit pupil 3, so that the perceived images by an observer are stitched laterally to increase the resolution and/or the field of view of the perceived images by an observer whose pupil is located at said exit pupil 3.

In an embodiment, illustrated in FIG. 19a,b the optical combiner 1000 comprises a plurality of waveguiding layers 202, 204, each waveguiding layer comprising at least a set of a plurality 2 of subwavelength structures 2a configured to provide outcoupled fractions 10d, 11d, 12d that are spatially separated so as to enhance the aperture of said exit pupil 3. As illustrated in FIG. 19a, the different fractions 10d, 11d and 12d may be generated by different light emitters 110, 111, 112 that are spatially separated.

Alternatively, a larger exit pupil 3 or eye-boy may be obtained by said light emitter 110 providing incident beams that are polarization or spectrally separated, an array being configured to redirect each beam to different exit pupil locations. As illustrated in FIG. 19b, light beam 12d part of an exit pupil not incident on the retina of the eye 150 of an observer for a the eye position of FIG. 19a may be incident on the retina of the eye for another eye position illustrated in FIG. 19b, and vice-versa. Angular/spatial multiplexing or wavelength multiplexing of incident light beams 10, 11a, 12a may be used such as disclosed in the document WO 2014155288 for holographic optical element (HOE), also called volume holograms, optical combiners. Such strategies may be used to provide a 1D or 2D arrays of exit pupil providing an effective large eye-box to the near-eye display.

In a variant illustrated in FIG. 20, the optical combiner 1000 is adapted to move laterally, or said light emitter 110 is adapted to move compared to said combiner 1000, or the polarization or spectral range of said light emitter 110 is tuned so as to be able to locate dynamically the exit pupil 3 at a determined location.

In a variant illustrated in FIG. 21, an optical combiner 1000 comprising a plurality of waveguiding layers is operating with light received from a common emitter so that a partially transmitted beam 10f by a first waveguiding layer of an incident light beam 10a is partially redirected by a second waveguiding layer, both redirected outcoupled fraction 10, 10c' by the two waveguiding layer being substantially parallel. FIG. 21 also illustrate the use of a selective absorption or reflection layer 6 preventing transmitted light portion of incident light beam 10a from said light emitter 110 to go through the diffractive optical combiner 1000.

In an embodiment a set of a plurality 2 of subwavelength structures 2a is arranged so that at least two exit pupils 3a, 3b are defined and so that each of the two eyes 150, 151 of an observer can be positioned in the location of said two exit pupils 3a, 3b, and at least a part 10e, 11e and 12e, 13e, 14e of said outcoupled portion 10d is incident on the retina of each eye of an observer. As described above, said set of a plurality 2 of subwavelength structures 2*a* can receive a light beam provided by an emitted beam travelling in free space as illustrated in FIG. 22. The light beam may also be provided by light guided by a lightguide as illustrated in FIG. 23 as viewed from the top of the head of an observer. Said light emitters 111-114 may be positioned anywhere on said diffractive optical combiner 1000 or coupler 2000, for example on the side of said combiner or coupler as the light emitter 110,114 and/or the top or bottom side of the display as the light emitter 111, 112, 113.

Said combiner 1 may comprise one or a plurality of waveguiding layers 20. The optical combiner 1 may comprise one or several set of a plurality 2 of subwavelength structures 2*a* configured to increase the lateral resolution and/or to broaden the FOV and/or to provide various image focal plane at various distances in a light-field display configuration and/or to increase the size of the exit pupil 3.

Said plurality 2 or set of said plurality can be designed, according to the optical configurations disclosed in this document and their optical properties to additionally perform other optical function such as lensing effect or other optical effects. Other optical element may be integrated on other part of the diffractive optical combiner or diffractive optical coupler or near eye display apparatus using at least a resonant waveguide grating 1 of the invention, preferably out of the line of sight Z for the user, such as NIR light redirection, collimation optics, exit pupil expansion optics, light-scanning elements and occlusion mask.

The invention is also achieved by a near-eye display apparatus comprising at least one resonating waveguide grating 1 as described before.

The near-to-the-eye display apparatus 100 of the invention, also defined as display, comprises at least said optical combiner 1 and a light source, also defined as image projector, microdisplay or light emitter 110, as illustrated in FIG. 24. The light emitter 110 emits a light beam 10 in the direction of the resonant waveguide grating 1. The resonant waveguide grating 1 has a front side 1*a* situated to the side of a scene, defined as front side, and a back side 1*b* situated to the opposite site of said front side 1*a*, as illustrated in FIG. 1.

In a variant the near-eye display apparatus may comprise at least one diffractive optical combiner 1000 as described before.

In a variant the near-eye display apparatus may comprise at least one diffractive optical coupler 2000 as described before.

A near-eye display apparatus 100 object of the invention is illustrated in FIG. 24, comprising:
  the resonant waveguide grating 1 as described before;
  an image generating apparatus;
  a head-fitting hardware on which said optical combiner 1 and image generating apparatus are fixed.

In an embodiment the near-eye display apparatus 100 comprises at least one of the following hardware elements:
  a) an inertial measurement unit;
  b) a solid-state memory storage 170;
  c) a wireless datalink;
  d) an eye tracking system 130;
  e) a Central Processing Unit (CPU) 170;
  f) a Graphics Processing Unit (GPU) 170;
  g) a camera 160, 160' arranged to image the surrounding environment;
  h) a depth-sensing camera 140 or optical system;
  i) a battery 180

It is understood that FIG. 24 illustrates an exemplary arrangement of said hardware arrangements and that other arrangements are possible, in particular the same number may identify different elements, for ex the CPU may be placed in the position of the battery or vice versa.

In an embodiment of the near-eye display apparatus 100 said light emitter 110 comprises a projector arranged to project, in operation, an image projected on to said waveguiding layer 20 impeding on said front side 1*a* or said back side 1*b*.

In an embodiment the near-eye display apparatus 100 comprises a microdisplay arranged to project, in operation, an image onto said waveguiding layer 20 impeding on said front side 1*a* or said back side 1*b*.

In an embodiment said light emitter 110 is a light beam scanner arranged to project, in operation, at least one light beam onto said waveguiding layer impeding from said front side 1*a* or said back side 1*b*.

In an embodiment said light emitter 110 comprises a microdisplay, a micro-projector or a light-beam scanner arranged to project, in operation, at least one light beam onto said waveguiding layer impeding through a lightguiding optical element In an embodiment, illustrated in FIG. 20, the optical combiner 1 is adapted to move laterally, or said light emitter 110 is adapted to move compared to said combiner 1, or the polarization or spectral range of said light emitter 110 is tuned so as to be able to locate dynamically the exit pupil 3 at a determined location.

In an embodiment said light emitter 110 is adapted to emit non-planar optical wavefronts so as to simulate light emitted by objects located, to said front side 1*a*, at a finite distance.

In an embodiment the near-eye display apparatus 100 comprises an eye-tracking or gaze-tracking system connected to a CPU configured to determine the vergence point of the two eyes of an observer with respect to said headset and wherein the light emitter 110 is configured to blur virtual images of virtual objects depending on their distance from the sphere determined by being centered on the eye of an observer and containing said vergence point.

In an embodiment said eye-tracking system is configured to determine the position of the at least one pupil of the eye of an observer, the image generating apparatus being configured to project into the eye a plurality of beamlets 11*c* in said exit pupil 3 and so simulating the presence of a virtual object located at a finite distance from said observer.

In an embodiment the eye-tracking system is configured to determine the position of at least one pupil of the eye of an observer, wherein further the image generating apparatus is configured to project into the eye an outcoupled light beam 10*c* having a curved wavefront.

In an embodiment said eye-tracking system is configured to determine the position of at least one pupil of the eye of the user, the image generating apparatus being configured to adapt the orientation, position or spatial distribution of the emitted light beam 10, so that said at least one exit pupil is located at said at least one eye pupil.

In an embodiment said eye-tracking system comprises a light occlusion system as for example described in US2015/0241703 designed to reduce the brightness of light impeding from the outside world.

In an embodiment the occlusion system is adapted to occlude light dynamically and selectively according to its incidence direction of incidence.

Experimental Results

FIG. 25 illustrates the diffractive first order spectrum of a periodic arrangement of a set of a plurality 2 of subwavelength structures 2a made with binary grooves and shapes coated with a high refractive index dielectric and embedded in a synthetic transparent polymer material. High wavelength selectivity allows efficient diffraction of only a green portion of the visible spectral range for TE polarized incident light incident at 70° from the normal to the waveguiding layer plane from air. The green portion is diffracted at the normal to the waveguiding layer or very close to the normal of the waveguiding layer, the periodicity of the set of a plurality 2 of subwavelength structure 2a being of 600 nm.

FIG. 26 illustrates a schematic view of a set of a plurality 2 of subwavelength structures 2a viewed as normal to the waveguiding layer in the XY plane and in a cross-section located along the AA' line in the Y-Z plane. In this illustration, various grooves and ridges (in black) are curved and non-linear. It is observed that only the five ridges are noted as subwavelength structures 2a in FIG. 26. A ridge is thinner in the XY plane than the 4 others, making the cross-section BB' different than the AA' as it has an additional ridge and groove. The schematic example of FIG. 26 illustrates an exemplary resonant waveguide grating 1 configuration having a complex shape, in 3D, of a plurality 2 of subwavelength structures 2a.

What is claimed is:

1. A resonant waveguide grating, defining a first side and a second side opposite to said first side, said resonant waveguide grating comprising:
    a substrate layer defining a first substrate surface and a second substrate surface facing said first substrate surface;
    a waveguiding layer, having a first waveguiding surface and a second waveguiding surface, arranged on said substrate layer, and having a predetermined permittivity function defined in the direction perpendicular to said first waveguiding surface,
    a plurality of subwavelength structures,
    wherein:
        said waveguiding layer is configured to guide at most ten wave-guided light modes in a predetermined wavelength range;
        each of said plurality of subwavelength structures comprises grooves and ridges that have non-periodical arrangement, which has a spatial Fourier transform containing at least two distinct effective spatial frequency components, said plurality of subwavelength structures not having pairs of separate resonating waveguide incouplers and not having resonating waveguide outcouplers;
        each of said plurality of subwavelength structures is arranged to be in optical communication through said waveguiding layer which permittivity function and the dimension and orientation of said plurality of subwavelength structures are chosen so that each of said plurality of subwavelength structures couples resonantly, by diffraction, into said waveguiding layer at least an incoupled portion of an incident light beam, provided by a light emitter into at least one of said at most ten wave-guided modes of the waveguiding layer,
        each of said plurality of subwavelength structures is configured to couple out of said waveguiding layer resonantly by diffraction, an outcoupled fraction of said at least an incoupled portion, so that each of said plurality of subwavelength structures provide incoupling and outcoupling from said waveguiding layer;
        said outcoupled fraction of said at least incoupled portion has a predetermined central wavelength $\lambda_0$ in said predetermined wavelength range and has a predetermined spectral width $\Delta\lambda$, said outcoupled fraction being a diffracted part of the incident light beam.

2. The resonant waveguide grating according to claim 1, wherein at least two grooves and/or at least two ridges have different shapes and/or dimensions.

3. The resonant waveguide grating according to claim 1, wherein the waveguiding layer has a mean refractive index higher than the refractive index of said substrate layer in at least a portion of the spectrum of said incident light beam.

4. The resonant waveguide grating according to claim 1 wherein the waveguiding layer is made of a material comprising at least a dielectric or a semiconductor material.

5. The resonant waveguide grating according to claim 4, wherein the dielectric material or semiconductor has an optical index higher by at least 0.1 than the refractive index of said substrate layer in at least a portion of the spectrum of said incident light beam.

6. The resonant waveguide grating according to claim 1, wherein the waveguiding layer comprises to at least one of the sides of the waveguiding layer at least two layers made of different materials.

7. The resonant waveguide grating according to claim 1, comprising a plurality of subwavelength structures in which the at least two grooves and the at least two ridges have a binary shape, or a sinusoidal shape, or a triangular shape or a slanted shape.

8. The resonant waveguide grating according to claim 1, wherein said waveguiding layer is substantially conformal to the shape of the plurality of the subwavelength structures.

9. The resonant waveguide grating according to claim 1, wherein said at least two distinct effective spatial frequency components are larger than one tenth of the spatial frequency $1/\lambda_0$ of said predetermined wavelength $\lambda_0$.

10. The resonant waveguide grating according to claim 9, wherein one of said effective spatial frequency components is larger than the spatial frequency $1/\lambda_0$ of said predetermined wavelength $\lambda_0$, more preferably both of said at least distinct effective spatial frequency components being larger than the spatial frequency $1/\lambda_0$ of said predetermined wavelength $\lambda_0$.

11. The resonant waveguide grating according to claim 10, wherein a portion comprises at least one set of a plurality of adjacent subwavelength structures having a local spatial periodicity, this local periodicity being defined in that the lateral and vertical the dimensions of said at least one set of a plurality of subwavelength structures does not vary by more than 10% in said portion.

12. The resonant waveguide grating according to claim 11, wherein said local spatial periodicity is the least common multiple of the at least two distinct effective spatial period components of said portion.

13. The resonant waveguide grating according to claim 11, wherein said outcoupled fraction is an outcoupled diffracted portion of the incident light beam by said resonant waveguide grating, according to a diffraction order N being at least one or below minus one of said spatial period, said outcoupled fraction being directed away from the specular reflection direction of the incident light and away from said incident light beam.

14. The resonant waveguide grating according to claim 10, wherein said set of a plurality of subwavelength structures couples resonantly into said waveguiding layer said incoupled portion of an incident light beam by diffraction, according to a diffraction order N being at least two or below minus two of said spatial period.

15. The resonant waveguide grating according to claim 1, wherein said portion comprising said set of a plurality of subwavelength structures has no local spatial periodicity.

16. The resonant waveguide grating according to claim 15, wherein said portion comprising a set of a plurality of subwavelength structures having no local spatial periodicity comprises at least 8 ridges and 8 grooves, preferably more than 20 ridges and 20 grooves, more preferably more than 100 ridges and 100 grooves.

17. The resonant waveguide grating according to claim 1, wherein said plurality of subwavelength structures are non-homogeneous at a super-wavelength scale.

18. The resonant waveguide grating according to claim 1, wherein said plurality of subwavelength structures has a spatial gradient of at least one of their structural parameters.

19. A diffractive optical combiner comprising at least one resonant waveguide grating according to claim 1.

20. A diffractive optical coupler comprising at least one resonating waveguide grating according to claim 1.

21. A near-eye display apparatus comprising at least one resonating waveguide grating according to claim 1.

22. A near-eye display apparatus comprising at least one diffractive optical combiner or one diffractive optical coupler, the diffractive optical combiner comprising at least one resonant waveguide grating defining a first side and a second side opposite to said first side, said resonant waveguide grating comprising:
 a substrate layer defining a first substrate surface and a second substrate surface facing said first substrate surface;
 a waveguiding layer, having a first waveguiding surface and a second waveguiding surface, arranged on said substrate layer, and having a predetermined permittivity function defined in the direction perpendicular to said first waveguiding surface,
 a plurality of subwavelength structures,
wherein:
said waveguiding layer is configured to guide at most ten wave-guided light modes in a predetermined wavelength range;
each of said plurality of subwavelength structures comprises grooves and ridges that have non-periodical arrangement, which has a spatial Fourier transform containing at least two distinct effective spatial frequency components, said plurality of subwavelength structures not having pairs of separate resonating waveguide incouplers and not having resonating waveguide outcouplers;
each of said plurality of subwavelength structures are arranged to be in optical communication through said waveguiding layer which permittivity function and the dimension and orientation of said plurality of subwavelength structures are chosen so that each of said plurality of subwavelength structures couples resonantly, by diffraction, into said waveguiding layer at least an incoupled portion of an incident light beam, provided by a light emitter into at least one of said at most ten wave-guided modes of the waveguiding layer,
each of said plurality of subwavelength structures is configured to couple out of said waveguiding layer resonantly by diffraction, an outcoupled fraction of said at least an incoupled portion, so that each of said plurality of subwavelength structures provide incoupling and outcoupling from said waveguiding layer;
said outcoupled fraction of said at least incoupled portion has a predetermined central wavelength $\lambda_0$ in said predetermined wavelength range and has a predetermined spectral width $\Delta\lambda$, said outcoupled fraction being a diffracted part of the incident light beam.

\* \* \* \* \*

UNITED STATES PATENT AND TRADEMARK OFFICE
CERTIFICATE OF CORRECTION

PATENT NO. : 11,500,203 B2
APPLICATION NO. : 16/652788
DATED : November 15, 2022
INVENTOR(S) : Guillaume Basset It is certified that error appears in the above-identified patent and that said Letters Patent is hereby corrected as shown below:

In the Specification

Column 1; Line 60:
"surface relief grating (SAG)," should be "surface relief grating (SRG),"

Column 1; Line 62:
"Bragg Grating (SAG). Most of" should be "Bragg Grating (SBG). Most of"

Signed and Sealed this
Seventeenth Day of October, 2023

Katherine Kelly Vidal
*Director of the United States Patent and Trademark Office*